United States Patent
Ouchi et al.

[19]

[11] Patent Number: 5,975,761
[45] Date of Patent: Nov. 2, 1999

[54] ROLLING BEARING UNIT WITH ROTATIONAL SPEED SENSOR

[75] Inventors: Hideo Ouchi; Kouichi Morita; Naoki Mitsue, all of Fujisawa, Japan

[73] Assignee: NSK Ltd., Tokyo, Japan

[21] Appl. No.: 09/050,369

[22] Filed: Mar. 31, 1998

[30] Foreign Application Priority Data

| Mar. 31, 1997 | [JP] | Japan | 9-080737 |
| May 9, 1997 | [JP] | Japan | 9-119554 |
| May 14, 1997 | [JP] | Japan | 9-124422 |
| Jul. 23, 1997 | [JP] | Japan | 9-196974 |

[51] Int. Cl.$^6$ .............................. F16C 19/08; G01P 3/48
[52] U.S. Cl. ...................... 384/448; 324/207.25
[58] Field of Search ............................ 384/448; 324/173, 324/174, 207.25

[56] References Cited

U.S. PATENT DOCUMENTS

| 4,946,295 | 8/1990 | Hajzler | 384/448 |
| 5,103,170 | 4/1992 | Grillo et al. | 384/448 X |
| 5,148,104 | 9/1992 | Ishikawa | 384/448 X |
| 5,451,869 | 9/1995 | Alff | 384/448 X |
| 5,544,962 | 8/1996 | Hofmann et al. | 384/448 |
| 5,550,467 | 8/1996 | Goossens | 384/448 X |
| 5,622,437 | 4/1997 | Alff | 384/448 |
| 5,642,042 | 6/1997 | Goossens et al. | 384/448 X |
| 5,756,894 | 5/1998 | Paolo et al. | 73/489 |
| 5,762,425 | 6/1998 | Ouchi | 384/448 |

FOREIGN PATENT DOCUMENTS

| 0092605 | 11/1983 | European Pat. Off. |
| 2678063 | 12/1992 | France |
| 1-167666 | 11/1989 | Japan |
| 7-31539 | 6/1995 | Japan |
| 9-61443 | 3/1997 | Japan |
| 9-196945 | 7/1997 | Japan |

*Primary Examiner*—Thomas R. Hannon
*Attorney, Agent, or Firm*—Evenson, McKeown, Edwards & Lenahan, PLLC

[57] ABSTRACT

A rolling bearing unit with a rotational speed sensor comprising a stationary outer ring having a first raceway, a rotatable inner ring having a second raceway, a plurality of rolling elements rotatably provided between the first and second raceways, a sensor support case having a step portion for axial positioning, a detecting portion and a sensor mounted therein, an encoder having circumferentially changing magnetic characteristics and connected to the rotatable ring, a cover made of a synthetic resin, connected to the stationary ring, and having a fitting portion with respect to the outer ring, the fitting portion formed with a groove for mounting an seal-ring therein, a mount hole for inserting part of the sensor support case therein, and a portion abutted to the step portion of the sensor support case for axial positioning, and an elastic member having a first portion engaged with the cover and a second portion engaged with the sensor support case to fix the sensor support case to the cover.

2 Claims, 51 Drawing Sheets

Fig. 77  PRIOR ART

ROLLING BEARING UNIT WITH ROTATIONAL SPEED SENSOR

BACKGROUND OF THE INVENTION

The present invention is related to a rolling bearing unit with a rotational speed sensor, which is utilized to rotatably support a road wheel with reference to a suspension apparatus while detecting the rotational speed of the road wheel.

The road wheel is rotatably supported by a rolling bearing unit with reference to a suspension apparatus. In addition, the rotational speed of the road wheel must be detected in order to control an anti-lock braking system (ABS) and traction control system (TCS). Accordingly, recently the rolling bearing unit with rotational speed sensor, that is the rolling bearing unit having a rotational speed sensor installed therein, is broadly used to rotatable support the road wheel while detecting the rotational speed of the road wheel.

Japanese Utility Model Publication JITSUKAI HEI No. 7-31539 discloses one example of the prior art structures of the rotational speed sensor, which is also referred to as rpm detector in this specification, for use in such an object.

An object of this publication is to provide a rolling bearing unit with rotation speed sensor wherein it is possible to take out only the rotation speed sensor from the hub cap for exchange and maintenance, to make short the axial size of the bearing unit, and to stabilize the sensor performance.

In this structure, a pair of bolts and nuts are used to securely fix a sensor to a cover of the rolling bearing unit. (see e.g. FIG. 3 of the publication). This step is carried out in the assembling site of the rolling bearing unit with rotational speed sensor but inconvenient to need a long process time. In addition, the disengagement and engagement of the bolts and nuts for repairing the rotational speed sensor in the rolling bearing unit are also troublesome. This leads to cost-up in the production and repair.

U.S. Pat. No. 4,946,295 which is incorporated in the present specification by reference, discloses another example of the bearing unit with rpm detector where the sensor is easily-engaged and disengaged with and from the bearing unit for easy inspection and repair. No special tool is used to install the sensor at the end of the stationary outer ring. However, no seal device is installed in this structure to protect the encoder and sensor from outside. Specifically, the seal ring 10 in this structure is used for isolating the space for installing the rolling members 3 from outside, but not for isolating the encoder and sensor from outside. Accordingly, for example, when it rained, water drops may be kept attached to the clearance between the encoder 19 and sensor 8, which may lead to damages of the encoder and/or sensor if the automobile is started with the attached water drops frozen.

JP Patent Publication TOKUKAI BEI No. 9-1964945 discloses another example of the bearing unit with rpm detector, where the holder 26 with the sensor 12a embedded therein can be easily installed and removed with respect to the cover 23 fixed to the outer ring 2a without any special tool. However, some improvements are required in assembling the bearing unit with rpm detector. Specifically the cylindrical support body 27 must be placed in alignment with the holder 26 in phase in a circumferential direction. Therefore, the holder must often be rotated inside the cylindrical support body, but due to the presence of the elastically compressed O-ring on the cylindrical support body, the force to rotate the holder is substantially large to easily worsen the assembly performance of the bearing unit with rpm detector. In addition to the assembly performance, the performance of the rotational speed sensor must be taken into consideration with respect to the installation of the holder into the cover of the bearing unit.

The mechanism of the rotational speed sensor is detailed later referring to FIGS. 73 to 76.

SUMMARY OF THE INVENTION

An object of the present invention is to provide a rolling bearing unit with rotational speed sensor in which the engagement and disengagement of the sensor to the cover is carried out easily and instantly to reduce the cost.

Another object of the present invention is to provide a rolling bearing unit with rotational speed sensor in which the sensor holder is sealingly mounted to the cover of the bearing unit with the assembly performance of the holder into the cover improved.

BRIEF DESCRIPTION OF THE DRAWINGS

FIG. 72 (B) is a cross sectional view of a portion around the sensor unit or sensor holder in another sample.

PREFERRED EMBODIMENTS OF THE INVENTION

Figure 1:
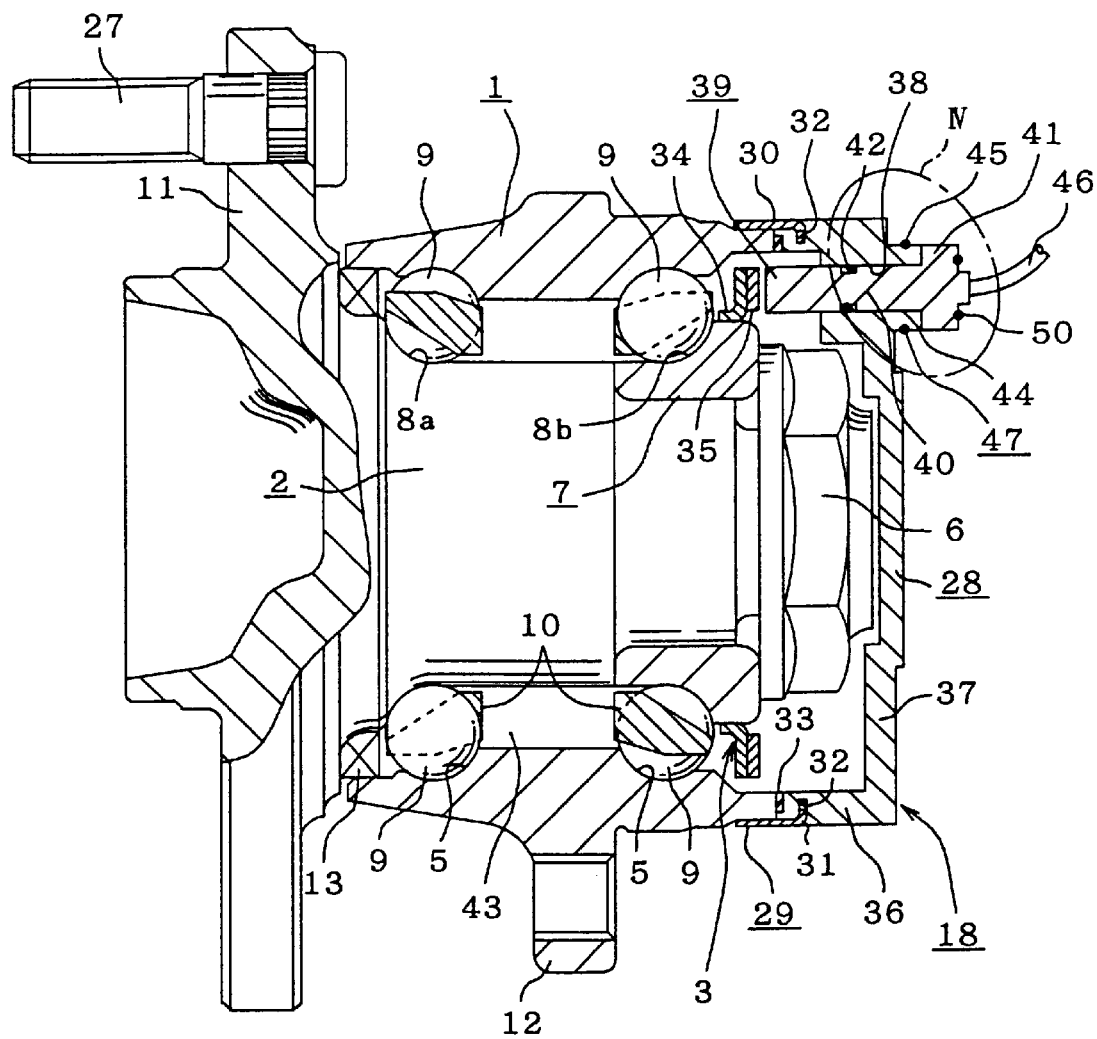
FIG. 1 is a cross sectional view of the rolling bearing unit in one example of the present invention.
Figure 2:
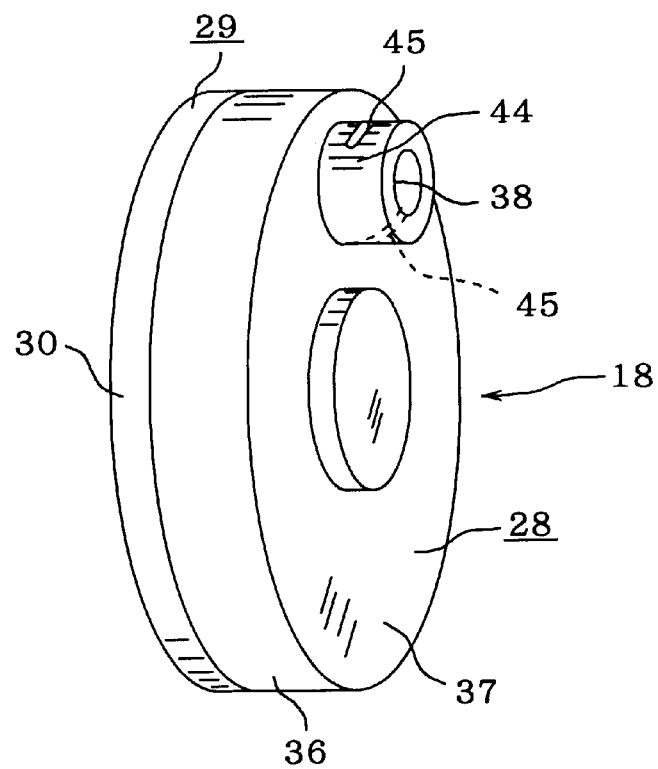
FIG. 2 is a perspective view of the cover used in the rolling bearing unit of FIG. 1.

FIGS. 1 thru 5 show a first embodiment of this invention.

The rolling bearing unit with a rotational speed sensor comprises a stationary outer ring 1 having a sensor unit 39 supported thereby and a hub 2 rotatably supported by and within the outer ring 1. The hub 2 has an encoder 3 fixed thereto, the rotational speed of which is detected by the sensor unit 39 supported by the outer ring 1.

The stationary outer ring 1 has an inner peripheral surface formed with outer ring raceways 5 in double rows, while the rotatable hub 2 has an outer peripheral surface on which a first inner ring raceway 8a is formed. Fitted onto the hub 2 and fixed with a nut 6 to form a rotatable ring assembly together with the hub 2 is an inner ring 7 which is formed with a second inner ring raceway 8b.

A plurality of rolling members 9 are provided between the first and second inner ring raceways 8a, 8b and the outer ring raceways 5 and rotatably supported by a cage 10 in each row, so that the hub 2 and inner ring 7 are rotatably supported within the outer ring 1.

Provided on the axially outer end portion of the hub 2 at a portion projected from the and outer end of the outer ring 1 is a flange 11 to which a road wheel (not shown) is mounted. The term "axially outer" means the widthwise outer side when installed in the automobile and left in FIG. 1

Provided on the axially inner end portion of the outer ring 1 is a mount portion through which the outer ring 1 is mounted to a suspension apparatus (not shown). The term "axially inner" means the widthwise central side when installed in tile automobile, and right in FIG. 1.

A seal ring 13 is used to cover a space between the axially open end portion of the outer ring 1 and the outer peripheral surface at an axially intermediate portion of the hub 2.

Although the rolling bearing unit illustrated is of the ball bearing type, the tapered roller type can be used for the heavy vehicles.

Fitted onto the outer peripheral surface of the axially inner end portion of the inner ring 7 at a portion separated from the inner ring raceway 8b is the encoder 3 which is made of a magnetic metal plate such as carbon steel and formed in a generally annular shape in L-shaped cross section by way of a plastic process.

The opening on the axially inner end (right end in FIG. 1) of the stationary outer ring 1 is covered by a cover 18. This cover 18 comprises a main body 28, which is cylindrical and has a bottom and is made by injection molding using synthetic resin, and a cylindrical body 29 that connects through fitting to the open end of the main body 28. This cylindrical body 29 is made by plastic molding of anti-corrosive sheet metal such as stainless steel, and formed into a generally circular ring shape having an L-shaped cross section. The cylindrical body 29 has a cylindrical section 30 for fitting, and an inward facing flanged portion or brim portion 31 that bends from the base end edge of the cylindrical section 30 (right edge in FIG. 1) inward in the radial direction. By molding this inward facing flanged portion 31 into the main body 28 when performing injection molding of the main body 28, it is possible to join this cylindrical body 29 to the opening portion of the main body 28.

Several through holes 32 are formed around this inward facing flanged portion 31 intermittently in the circumferential direction. When performing injection molding of the main body 28, the synthetic resin used in the injection molding flows into these through holes 32, and strengthen the bond between the main body 28 and the cylindrical body 29.

The cylindrical section 30 of the cylindrical body 29 of the cover 18, constructed as described above, is fixed to the axially inner end portion of the outer ring 1 by way of interference fitting, so that the cover 18 covers the opening at the axially inner end of the outer ring 1. Moreover, in this condition, the end surface of the opening portion of the main body 28, or in other words, the end surface of the cylindrical wall 36 around the outer peripheral edge of the main body 28, comes into contact with the axially inner end surface of the outer ring 1. A groove is formed all the way around the end surface of the cylindrical wall 36, and an O-ring 33 is fastened inside this groove. When tie end surface of the cylindrical wall 36 is in contact with he axially inner end surface of the outer ring 1, the O-ring 33 is elastically compressed between this axially inner surface of the outer ring 1 and the bottom of the groove in the cylindrical wall 36 and seals the connection between the cover 18 and outer ring 1 to prevent foreign matter, such as muddy water, from getting inside the cover 18. On the other hand, the encoder 3 fits around the axially inner end (right end in FIG. 1) of the inner ring 7, which together with the hub 2, forms the rotating ring assembly. This encoder 3 comprises a support ring 34 and permanent magnet 35. Of these, the support ring 34 is formed into a circular-ring shape having an L-shaped cross section by bending magnetic sheet metal such as SPCC, and is attached to the axially inner end of the inner ring 7 by way of interference fitting. Moreover, the permanent magnet 35 is formed by providing e.g through molding the axially inner surface of the support ring 34 with a rubber that is impregnated with ferite powder or the like. This permanent magnet 35 is magnetized along the axial direction (left and right in FIG. 1), such that the polarity alternates at equal intervals around in the circumferential direction. Accordingly, he South and North poles alternate at equal intervals in the circumferential direction on the axially inner surface of the encoder 3.

Moreover, in part of the bottom plate 37 of the main body 28 which forms the cover 18, an insert hole 38 is formed in the section which faces the axially inner surface of the permanent magnet 35 of the encoder 3, and it passes through the bottom plate 37 along the axial direction of the outer ring 1. The tip end portion of the sensor unit 39 is inserted in this insert hole 38. The sensor unit 39 corresponds to a sensor or a holder which holds the sensor. This sensor unit 39 comprises a magnet detection element, such as a Hall element or magnet resistance element (MR element), whose characteristics change according to the direction of the flowing magnetic flux, an IC which contains a wave shaping circuit for shaping the output wave of the magnet detection element, and a magnetic pole piece for guiding the magnetic flux from the permanent magnet 35 (or that is flowing through the permanent magnet 35) to the magnet detection element, all of which are embedded in synthetic resin. Also, a harness 46 is provided so that the signal output as a shaped wave form from the IC is sent to the controller (not shown in the figure), and the end of the harness 46 is connected directly to the sensor unit 39 with no connector used. Accordingly, it is possible to reduce the cost of a rolling-bearing unit with rpm detector, by the cost of the connector omitted.

This kind of sensor unit 39 has a circular column-shaped insert section 40 which is located on a portion closer to the tip end (left end in FIG. 1) of the sensor unit 39, and an outward facing, flange-shaped rim portion 41. The insert section 41 can be inserted freely without any play, into the insert hole 38, and the rim portion 41 is used for positioning and formed on the base end (right end in FIG. 1) of this insert section 40. A groove for engagement is formed around the outer surface in the middle of the insert section 40, and an O-ring 42 is fastened in that groove. When the insert section 40 is inserted through the insert hole 38, the O-ring 42 is elastically compressed between the inner peripheral surface of the insert hole 38 and the bottom of the groove, forming a seal between the outer peripheral surface of the insert section 40 and the inner peripheral surface of the insert hole 38. In other words, the O-ring 42 prevents foreign matter, such as muddy water, from passing through thee insert-hole 38 to get inside the cover 18 and outer ring 1 In this way, the joint between the stationary ring or outer ring 1 and cover 18 is sealed by O-ring 33, and the inserted section of the sensor unit 39 onto the cover 18 is sealed by O-ring 42, so as to prevent foreign matter from getting into the rolling-bearing unit, making it possible to secure the durability of the rolling-bearing unit, prevent foreign matter, such as magnetic powder, from adhering to the sides of the permanent magnet 35 which forms the encoder 3, and maintain the accuracy of the rpm detection. If an X-ring, which has an X-shaped cross section, or any other seal ring is used in the place of the O-ring as a seal ring for sealing the inserted section of the sensor unit 39 into the cover 18, it is possible to reduce the force required for inserting the insert section 40 of the sensor unit 39 into the insert hole 38, thus making installation of the sensor limit 39 easier On the outer hand, on part of the outside surface of the bottom plate 37 of the cover 18 (right side in FIG. 1, and the side surface, opposite to the space 43 where the rolling bodies 9 are located, and which should be covered by the cover 18), a cylindrical body 44 for engagement is formed in the area that surrounds the opening of the insert hole 38. The inner peripheral surface of this cylindrical body 44 forms a single cylindrical surface together with the inner peripheral surface of the insert hole 38. Moreover, in this embodiment, the side surface on the end of the opening portion of the cylindrical body 44 corresponds to the edge around the opening of the insert hole 38. Also, on the outer peripheral surface of the cylindrical body 44, concave sections 45 are formed in two locations on opposite sides in the diametrical direction. These concave sections are sufficiently wider than the outer diameter of the wire material of the coupling spring 47 (described later). On one side of each concave section 45 specifically on the inside surface closer to the end of the cylindrical body 44 (right side in FIG. 4), a groove 48 is formed in an arc-shaped cross section along the entire width of the concave sections 45. The radius of curvature of these grooves 48 is the same as or a little larger than the radius of curvature of the outer peripheral surface of the wire material that forms the coupling spring 47.

The flanged portion or rim portion 41, which is formed at the base of the sensor unit 39 and which acts as a positioning unit, comes in contact with the side surface on the end (right end in FIG. 1) of the cylindrical body 44 that is formed as described above, and is fastened to the cylindrical body 44 by a coupling spring 47 (described later). This spring 47 is made of stainless spring steel, or spring steel that has been treated with chrome or zinc plate, or another a wire material that is elastic and rust proof and formed by a bending process. If a wire material is used that has been plated, it is dehydrogenated to prevent delayed failure. This spring 47 comprises a pair of legs 49 for engagement, a retainer section 50 and a pair of connection sections 51. The pair of legs 49 become parallel to each other when installed in the cylindrical body 44 The retainer section 50 is provided for retaining the flanged portion 41 to the end surface of the cylindrical body 44, and the pair of connection sections 51 is provided to connect both ends of the retainer 50 to the base (upper right end in FIG. 5) of the legs 49 The retainer section 50 has a U-shaped curved portion 52 in the center, and a pair of straight portions 53 bent in opposite directions from both ends of die curved portion 52. The connection sections 51 are bent at one end thereof in the same direction from these straight portions 53.

When using this kind of coupling spring 47, the plane which includes the pair of legs 49 is parallel to the plane which includes the retainer 50, at least during use. However, an elastic force is applied in the direction which decreases the angle of the transition portion where one end of the connection section 51 connects with the base of the legs 49 in order to reduce the space between these planes when this coupling spring 47 is free. Moreover, the space $D_{49}$, (see FIG. 5) between the main portions of legs 49 becomes less than the space $D_{45}$ (see FIG. 4) between the concave sections 45. That is $D_{49} < D_{45}$. Furthermore, the tip ends of both legs 49 are bent outward in opposite directions, and the space between at the ends of both legs becomes larger in the direction toward the tip end of the legs 49. In other words, the closer to the tip end of the legs 49 the larger the space between the legs 49 is.

Figure 3:
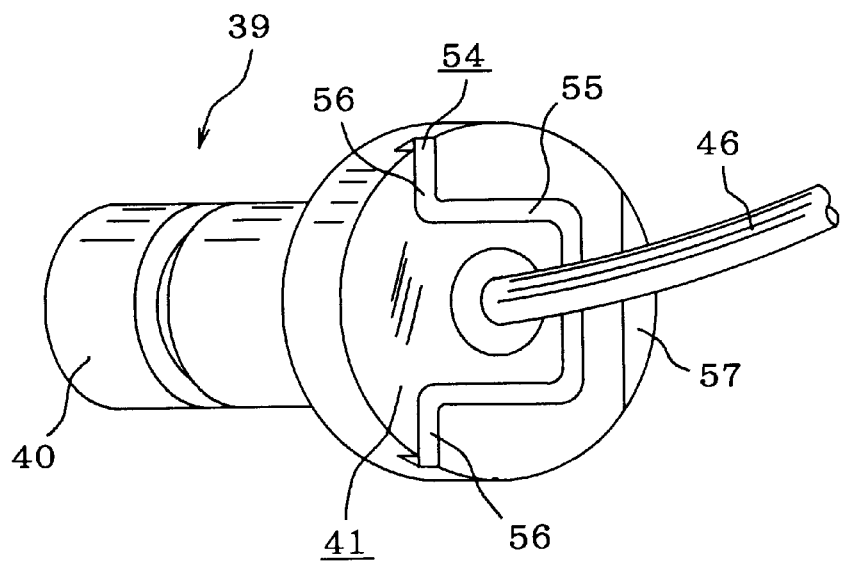
FIG. 3 is a perspective view of the end portion of the harness and the sensor unit used in the rolling bearing of FIG. 1.

On the other hand, a groove 54 for retaining the spring 47 is formed in the base end face of the flanged portion 41 formed around the sensor unit 39 (surface opposite the insert section 40, surface on the right end in FIG. 1, and the surface in the front in FIG. 3) so that the retainer section 50 of the spring 47 fits firmly without play in the groove 54. This groove 54 comprises a curved or bent section 55 which goes around the base end of the harness 46, and straight sections 56 that are bent outward from the opposite ends of the curved section 55 in opposite directions and open to the outer peripheral edge of the flanged portion 41. Moreover, an inclined surface 57 is formed on part of the base end face of the flanged portion 41 which faces the convex side of the curved section 55. This inclined plane 57 slants in a direction such that the thickness of the flanged portion 41 becomes thinner in the direction toward the edge of the flanged portion 41. In other words, the closer to the peripheral edge of the flanged portion 41 the thinner the thickness of the flanged portion 41.

The work to install the sensor unit 39 and attach it to the cover 18 when combining each member described above to construct the rolling-bearing unit with rpm detector of this invention, is performed as follows. First, the insert section 40 closer to the tip end of the sensor limit 39 is inserted into the cylindrical body 44 and into the insert hole 38 until the flanged portion 41 comes in contact with the tip end surface of the cylindrical body 44. The dimension of each part is regulated so that a small clearance of desired width (for example 0.5 mm) exists between the detection section on the end surface of the insert section 40 of the sensor unit 39 and the axially inner surface of the permanent magnet 35 of the encoder 3. Next, the coupling spring 47 is placed between the cylindrical body 44 of the cover 18 and the sensor unit 39 to press the flanged portion 41 against the tip end surface of the cylindrical body 44.

The work of installing the coupling spring 47 between the cylindrical body 44 of the cover 18 and the sensor unit 39 is performed by inserting first the ends of and then the main portion of the pair of legs 49 of the spring 47 into the concave sections 45 of the cylindrical body 44.. The space between the ends of both of these legs 49 becomes larger toward the tip end, so that the insertion process is simple. As the legs 49 are inserted, the straight sections 53 of the retainer section 50 moves over the inclined plane 57 formed on the flanged portion 41. In this state, if insertion is continued, the retainer section 50 fits into the groove 54 formed on the base end surface of the flanged portion 41. When inserting it, the space between the pair of connection sections 51 that are nearest the retainer 50 is made a little larger than the outer diameter of the flanged portion 41, so that the parts of the pair of connection sections 51 which face the outer peripheral edge of the flanged portion 41 do not interfere with the outer peripheral edge of the flanged portion 41.

With the retainer section 50 fit into the groove 54, the coupling spring 47 press the flanged portion 41 against the end surface of the cylindrical body 44 with adequate force (for example, 10 kgf), and couples the sensor unit 39 with the cover 18. Moreover, in this state, depending on the fit of the legs 49 in the grooves 48 and the fit of the retainer section 50 in the groove 54, the coupling spring 47 will not accidentally come apart from the sensor unit 39 and cylindrical body 44. As a result, the sensor out 39 will not accidentally come apart from the cover 18.

To remove the sensor unit 39 from the cover 18, following the above procedure in the reverse order. First, the coupling spring 47 is removed from between the cover 18 and the sensor unit 39. When doing this, first the retainer section 50 is lifted from the base end surface of the flanged portion 41, then the pair of legs 49 are pulled out from the concave sections 45. After the spring 47 has been removed, the insert section 40 of the sensor unit 39 is removed from the insert hole 38 and from the inside of the cylindrical body 44.

Installing or removing the coupling spring 47 from between the cylindrical body 44 of the cover 18 and the sensor unit 39 can be performed relatively easily and quickly when compared with having to fasten and unfasten setscrews. Moreover, with this invention, including this embodiment and the following embodiments, tie amount of work required for installing or removing the sensor unit 39 from the cover 18 is reduced, and makes it possible to reduce the cost of the rolling-bearing unit with rpm detector as well as reduce the cost of repair.

Figure 4:
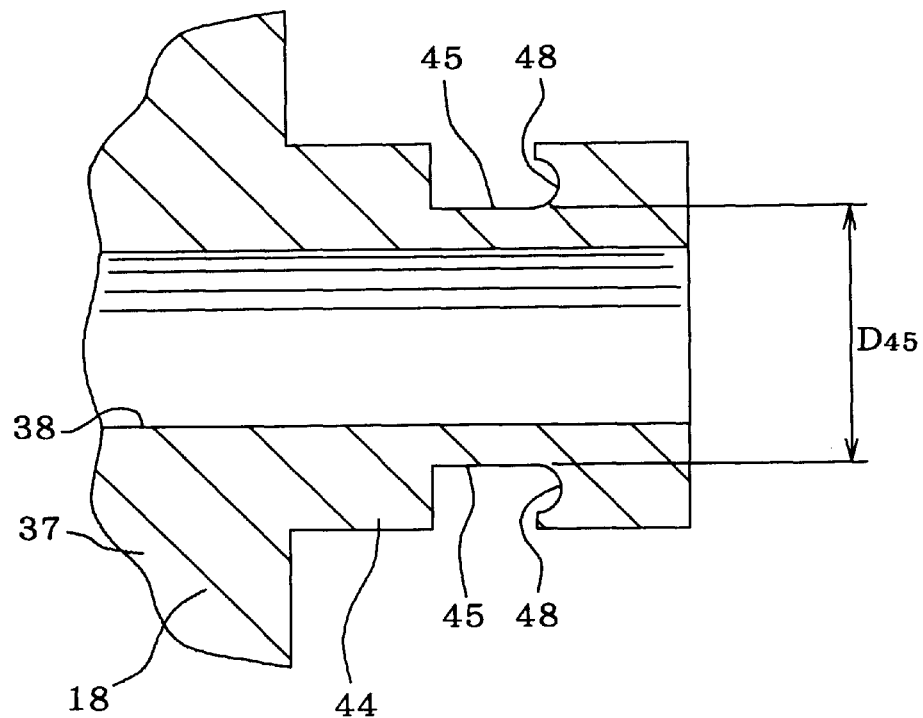
FIG. 4 is a cross sectional view of the portion IV in FIG. 1.
Figure 5:
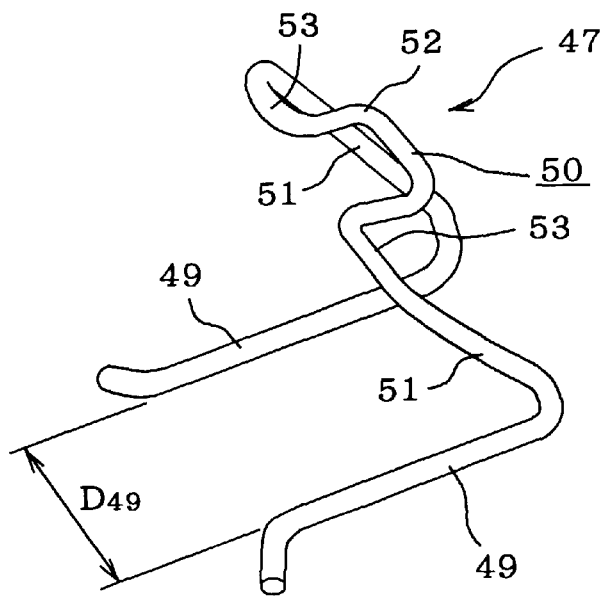
FIG. 5 is a perspective view of a coupling spring to connect the sensor unit and the cover.

In the explanation above, together with making the space $D_{49}$ between the pair of legs 49 of the coupling spring 47 in a free state smaller than the space $D_{45}$. Between the pair of concave sections 45 formed on the outer peripheral surface of the cylindrical body 44, the grooves 48 are formed in the concave portions 45. However, if the space $D_{49}$ is smaller than the space $D_{45}$, the grooves 48 are not necessary. For example, as shown in FIG. 1, if the concave sections 45 are formed in a grooved shape that just allows the legs 49 to fit firmly, it is possible to prevent the legs from accidentally coming out of the concave portions 45. Conversely, if grooves 48 are formed, it is possible to prevent the legs 49 from accidentally coming out of the concave sections 45 even if the space $D_{49}$ is not smaller that the space $D_{45}$. Anyhow, the shapes and dimensions shown in FIGS. 4 and 5 are desirable in order to maintain adequate strength in the joint between the cover 18 and sensor unit 39 by the spring 47 and make it easier to install or remove the spring 47.

Figure 6:
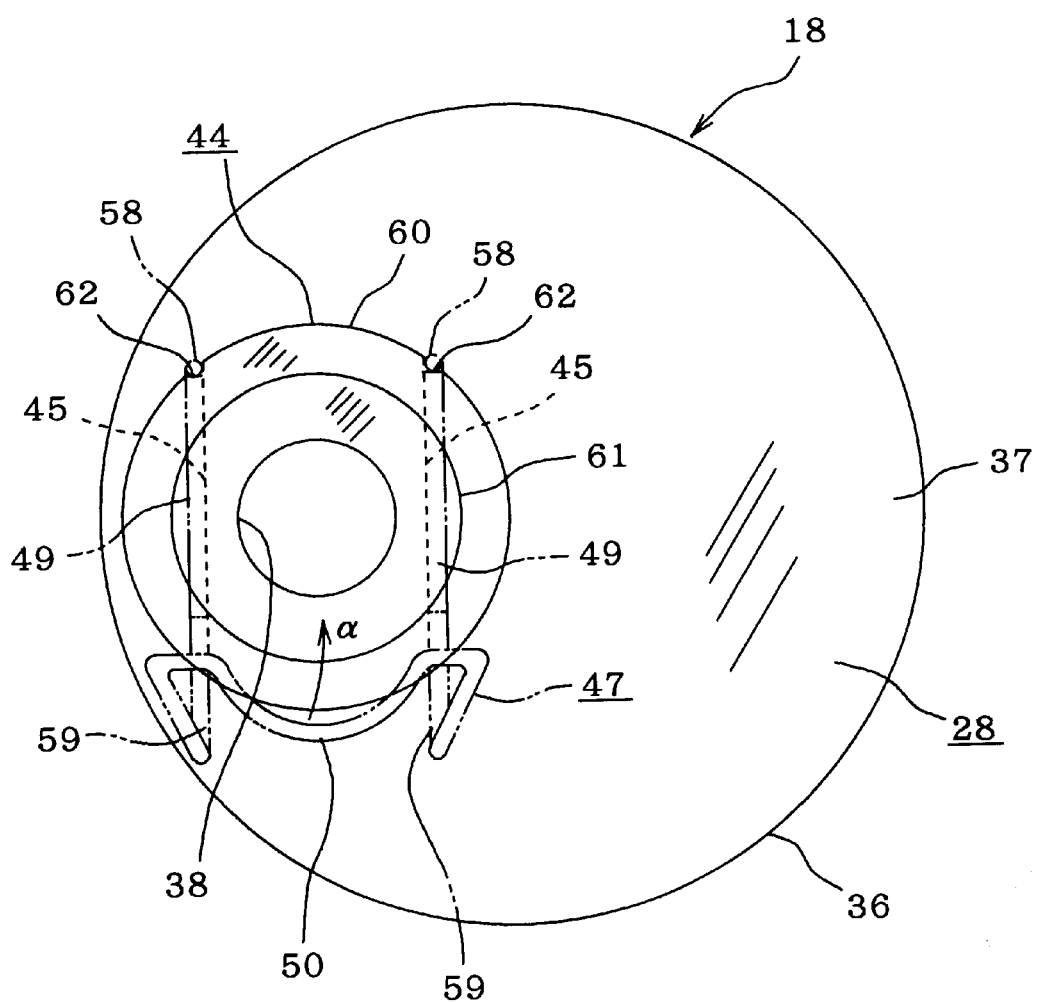
FIG. 6 is a front elevational view of a cover in another example of the present invention.
Figure 7:
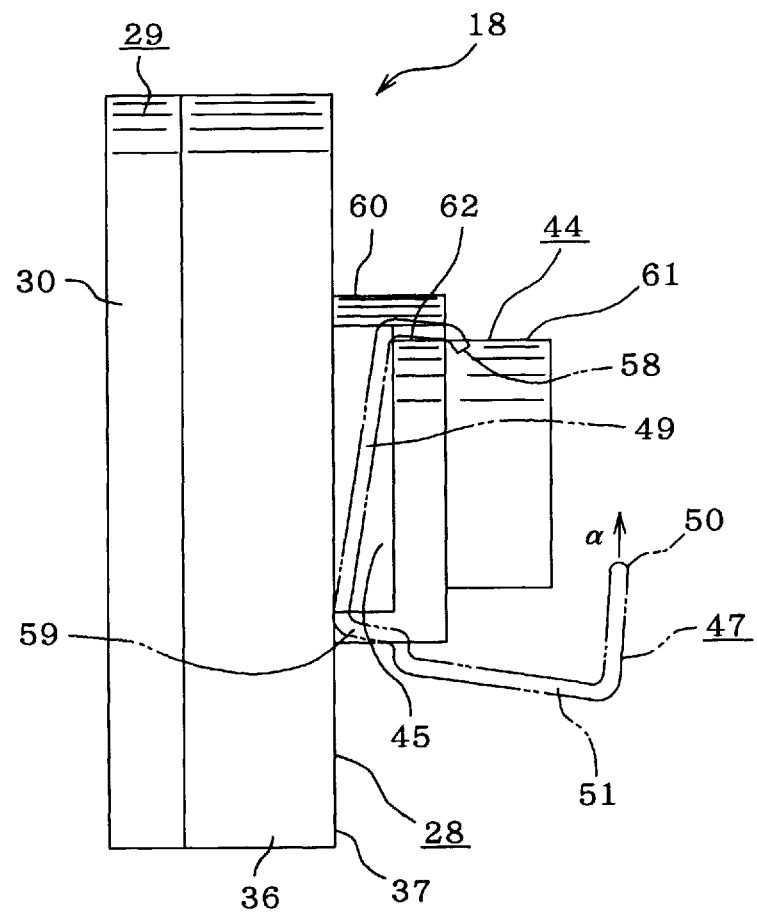
FIG. 7 is a left side elevational view of the cover of FIG. 6.
Figure 8:
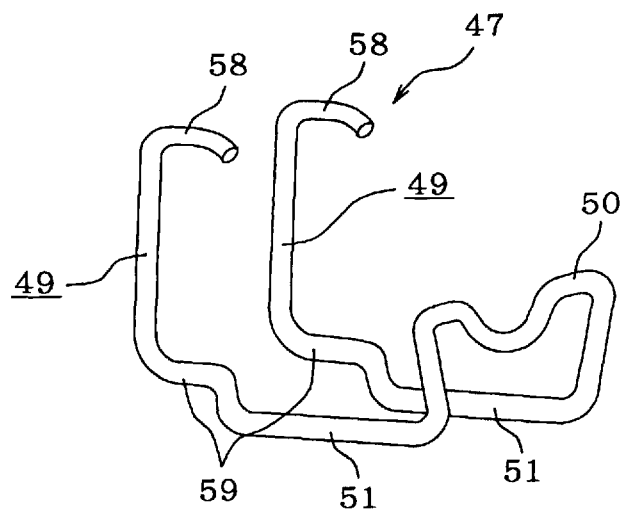
FIG. 8 is a perspective view of a coupling spring to connect the sensor unit and the cover.

Next, FIGS. 6 thru 8 show a second embodiment of the invention. In this embodiment, the cylindrical body 44 which is formed on the axially inner surface of the cover 18 comprises a larger diameter section 60 that is the base section (left in FIG. 7), and a smaller diameter section 61 that is the tip section (right in FIG. 7). Concave sections 45 are formed at two locations on opposite sides in the diametrical direction on the outer peripheral surface of the base-end half of the larger diameter section 60. The width of these concave sections 45 (dimension in the left and right direction in FIG. 7) is made sufficiently larger than the outer diameter of the wire material of the spring 47. On the other hand, bent sections 58 are formed on the the ends of the legs 49 which are bent toward in the direction of the tip end of the cylindrical body 44, and bent sections 59 are formed on the base end of the legs 49 which are bent toward in the direction of the tip end of the cylindrical body 44. Moreover, one end of connection sections 51 is connected to the base end of the legs 49, and the other end of the connection sections 51 is connected to a retainer 50 which is bent in the same direction as the legs 49.

The legs 49 of the spring 47 described above, loosely fit on the inside of the concave sections 45, and the bent sections 58 fit in cutouts 62, which are formed on part of the outer peripheral surface of the tip end half of the larger-diameter section 60 in alignment with one end (upper end in FIGS. 6 and 7) of the concave sections 45. The tip ends of bent sections 58 are bent a little in the direction of legs 49 and the tip ends of the bent sections 58 are fitted onto the tip end surface (right surface in FIG. 7) of the larger-diameter section 60. In this state, the spring 47 is supported by the cylindrical body 44 at one side thereof so that it can rock freely. Moreover, with this rocking, the retainer section 50 freely moves in the direction of the opening of the cylindrical body 44 or the opening of the insert hole 38. When actually installed in a vehicle with the sensor unit 39 not installed (see FIGS. 1 and 3), the spring 47 rocks into the position shown by the dotted lines in FIGS. 6 and 7 by its own weight, and the retainer section 50 moves away from the opening of the cylindrical body 44.

The sensor unit 39, which is connected to the cylindrical body 44 constructed as described above, with the spring 47 as described above, is constructed the same as that shown in FIGS. 1 thru 5 of the first embodiment. In order to attach and hold this sensor unit 39 on the inside of the cylindrical body 44, the insert section 40 of the sensor unit 39 is inserted into the insert hole 38 inside the cylindrical body 44 when the retainer section 50 is moved away from the opening on the cylindrical body 44 as shown by the dotted lines in FIGS. 6 and 7, and the flanged portion 41 comes in contact with the end surface of the cylindrical body 44. Next, if the retainer section 50 is pushed upward in the direction of the arrow α as shown in FIG. 6 and 7, the retainer section 50 fits in the groove 54 formed in the base end surface of the flanged portion 41 (Refer to FIGS. 1 and 3 for the parts of the sensor unit 39). Conversely, when removing the sensor unit 39 from the cover 18, the retainer section 50 is moved in the direction opposite of that shown by the arrow α to move this retainer section 50 away from the opening of the cylindrical body 44, then the insert section 40 of the sensor limit 39 is pulled out from the insert hole 38 on the inside of the cylindrical body 44.

Figure 9:
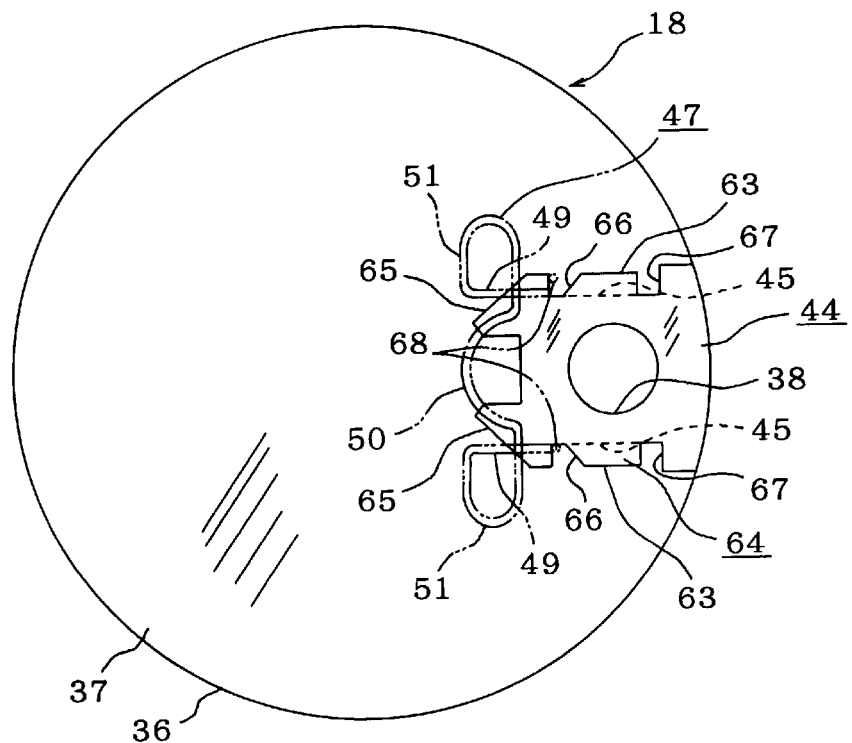
FIG. 9 is a front elevational view of a cover in another example of the present inventions
Figure 10:
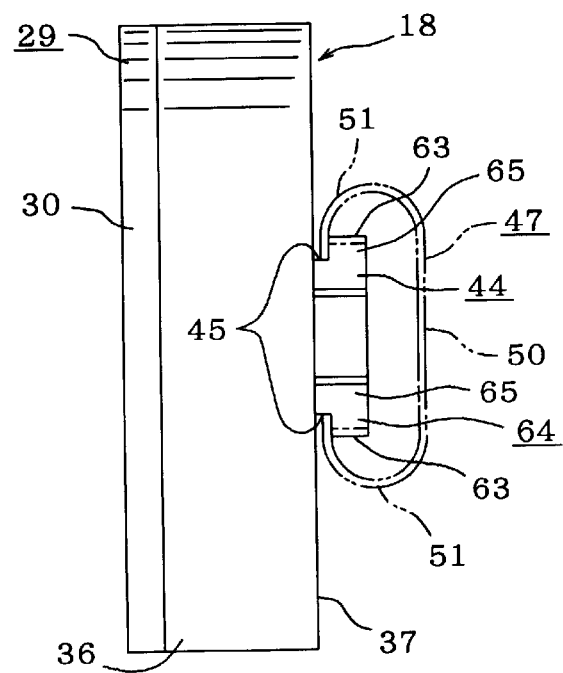
FIG. 10 is a left side elevational view of the cover of FIG. 6.
Figure 11:
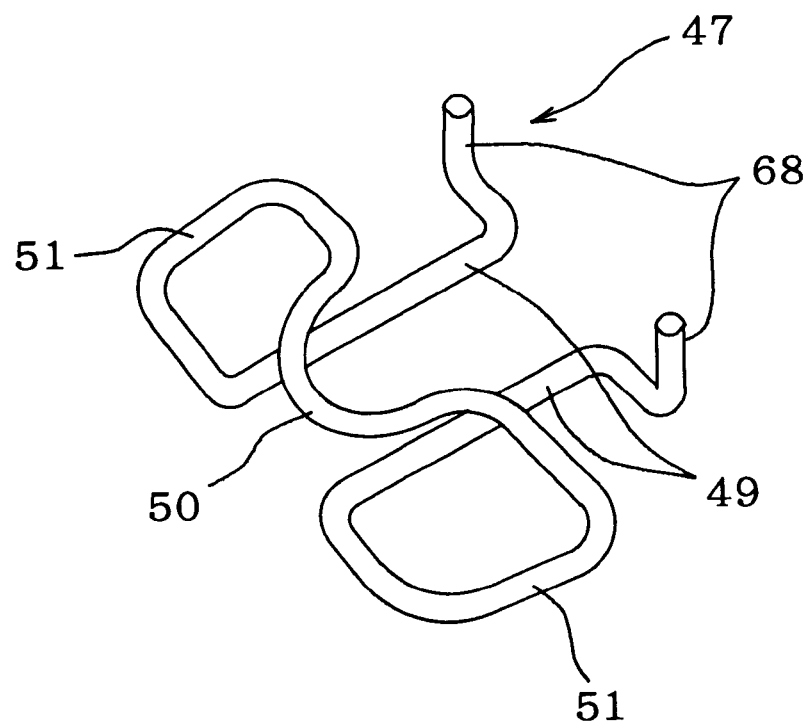
FIG. 11 is a perspective view of a coupling spring to connect the sensor unit and the cover.
Figure 12:
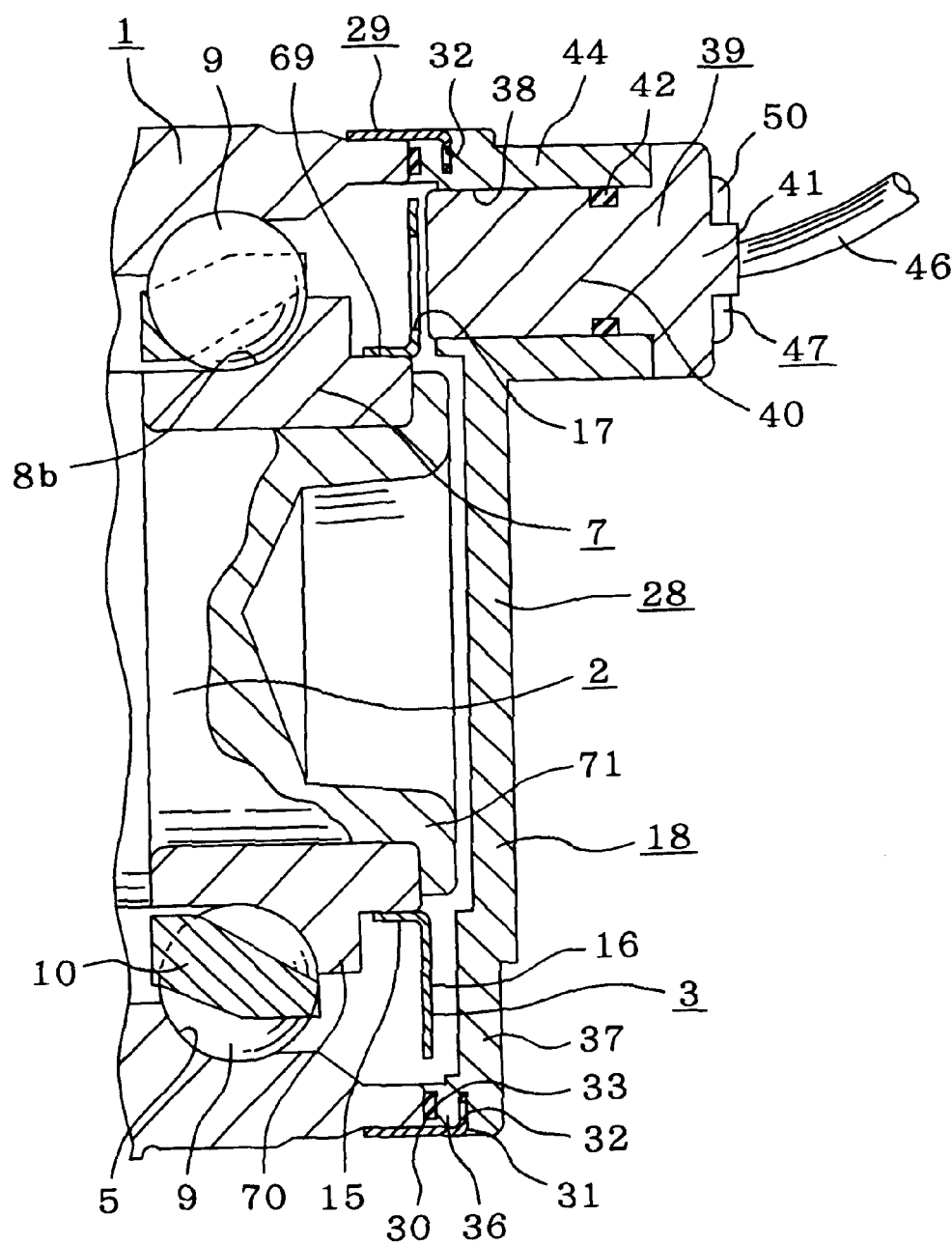
FIG. 12 is a cross sectional view of the axially inner portion of the rolling bearing to show another embodiment of the present invention.
Figure 13:
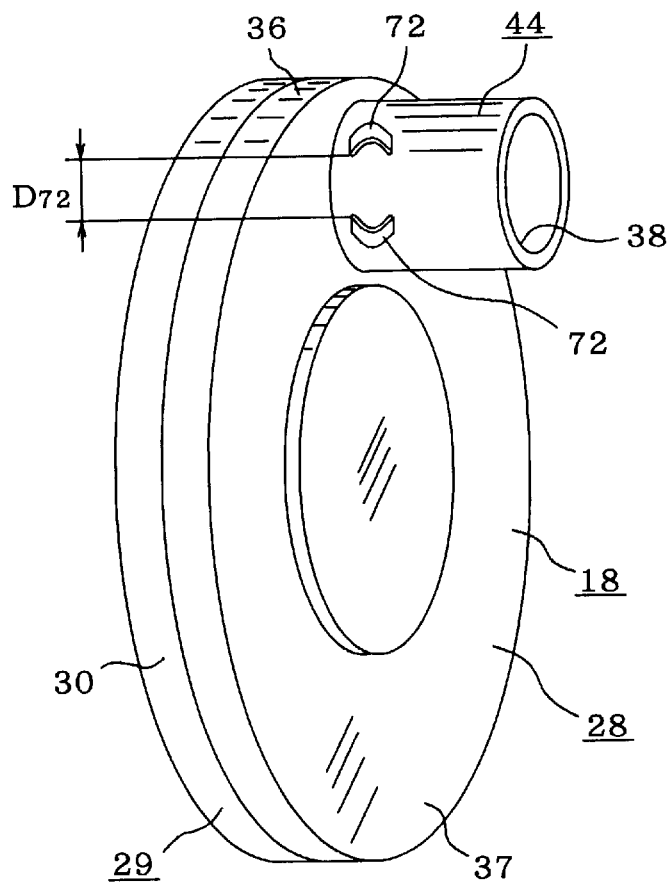
FIG. 13 is a left side elevational view of the cover of FIG. 6.

Next a third embodiment of the invention is shown in FIGS. 9 thru 11. In this embodiment, a flanged portion 64 with a pair of parallel straight edges 63 is formed on the outer peripheral surface on the tip end side of the cylindrical body 44. In the case of this embodiment, the spaces between the outside surface of the cover 18, and the inside surface of the flanged portion 64, specifically of the straight edges, form the concave sections 45 for attaching the ends of the legs 49 of the spring 47 to be described later in FIG. 11. Moreover, a pair of inclined edges 65 are formed on one end (left end in FIG. 9) of the flanged portion 64, such that the width (vertical direction in FIGS. 9 and 10) of the flanged portion 64 becomes smaller in the direction of the edge. Also, provided at two locations on the straight edges 63 are first cutouts 66 and second cutouts 67 which are in alignment with each other. Of these, the first cutouts 66, which are formed on the sides of the inclined edges 65, have one side edge which is inclined such that it is closer to the second cutouts 67 as it is closer to the edge (upper or lower edge in FIG. 9) of the flanged portions 64. On the other end of the flanged portions 64 (right end in FIG. 9), the width (vertical direction in FIG. 9) of the portion defining one side of the second cutouts 67 (right side in FIG. 9) is larger than the width of the section between the first and second cutouts 66, 67.

On the other hand, the coupling spring 47 used for connecting the cover 18, as described above, with the sensor unit 39 (see FIGS. 1 and 3) comprises a pair of legs 49, and a retainer section 50 that is suspended between this pair of legs 49. Both ends of this retainer section 50 and the tip ends of the pair of legs 49 (left end in FIG. 9 and bottom left end in FIG. 11) are connected by a curved connection sections 51. These connection sections 51, in a free state, have a spring force in the direction that brings both ends of the retainer section 50 toward the pair of legs 49.

Furthermore, bent sections 68 which bend toward the flanged portions 64 are formed on the base ends of the legs 49 (right end in FIG. 9 and upper right ends in FIG. 11). Ea the example shown in the figures, the space between the pair of bent sections 68 is made to be larger than the space between the legs 49. The reason for this is to maintain the depth of the engagement between the legs 49 and the concave sections 45, and to maintain the connection strength between the spring 47 and the sensor unit 39, as well as to prevent the coupling force between the bent sections 68 and the first and second cutouts 66, 67 from becoming to large.

The spring 47, shaped as described above, is supported by the cylindrical body 44 so that it can freely move parallel with the straight edges 63. In this state, as the spring 47 moves, the retainer section 50 can move away from and toward the opening of the cylindrical body 44 which is along the opening of the insert hole 38. When actually installed in a vehicle, with the sensor unit 39 not installed, the spring 47 functions such that in the direction of the chain lines shown in FIG. 9, with the bent sections 68 engaged with the first cutouts 66, the retainer section 50 is moved away from the opening on the cylindrical body 44. The rolling-bearing unit is then delivered from the manufacturer to the vehicle assembly plant with the bent section 68 engaged with the first cutouts 66. In this state, the spring 47 will not stick out in the radial direction from the outer peripheral surface of the cover 18. Therefore, the spring 47 does not interfere with the process for supporting the rolling-bearing unit on the vehicle suspension mount while inserting the cover 18 into the knuckle support hole (not shown in the drawings).

The sensor unit 39, that is connected to the cylindrical body 44 by the spring 47 as described above, is formed the same as that shown in FIGS. 1 thru 5 for embodiment 1. To hold and fasten this sensor on the inside of the cylindrical body 44, the retainer section 50 is moved away from the opening of the cylindrical body 44 as shown by the chain lines in FIG. 9, and the insert section 40 of the sensor unit 39 is inserted into the insert hole 38 on the inside of he cylindrical body 44, until tie flanged portion 41 of the sensor unit 39 comes in contact with the end surface of the cylindrical body 44. Next, the retainer section 50 is pushed to the right as shown in FIG. 9 (radially outside direction), until the retainer section. 50 is engaged with the groove 54 formed on the base end surface of the flanged portion 41 (refer to FIGS. 1 and 3 for details about parts of the sensor unit 39). With the retainer section 50 fitted in the groove 54, the bent sections 68 are engaged with the second cutouts 67.

When connecting the sensor unit 39 to the cover 18 with the spring 47, the bent sections 68 move from the first cutouts 66 to the second cutouts 67. It is easy to move the spring 47 due to the inclined edges on one side of the first cutouts 66. Moreover, the width (vertical direction in FIG. 9) of the other end (right end in FIG. 9) of the flanged portions 64 is larger than the width of the first cutouts 66 and second cutouts 67 adjacent the first cutouts 66, so the bent sections 68 can not be moved past the second cutouts 67.

The sensor unit 39 is removed from the cover 18 by performing the above procedure in tile reverse order, by moving the spring 47 to the left as shown in the figure until it is in the position shown by the chain lines in FIG. 9. To move the spring 47, the retainer section 50 is lifted up from the base end surface of the flanged portion 41, and by opening the space between the bent sections 68. The retainer section 50 is then moved away from the opening of the cylindrical body 44, and the insert section 40 of the sensor unit 39 is pulled out from the insert hole 38 on the inside of the cylindrical body 44.

Next, a forth embodiment of the invention is shown in FIGS. 12 thru 16. In this embodiment, the sensor unit 39 is connected to the cylindrical body 44 of the cover 18 using a pair of springs 47. Therefore, two support pieces 72 in a set are formed, separated from each other, at two locations on opposite sides in the diametrical direction on the outer peripheral surface of the cylindrical body 44. These support pieces 72 are formed with an arc shape, so that the tip end or pivot supports 73 are formed on both ends of the spring 47 to be described later can be supported so they freely rock on the inside of the support pieces 72. This pair of support pieces 72 are formed on opposite sides in the circumferential direction on the outer peripheral surface of the cylindrical body 44, so that there is no interference of the springs 47 with other parts as the pair of springs 47 pivotally supported by these support pieces 72 rock.

Figure 15:
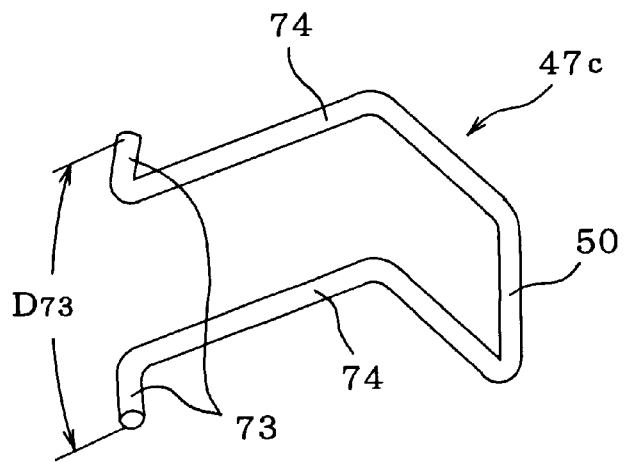
FIG. 15 is a perspective view of one of a pair of coupling springs in FIG. 13.

The pair of springs 47 have a straight retainer section 50, a pair of pivot supports 73 and a pair of elastic legs 74 that are bent into a "V" shape to connect the retainer section 50 to the pair of supports 73, as shown in FIG. 15. The elastic legs 74 are elastically deformed in the direction of elongation, when a tensile force is applied, making it possible for the retainer section 50 and the supports 73 to be separated from each other. The pair of pivot supports 73 on both ends of the coupling springs 47 are oriented to conform with the support pieces 72 which support both pivot supports 73, causing the pivot supports 73 to be slanted, respectively. Moreover, the space $D_{73}$ between the tip ends of the pair of supports 72 in a free state is sufficiently larger than the space $D_{72}$ between the pair of pivot support pieces 73. That is $D_{73} > D_{72}$.

On the other hand, a pair of parallel grooves 54 are formed on the base end surface of the flanged portion 41 of the sensor unit 39 with the harness 46 located therebetween. The retainer sections 50 of the springs 47 fit firmly into these grooves 54. Moreover, on opposite sides in the radial direction of the base end surface of the flanged portion 41, inclined surfaces 57 are formed on the outer peripheral side of the grooves toward the edges, such that the thickness of the flanged portion 41 becomes smaller toward the edge of the flanged portion 41 from the grooves 54.

To hold and fasten the sensor unit 39 described above inside the cylindrical body 44, first the pivot supports 73 of the pair of springs 47 are engaged with the pair of support pieces 72, respectively this work can be easily performed in a wide space. By rocking the pair of springs 47 toward the side of the cylindrical body 44, the retainer sections 50 are moved away from tile opening of the cylindrical body 44, and in the state, the insert section 40 of the sensor unit 39 is inserted into the insert hole 38 on the inside of the cylindrical body 44 until the flanged portion 41 comes in contact with the tip end surface of the cylindrical body 44. In this state, the dimensions of each part are regulated so that the minute specified space exists between the detector on the tip end surface of the insert section 40 of the sensor unit 39, and the axially inner surface of the circular ring portion 16 of the encoder 3. Next, the pair of coupling springs 47 are rocked in the direction which brings the retainer sections 50 closer to the flanged portion 41, so that the retainer sections 50 are engaged with the pair of grooves 54 formed on the base end surface of the flanged portion 41. When doing this, the elastic legs 74 will elastically stretch due to the engagement of the retainer sections 50 and the inclined surfaces 57. Also, when the retainer section 50 are in alignment with the grooves 54, the entire length of the elastic legs 74 elastically shrinks, to keep the engagement of the retainer sections 50 and grooves 54. The sensor unit 39 is removed from the cover 18 by following the above procedure in the reverse order. The springs 47 are rocked toward the side of the cylindrical body 44 and the retainer sections 50 of the springs 47 are removed from the grooves 54. By moving the retainer sections 50 away from the opening of the cylindrical body 44, the insert section 40 of the sensor unit 39 can be pulled out from the insert hole 38 on the inside of the cylindrical body 44.

In this embodiment an encoder 3, which is identical to that used in the prior construction shown in Japanese Utility Model Publication JITSUKAI HEI No. 7-31539, is fitted around the axially inner end of the inner ring 7, which together with the hub 2, makes lip the rotating ring assembly. Particularly in the construction of this embodiment, a small-diameter stepped section 69 is formed on the part of the axially inner end of the inner ring 7 that sticks out in the axial direction from the inner-ring raceway 8, and is concentric with the inner ring 7

Also, the cylindrical section 15 of the encoder 3 fits around the stepped section 69. The reason for forming this kind of stepped section 69 is that it is not necessary to increase the diameter of the cover 18 and that the encoder 3 faces the tip end surface of the insert section 40 of the sensor unit 39.

In other words, in order that the rolling members 9 do not come out of the inner-ring raceway 8b formed around the outer peripheral surface of the inner ring 7, even when a large thrust load or moment load is applied to the rolling-bearing unit, a shoulder 70 with adequately large outer diameter must be formed on the portion sticking out in the axial direction from the inner-ring raceway 8 on the axially inner end of the inner ring 7. On the other hand, in order to detect the rpm of the rotating ring assembly, which includes the inner ring 7, the circular portion 16 of the encoder 3 midst ace the tip end surface of the insert section 40. By fitting the cylindrical section 15 of the encoder 3 around the shoulder section 70 itself, the diameter of the circular portion 16 becomes larger than necessary, and thus the diameter of the cover 18 which supports the sensor unit 39 facing this circular portion 16 may become larger than necessary. Therefore, by forming a stepped section 69 as described above, and fitting the encoder 3 around this stepped section 69, it is possible to prevent the diameter of the encoder 3 and cover 18 from becoming larger than necessary, and it is possible to make a more compact rolling-bearing unit with rpm detector. Of course this construction is not limited to only this embodiment, but could be equally applied to other embodiments as well.

Furthermore, in the embodiment shown in the figures, a cylindrical section 71 is formed on the axially inner end of the hub 2, and the inner ring 7 is connected and fixed to the hub 2 by expanding through crimping outward in the radial direction the portion sticking out from the axially inner surface of the inner ring 7 on the tip end of this cylindrical section 71. By adopting this kind of construction, it is possible to reduce the cost of the rolling bearing unit when compared with the prior connections of JP Publication HEI No. 7-31539 or the first embodiment of this invention shown in FIG. 1, by reducing number of parts and the amount of work required for assembly. When expanding the tip end of the cylindrical section 71 through crimping outward in the radial direction, force is applied outward in the radial direction to part of the inner ring 7. If this force is large, the diameter of the inner-ring raceway 8 could be changed, so as to change the preload applied to the rolling members 9. However, in this embodiment, most of the force, resulting from expanding the tip end of the cylindrical section 71 through crimping, is received by the stepped section 69 and is not applied to the inner-ring raceway 8. Therefore, there is hardly any change in the preload. This kind of construction can be applied to other embodiments as well.

In this embodiment, the encoder 3 used was made of magnetic material with multiple through holes 17 in the shape of slits formed around the circular ring section 16. Also, the construction of the sensor installed in the sensor unit 39 is different than that having a permanent magnet used as the encoder. However, the construction and use of this kind of sensor, has been known previously and is not related to the gist of this invention, so a detailed explanation of it will be omitted. In the case that an MR element is used in the sensor, the orientation of the MR elements must be regulated by the relationship of the longitudinal direction of the through holes 17 (radial direction of the circular section 16). In this embodiment, it is possible to regulate the direction of the sensor unit 39 with respect to the cover 18 by engagement between the retainer sections 50 and the grooves 54, and thus it is possible to regulate the orientation of the MR element by its relationship with the longitudinal direction of the through holes 17 without any special means for positioning.

Next, FIGS. 17 thru 20 show a fifth embodiment of the invention. In this embodiment, a pair of holes 75, that pass through the wall of the cylindrical body 44, are formed in the shape of slits on opposite sides in the diametrical direction of part of the cylindrical-body 44 formed in the cover 18. Also, grooves 76 are formed on opposite sides in the diametrical direction on part of the insert section 40 of the sensor unit 39. When the flanged portion 41 on the base end. (right end in FIGS. 17 and 19) of the sensor unit 39 comes into contact with the tip end surface of the cylindrical body 44, the holes 75 are nearly matched with the grooves 76, being shifted from each other just a little in the axial direction. In other words, in thus state, the dimensions are regulated such that the grooves 76 are just a little closer toward the tip end surface of the cylindrical body 44 than the holes 75 (toward the right in FIGS. 17 and 18).

Figure 20:
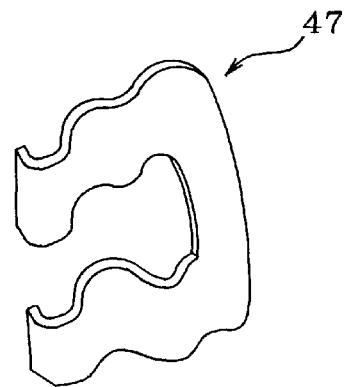
FIG. 20 is a perspective view of the coupling spring used for the cover of FIG. 18.
Figure 21:
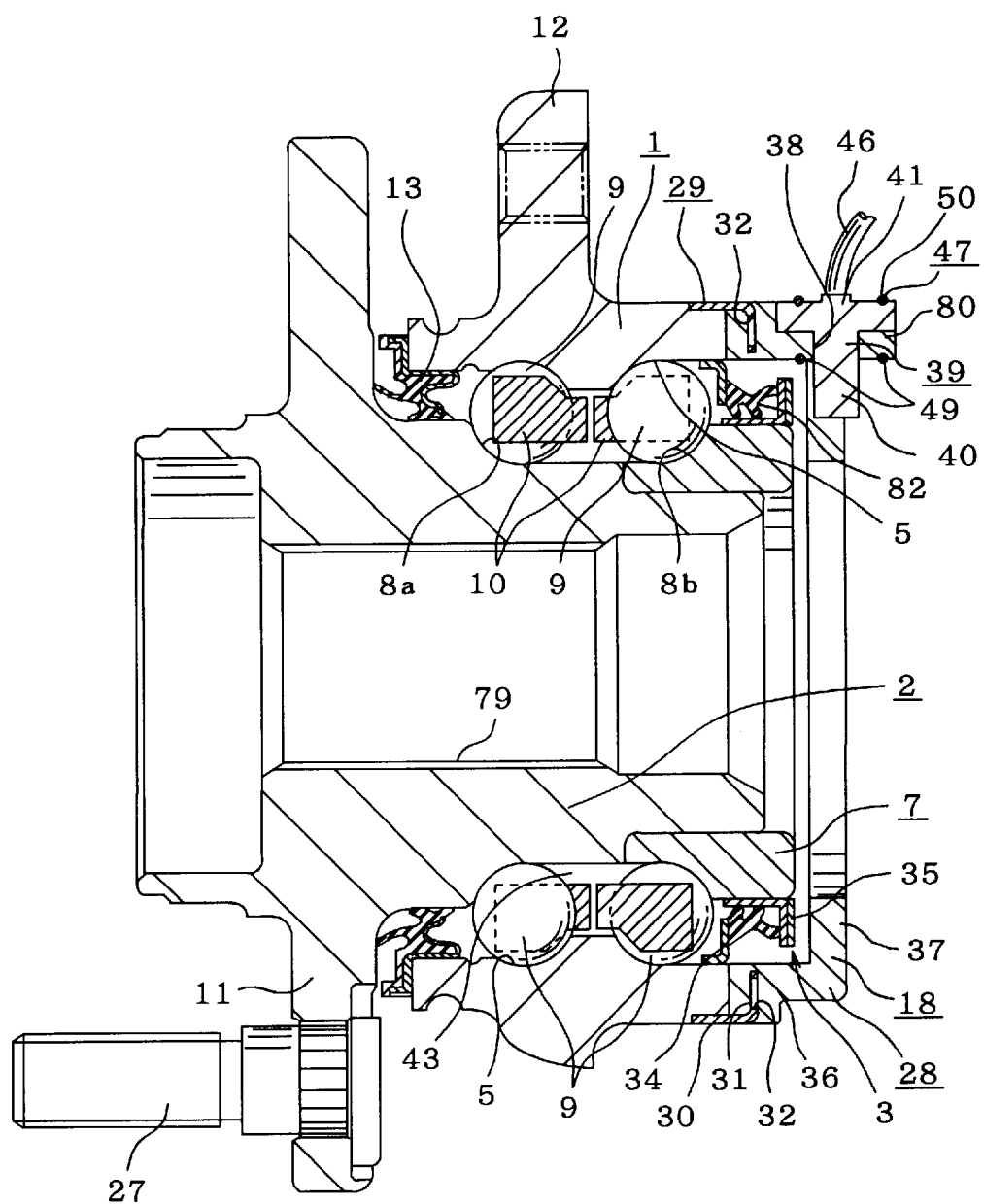
FIG. 21 is a cross sectional view of the rolling bearing unit in another embodiment of the present invention.
Figure 22:
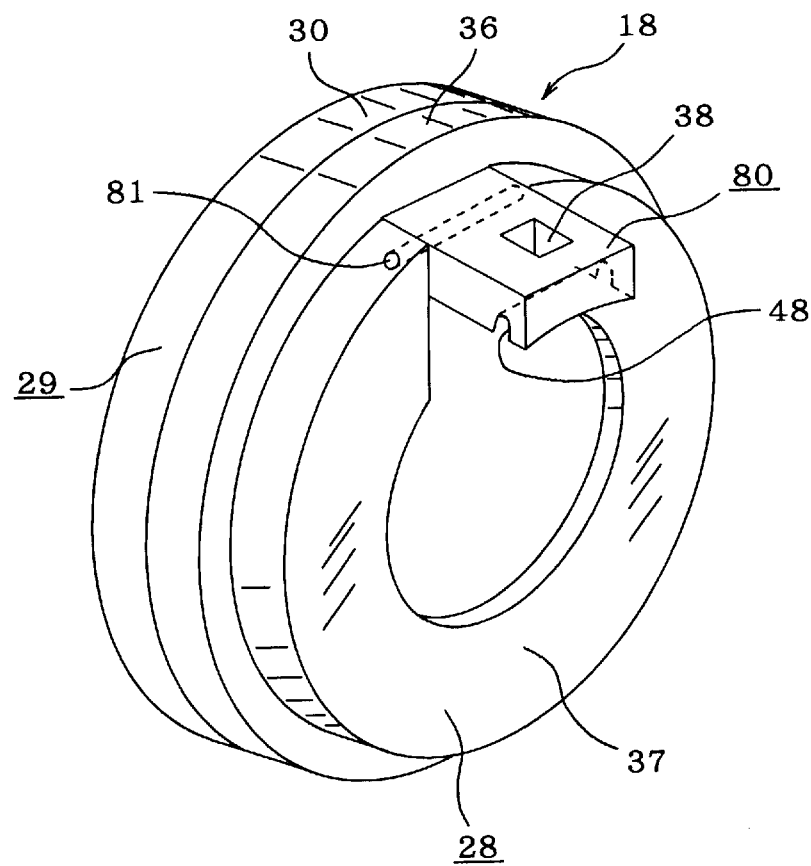
FIG. 22 is a perspective view of the cover used in the rolling bearing unit of FIG. 21.
Figure 23:
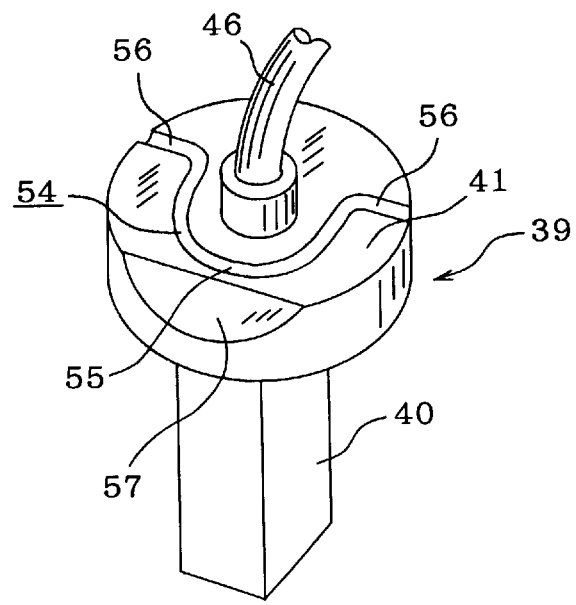
FIG. 23 is a perspective view of the end portion of the harness and the sensor unit used in the rolling bearing of FIG. 1.
Figure 24:
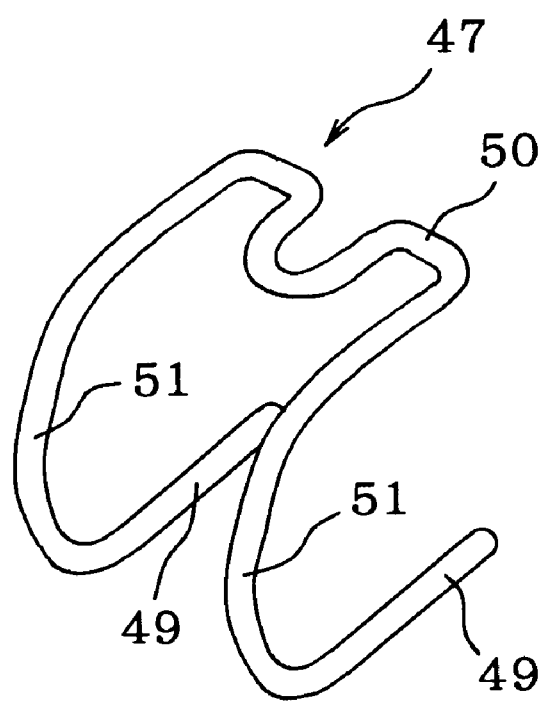
FIG. 24 is a perspective view of the coupling spring used for the cover of FIG. 18.

The spring 47 for connecting and fastening the sensor unit 39 to the cylindrical body 44 formed in the cover 18, described above, is a corrugated plate spring that is generally U-shaped, C-shaped or semi-circular shaped, as shown in FIG. 20. When connecting the sensor unit 39 to the cylindrical body 44, first, the insert section 40 of the sensor unit 39 is inserted to the cylindrical body 44 until the flanged portion 41 comes into contact with the tip end surface of the cylindrical body 44 and the holes 75 are partially matched with the grooves 76. Also, in this state, the spring.47 is inserted in both of these holes 75 and grooves 76 by elastically pinching the thickness dimension of the spring 47. The spring 47 that has been inserted in both of these holes 75 and grooves 76 props against the inside surface 77 on the tip end side (right side in FIG. 18) of the holes 75 with respect to the cylindrical body 44 and the inside surface 78 on the tip end side (left side in FIG. 19) of the grooves 76 with respect to the sensor unit 39, so as to apply a spring force on the insert section 40 of the sensor unit 39 in the direction of pulling the insert portion 40 inside the cylindrical body 44.

Next, FIGS. 21 thru 24 show a sixth embodiment of the invention. All of the embodiments described above, are for the application of this invention in a rolling-bearing unit for supporting non-driven wheels, (rear wheels in FF vehicles, or front wheel in FR vehicles), however, this embodiment and the seventh embodiment are for application of this invention in a rolling-bearing unit for supporting driven wheels (front wheels for FF vehicles, rear wheels for FR vehicles, and all wheels in 4WD vehicles) Therefore, the hub 2 in this embodiment, is formed in a cylindrical shaped body, having a spline hole 79 into which a constant-velocity joint shaft can be freely inserted. Moreover, to prevent interference with the constant-velocity joint, the cover 18 is foamed in a circular ring shape, and the sensor unit 39 is located in the radial direction of the cover 18.

Therefore, in this embodiment, an eave-shaped installation-flange section 80 is formed on part of the outside surface of the cover 18, and an insert hole 38 that runs in the radial direction of the cover 18 is formed in this installation-flange section 80. In this embodiment, this insert hole 38 has a square cross section. Moreover, a groove 48 is formed on the inner circumferential surface on the end of the installation-flange section 80, and a hole 81 is formed on the base end of the installation-flange section 80, such that both run in the circumferential direction of the cover 18. Also, the sensor unit 39 comprises an insert section 40 with a square cross section, such that it can be freely inserted firmly in the insert hole 38 and a outward facing flanged portion 41 formed on the base end of the insert section 40. Moreover, a groove 54 and inclined surface 57, identical to that in the first embodiment described above, are formed on the base end of the flanged portion 41. The detector portion which faces the axially inner surface of the permanent magnet 35 of the encoder 3, is located on the outside surface on the tip end of the insert section 40 (left side on the bottom end of FIG. 21).

The spring 47 for connecting and fastening the sensor unit 39 to the installation-flange section 80 has a pair of legs 49, and a retainer section 50 which spans between the pair of legs 49. Provided on both ends of the retainer section 50 are curved-shaped connection sections 51 which connect the retainer section 50 with one end of the legs 49. These connection sections 51, when free, have a spring force which acts in the direction that brings both ends of the retainer section 50 and the legs 49 together. Also, the legs 49 are straight up to the tip end.

To connect and fasten the sensor unit 39 to the installation-flange section 80, described above, using the spring 47, also described above, the insert section 40 of the sensor unit 39 is inserted into the insert hole 38 of the installation-flange section 80 inward from the outside in the radial direction, in a state where the spring 47 is removed. It is inserted until the flanged portion 41 comes in contact with the outer peripheral surface of the installation-flange section 80. Next, the space between the pair of legs 49 and the retainer section 50 of the coupling spring 47 is opened, and the legs 49 are inserted into or engaged with the groove 48 and hole 81, and the retainer section 50 moves over the base end surface of the flanged portion 41. The retainer section 50 then fits into the groove 54 formed on the base end surface of the flanged portion 41.

The construction of this embodiment as well, makes it possible to reduce the amount of work required for installing or removing the sensor unit 39 in or from the cover 18, reduce the cost of the rolling-bearing unit with rpm detector itself and reduce the cost of repairs. In the construction of this embodiment, a seal ring 82 is fastened inside the inner peripheral surface on the axially inner inside end of the outer ring 1, and by constructing a seal ring by combining this seal ring 82 with the support ring 34 of the encoder 3, it is possible to prevent foreign matter for getting into the space 43 where the rolling members 9 are located.

Next, FIGS. 25 thru 30 show a seventh embodiment of the invention. In this embodiment, The main body 28 of the cover 18 which is made of synthetic resin is formed generally circumferentially with an L-shaped cross section. Also, the cylindrical wall 36 of the cover 18 is thick in one place, and an insert hole 38 that runs in the radial direction of the cover 18 is formed in this thick part. In this embodiment, this insert hole 38 and the insert section 40 of the sensor unit 39, which is inserted into this insert hole 38, both have a circular cross section.

Instead that the cross section of the insert hole 38 and the insert section 40 are circular in thus way, in this embodiment, the sensor unit 39 is prevented from turning by fitting the flanged portion 41 on the base end of the sensor unit 39 with a stepped section 87 formed in the center portion of the cylindrical wall 36 of the cover 18. In other words, the flanged portion 41 is substantially "D" shaped, and by forming a flat surface 83 on part of the outer peripheral surface of the flanged portion 41, when the insert section 40 is inserted into the insert hole 38, the stepped section 87 and flat surface 83 come in contact with or close to each other. In this embodiment, by forming this kind of flat surface 83, the sensor unit 39 is prevented from turning, and at the same time, the required dimension in the axial direction (right and left direction in FIG. 25) for installing the sensor unit 39 is reduced. Moreover, a groove 54 and inclined surface 57 are formed on the base end surface of the flanged portion 41 in the same way as in embodiments 1 thru 3 and 6. When the sensor unit 39 is connected and fastened to the cover 18, the retainer section 50 of the spring 47, described later, is engaged with the groove 54, and the flanged portion 41 is supported on the outer peripheral surface of the cylindrical wail portion 36.

Figure 28:
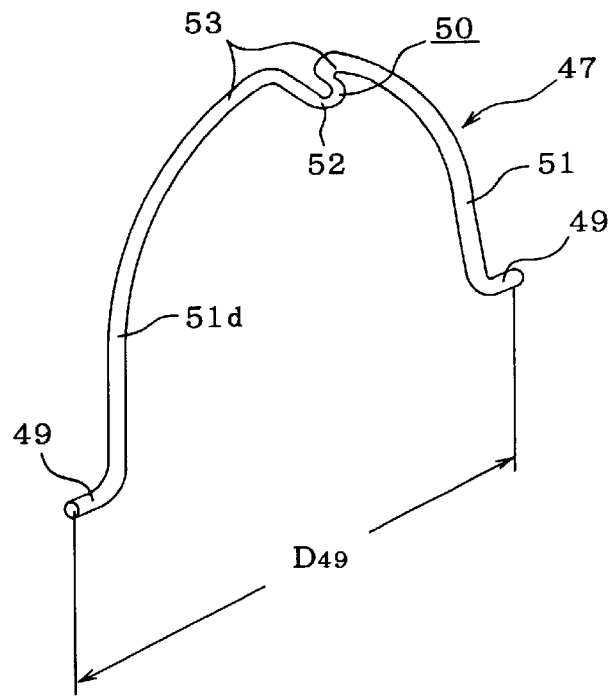
FIG. 28 is a perspective view of the coupling spring used for the cover of FIG. 18.

The spring 47 used in this embodiment has a retainer section 50 in the center, legs 49 on both ends and connection sections 51 for connecting the retainer section 50 to the legs 49 as shown in FIG. 28. The legs 49 are formed in a pivot shape, and the connection sections 51 are formed in a substantially quarter circle shape, respectively. The legs 49 are bent in opposing directions from the ends of the connection sections 51, and are coaxially aligned. On part of the outer surface of the stepped section 87 of the cover 18, which is to support the legs 49, there are two hook-shaped pivot supports 84 formed in two locations on opposite sides in the diametrical direction with the insert hole 38 as the center therebetween. When the spring 47 is free, the space $D_{49}$ between both tip ends of the legs 49 is sufficiently larger than the space $D_{84}$ (not shown in the figures) between the pair of pivot supports 84. That is $D_{49} > D_{84}$. Moreover, these pivot supports 84 are open only on the side opposite from the insert hole 38. With the legs 49 fitted into the pivot supports 84, the legs cannot shift toward the insert hole 38. The pivot supports for supporting the legs 49 are not limited to a hook shape as shown in the figures, but can be loop-shape, holes, or the like.

On the outer surface of part of the bottom plate 37 of the cover 18, in alignment with the insert hole 38, a hook 85 for holding the retainer section 50 is formed in one piece with the cover 18 when it is formed out of synthetic resin using injection molding. The spring 47 is installed in the cover 18 and left in the position shown in FIG. 29 by the manufacturer of the rolling-bearing unit. In other words, the legs 49 are placed in the pivot supports 84 and the retainer section 50 is placed in the hook 85. In this state, the retainer section 50 is moved away from the opening of the insert hole 38 so that it is not in the way when inserting the insert section 40 of the sensor unit 39 into the insert hole 38. Moreover, in this state, the spring 47 does not stick out in the radial direction from the outer peripheral surface of the cover 18. Therefore, the spring 47 does not interfere with supporting the rolling-bearing unit on the vehicle suspension mount when the cover 18 is inserted into the knuckle support hole (not shown in tie drawings). An inclined edge 86 is formed on part of the hook 85, such that it is easy to fit the retainer section 50 into the hook 85. In the embodiment shown in the figures, the hook 85 is engaged with the U-shaped curved section 52 of the spring 47. However, it is also possible to engage a pair of straight sections 53, located on both sides of the curved section 52, with the hook. In this case, a pair of hooks that are separated by a space are formed.

Figure 29:
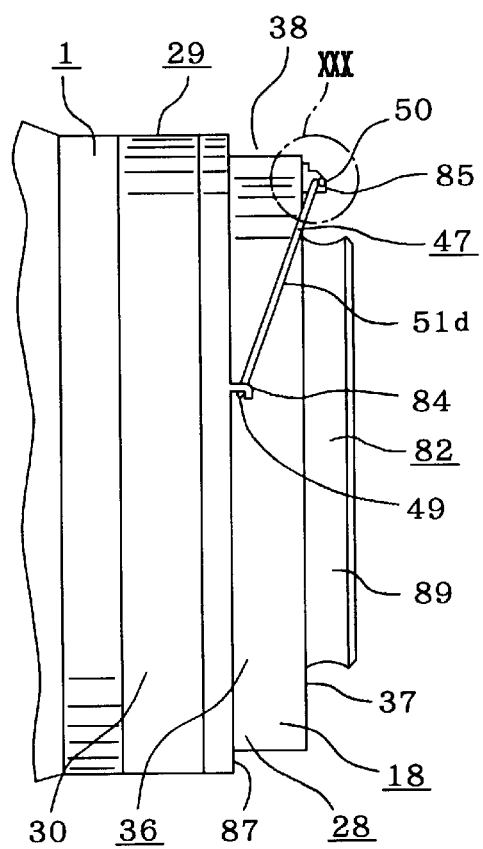
FIG. 29 is a side elevational view of the cover with the sensor unit removed used in the rolling bearing unit of FIG. 25.
Figure 30:
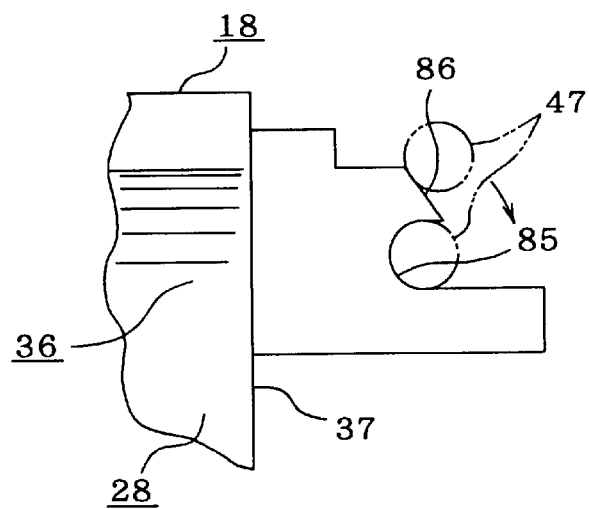
FIG. 30 is an enlarged view of the prior XXX in FIG. 29.

When holding and fastening the sensor unit 39 to the cylindrical wall portion 36 of the cover 18, constructed as described above, using the spring 47, also described above, the retainer section 50 of the spring 47 is moved away from the insert hole 38 as shown in FIG. 29. Also, in this state, the insert section 40 of the sensor unit 39 is inserted inward from outside in the radial direction into the insert hole 38 formed on the cylindrical wall portion 36. Moreover, the flanged portion 41 comes in contact with outer peripheral surface of the thick portion on the cylindrical wall portion 36, and the stepped section 87 comes into tight contact with or close to the flat surface 83. Next, the retainer section 50 of the spring 47 is removed from the hook 85 and the spring 47 is rocked in the counterclockwise direction with the legs 49 as the center in FIG. 29 and the retainer section 50 moves over the base end surface of the flanged portion 41 This retainer section 50 is then engaged with the groove 54 that is formed on the base end surface of the flanged portion 41.

In the construction of this embodiment, the radially outer half of the reinforcing metal member 88 of the seal ring 82 is embedded in the inner peripheral edge of the circular bottom plate 37 of the cover 18, and the seal lip 89 formed all the way around on the inside peripheral edge of the reinforcing piece 88 has a tip end edge slidable around the outer peripheral surface of the constant-velocity joint 90. In this embodiment, this seal lip 89 prevents foreign matter from getting inside the space 43 where the rolling members 9 are located. This also prevents foreign matter from getting into the encoder 3.

Figure 31:
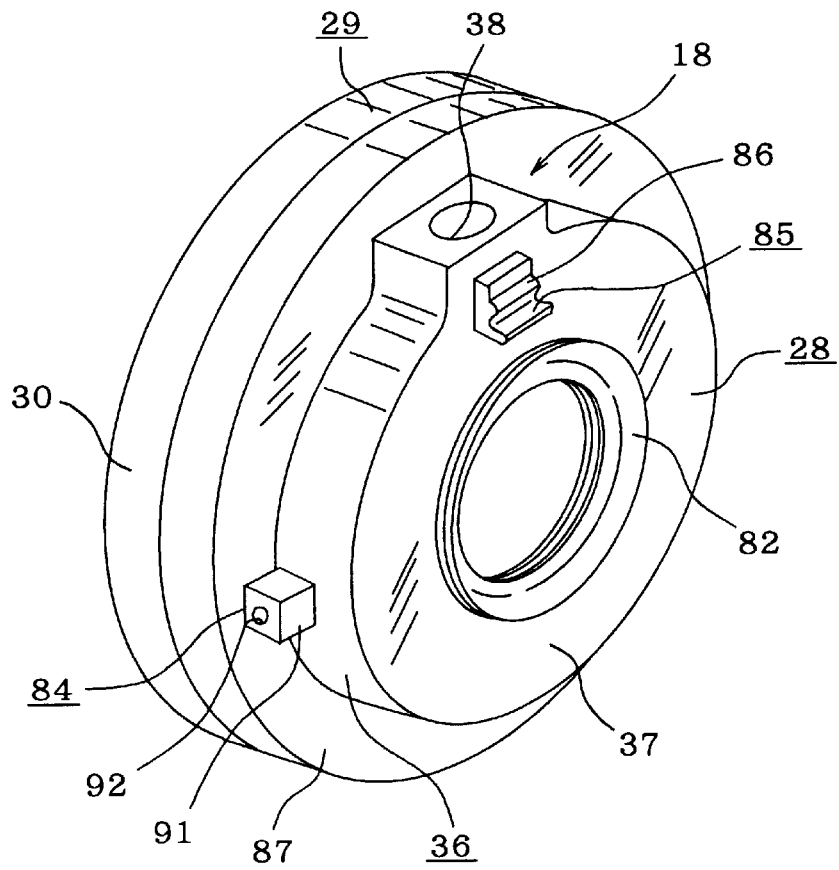
FIG. 31 is a perspective view of the cover used in the rolling beating unit of FIG. 21.
Figure 32:
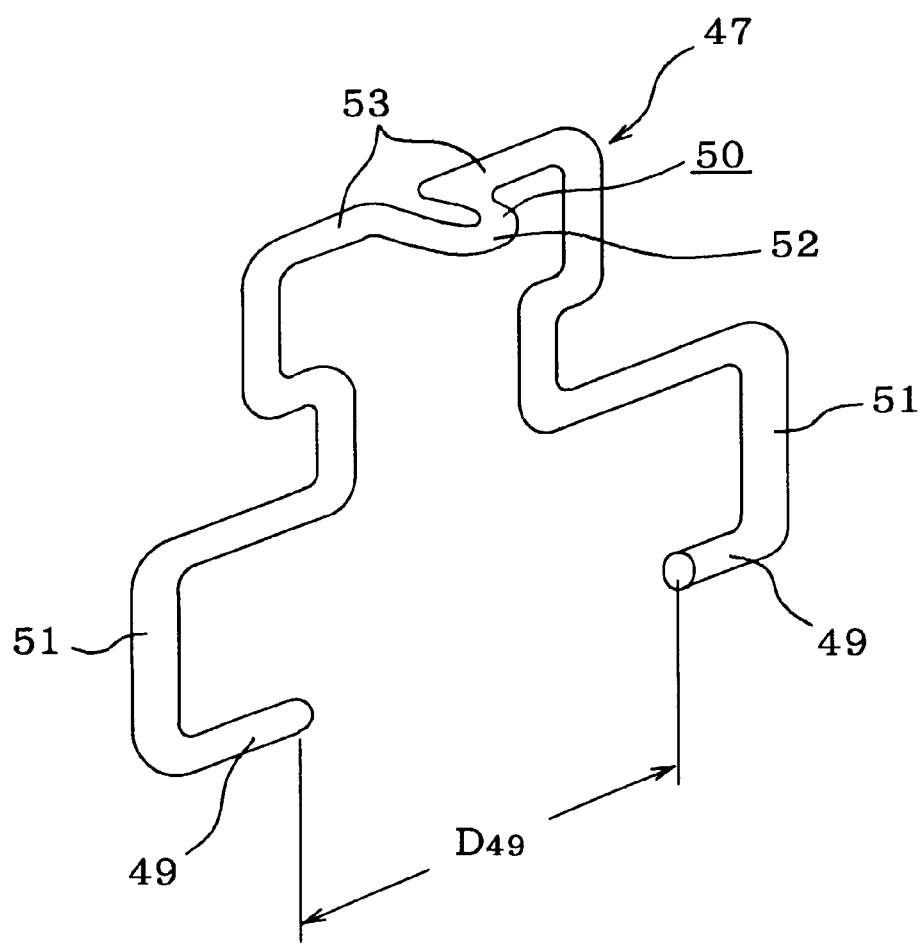
FIG. 32 is a perspective view of the coupling spring used for the cover of FIG. 18.

Next, FIGS. 31 and 32 show an eighth embodiment of the invention. In this embodiment, pivot supports 84 for supporting the legs 49 of the spring 47 are formed in two protruding sections 91 that are formed on opposite sides in the diametrical direction of the stepped section 87. Also, on the surfaces of these protruding sections 91 which face away from each other, bottomed holes 92 are formed which do not go through to the inner peripheral surface of the cover 18 and they are concentric. Moreover, as shown in FIG. 32, the spring 47 which is used in this embodiment, is such that the pair of legs 49 formed on the ends of connection sections 51 which connect to both ends of the retainer section 50, are bent toward each other. These legs 49 are arranged so they are coaxial with each other. Also, these legs 49 fit into the concave holes 92 of the pivot supports 84 to support the spring 47 with respect to the cover 18, so that it can rock freely. In order that the legs 49 do not come out of the pivot supports 84, when the spring 47 is free, the space $D_{49}$ between the pair of tip ends of the legs 49 is sufficiently less than the space $D_{84}$ (not shown in the figure) between the pair of pivot supports 84. That is $D_{49} < D_{84}$. Furthermore, the connection sections 51 of the spring 47 have required spring strength along their entire short length, and therefore have a serpentining shape. The other construction and functions of this embodiments are substantially the same as those described in the seventh embodiment.

Next, FIGS. 33 thru 39 show a ninth embodiment of the invention. The opening on the axially inside end (right end in FIG. 33) of the outer ring 1, which is the stationary ring, is covered with a cover 18. This cover 18 as in the construction of the first embodiment described above, comprises a main body 28, which is formed by injection molding using synthetic resin into a cylindrical shape with a bottom, and a cylindrical body 29 that connects to the opening of the main body 28. Moreover, the inner ring 7, which together with the hub 2 forms the rotating ring assembly, fits around the axially inner end of the hub 2 as in the embodiment shown in FIG. 12, and further fastened to the hub 2 by crimping part of the hub 2 outward in the radial direction. An encoder 3, having the same construction as in the prior art encoder shown in JP Publication HEI No. 7-31539, fits on the stepped section 69 formed on the axially inner end (right end in FIG. 33) of this inner ring 7.

Also, on part of the bottom plate 37 of the main body 28 of the cover 18, an insert hole 38 is formed to face the axially inner surface of the circular section 16 of the encoder 3, and this insert hole 38 goes through the bottom plate 37 and runs in the axial direction of the outer ring 1. Furthermore, in part of the outer surface of the bottom plate 37 (surface opposite of the space where the rolling members 9 are located and which is supposed to be covered by the cover 18, or the right side surface in FIG. 33), a cylindrical body 44 is formed around the opening of the insert bole 38, and it forms a single cylindrical surface together with the inside peripheral surface of the insert hole 38. The tip end portion of a sensor unit 39 as described in the first embodiment (see FIGS. 1 and 3) is inserted inside the insert hole 38 of the bottom plate 37 and cylindrical body 44.

On the other hand, on the portion closer to the base end of the cylindrical body 44 (left end in FIGS. 34, 37, 38, and 39), a pair of concentric support holes 93 are formed on nearly opposite sides in the diametrical direction of the cylindrical body 44 These support holes 93 do not go through to the inside of the cylindrical body 44. The reason for this is to prevent foreign matter from getting inside the cylindrical body 44 through these support holes 93. Furthermore, on the outer surface of the bottom plate 37, in a location near the outer peripheral surface of the cylindrical body 44, a pair of stop plates 94 are formed in one piece with the cover 18, and serve as a means for preventing the spring from coming out. Both stopper plates 94 are located just separated from the extension line of the support holes 93. In the embodiment shown in the figures, the support holes 93 are displaced just a little outward in tile radial direction of the cover 18 (top in FIGS. 34, 37, 38 and 39) just off of being on opposite sides in the diametrical direction of the cylindrical body 44. With respect to them, the stopper plates 94 are formed on completely opposite sides in the diametrical direction of the cylindrical body 44. Furthermore, provided between the edges of the stopper plates 94 that face toward each other and the outer peripheral surface of the cylindrical body 44, is a space into which the base end portion of the spring 95 (described later) is freely inserted.

On both ends of the spring 95 which connects the sensor unit 39 to the cover 18, a pair of concentric pivot supports 96 are formed such that the surfaces on the tip ends thereof are faced to each other. Also, a retainer section 97 is formed in the center of the spring 95 such that it presses the flanged portion 41 of the sensor unit 39 toward the end surface of the opening on the cylindrical body 44. This retainer section 97 is formed of the bent wire portion of the spring 95, and comprised of concentric straight sections 98 on both ends thereof and a semi-circular curved section 99 between these straight sections 98. Moreover, in the center of this curved section 99, there is a bent grip section 100 that is bent toward the opposite side of the pivot supports. 96. This bent grip section 100 is used for taking hold of the spring 95 by finger when moving the retainer section 97 away from or toward the flanged portion 41 so as to remove or installing the sensor unit 39 to the cover 18. Therefore, the width $W_{100}$ (see FIG. 36) of the bent grip section 100 is wide enough for the thumb when taking hold of it (for example 15 mm or less). Furthermore, both ends of the retainer section 97 and the pivot supports 96 are connected to each other by elastically deformable sections 101. These elastically deformable sections 101 are formed in a "V" shape or arc shape by bending the wire material, and they shrink elastically in the direction of their length.

Figure 33:
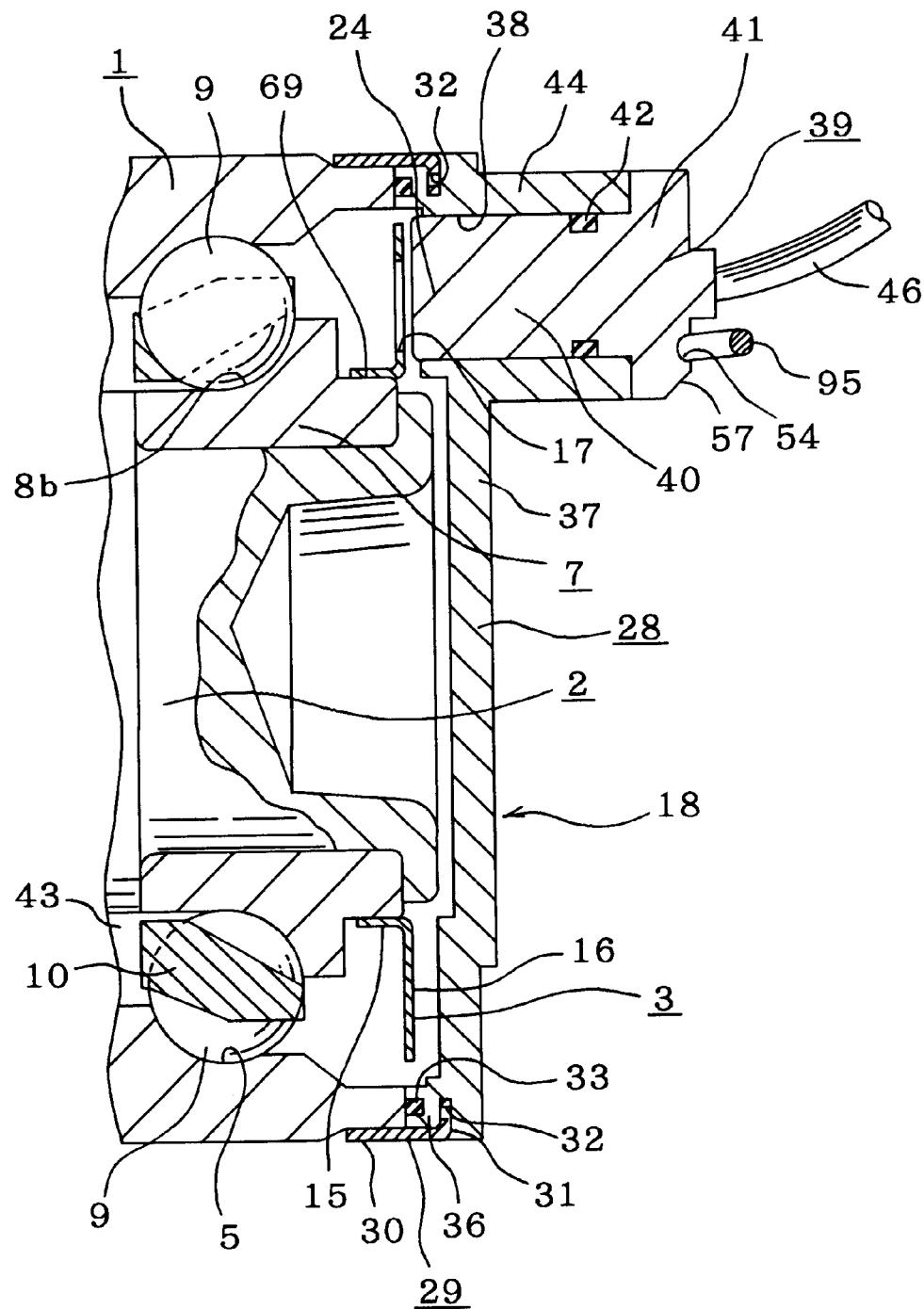
FIG. 33 is a cross sectional view of the axially inner portion of the rolling bearing to show another embodiment of the present invention.
Figure 34:
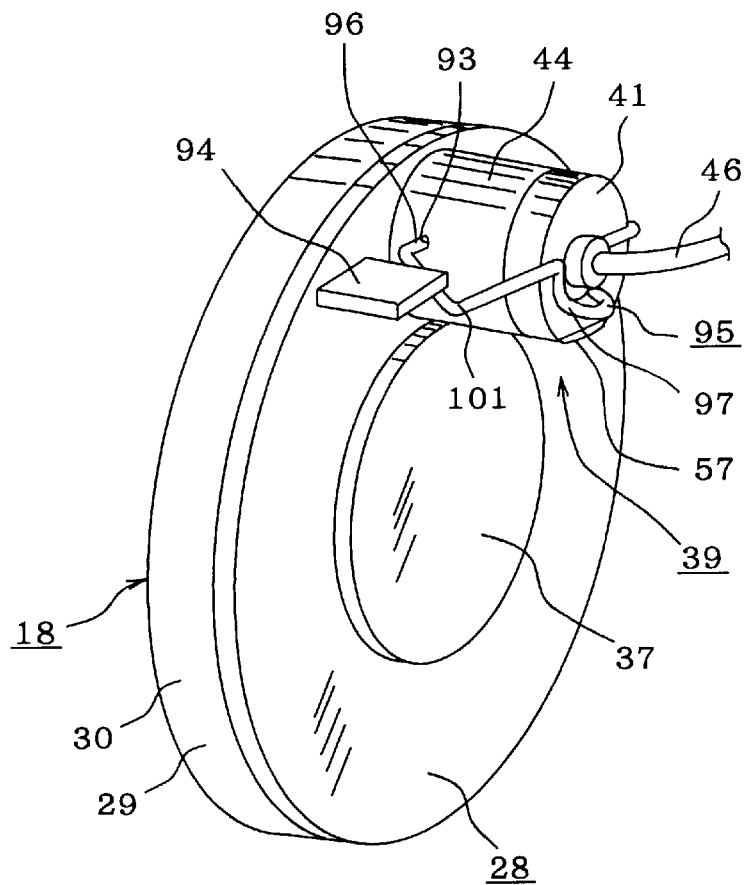
FIG. 34 is a perspective view of the cover with the sensor unit.
Figure 39:
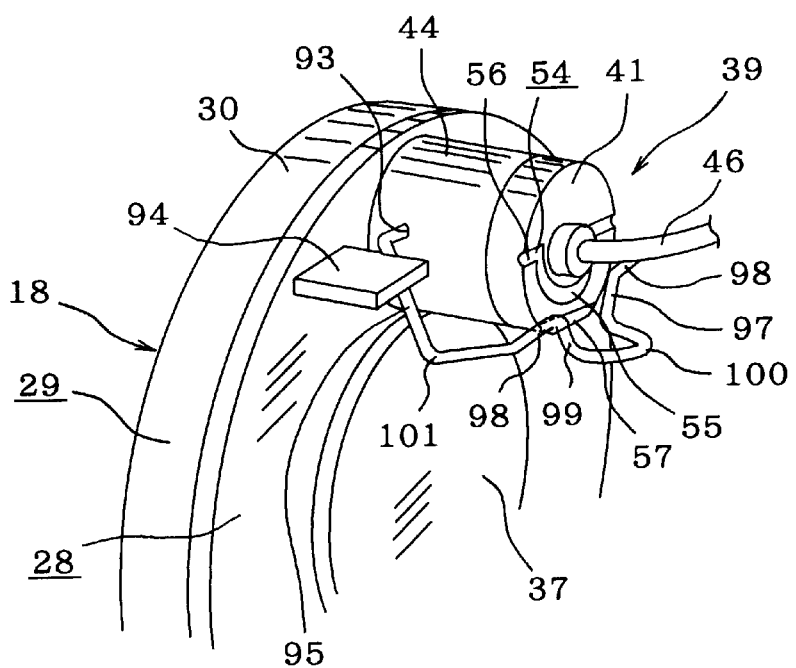
FIG. 39 is a perspective view of the cover in the state where the sensor unit is to be mounted to the cover by the coupling spring.

On the other hand, on the base end surface (surface opposite of the insert section 40, or the right end surface in FIGS. 33, 34, and 39) of the flanged portion 41 formed on the sensor unit 39, there is a groove 54 and inclined surface 57 that are substantially the same as those described in the first embodiment for firmly fitting the retainer section 97 of the spring 95.

Figure 37:
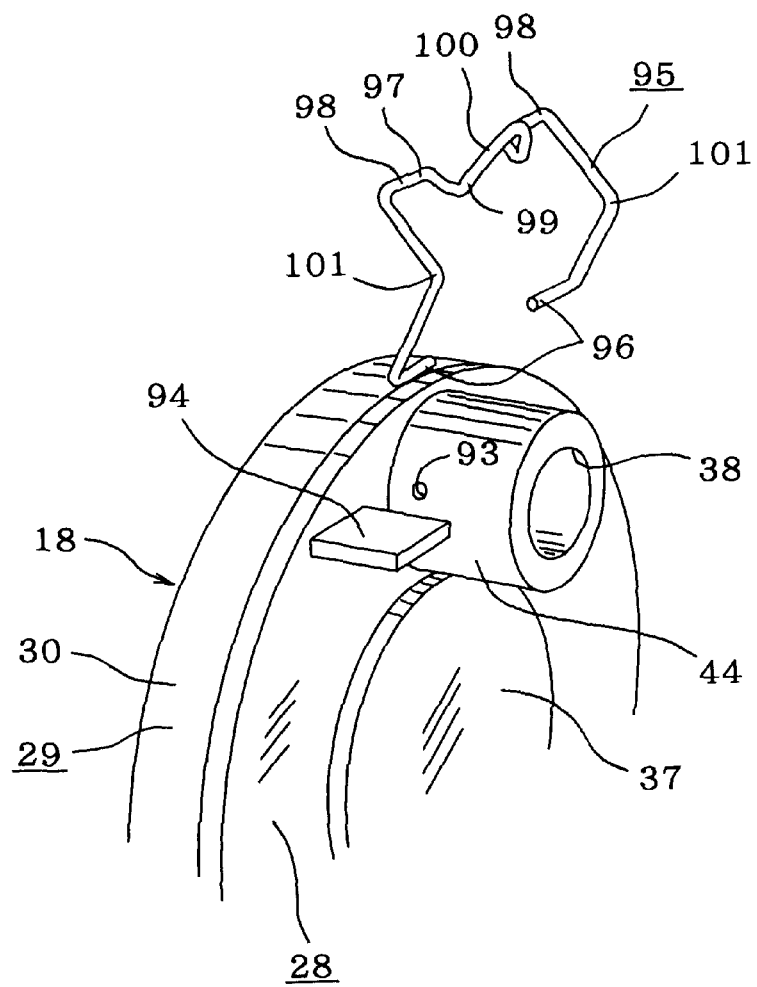
FIG. 37 is a perspective view of the cover and the coupling spring to be installed therein.

The work of combining all of the components described above, and installing the sensor unit 39 into the cover 18 as part of the rolling-bearing unit with rpm detector of this embodiment is performed as follows. First, before putting the sensor unit 39 and cover 18 together, the spring 95 is placed into the cylindrical body 44 of the cover 18. Installation is performed, first by placing the entire spring 95 outward in the radial direction from the cover 18 and outside in the radial direction from the stopper plates 94 as shown in FIG. 37. Then in this state, the space between the pair of pivot supports 96 is elastically opened up and these pivot supports 96 are lined up with the support holes 93 and the pivot supports 96 are inserted into the support holes 93. When doing this, the stopper plates 94 do not interfere with the work of inserting the pivot supports 96 into the support holes 93

Figure 38:
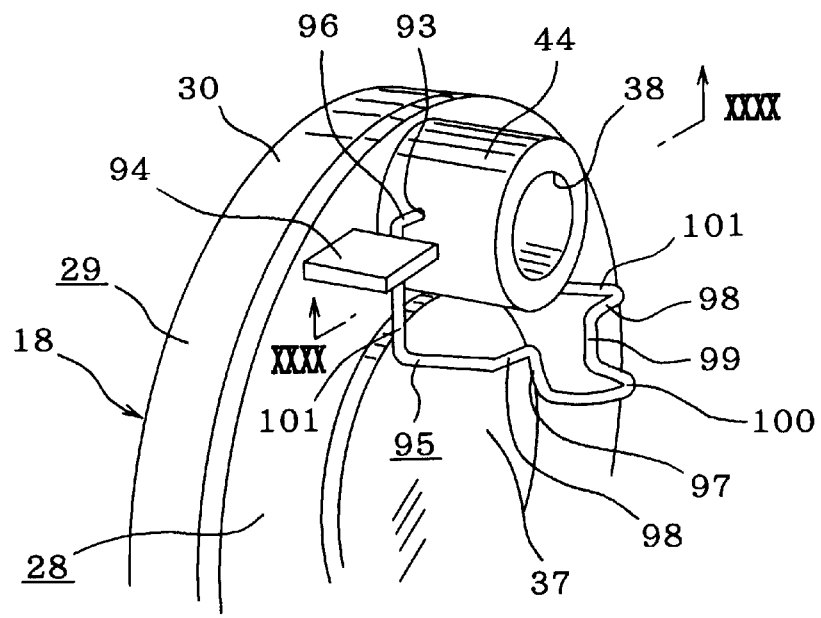
FIG. 38 is a perspective view of the cover with the coupling spring.

As described above, with the base ends (ends with the pivot supports 96) of the spring 95 is pivotally supported in the cylindrical body 44, the spring 95 is then tilted to the position shown in FIG. 38 with the pivot supports 96 as the center. In other words, the spring 95 is tilted until part of the elastically deformable sections 101 of the spring 95 come in contact with the outer surface of the bottom plate 37 of the main body 28 of the cover 18, then the base end portions of the elastically deformable sections 101 are placed between the outer peripheral surface of the cylindrical body 44 and the end edges of the stopper plates 94. In this state, the retainer section 97 is completely moved away from around the opening on the tip end of the cylindrical body 44, and this prevents any interference between part of the sensor unit 39 and the retainer section 97 when installing the sensor unit 39 into the cover 18. The cylindrical body 44 is formed at a portion closer to the top end of the cover 18, so the spring 95 is stabilized, as shown in FIG. 38, by its weight. in this state, the spring 95 does not interfere with any part of the knuckle, and it is possible to insert the outer ring 1, with the cover 18 and spring 95 mounted, into the installation hole formed in the knuckle. Also, if the cover 18 with spring 95 mounted, is delivered to the automobile manufacturer, the automobile manufacturer will be able to omit the work of mounting the spring 95 onto the cover 18.

To connect and fasten the sensor unit 39 to the cover 18, first the spring 95 is mounted to the cylindrical body 44, as described above, then with the spring 95 rocked into the position shown in FIG. 38, the insert section 40 on the tip end of the sensor unit 39 is inserted into the insert hole 38 in the bottom plate 37 and cylindrical body 44. Also, the flanged portion 41 comes into contact with the tip end surface off the cylindrical body 44. In this state, there is a specified small space (for example 0.5 mm) between the detector 24 located on the tip end surface of the insert section 40 of the sensor At 39, and the axially inner surface of the circular section 16 of the encoder 3. Next, the spring 95 is rocked around the pair of pivot supports 96, so that the retainer section 97 is brought close to the flanged portion 41. The retainer section 97 goes through the position shown in FIG. 39, and moves over the base surface of the flanged portion 41 as shown in FIGS. 33 and 34, so that the flanged portion 41 is pressed against the tip end surface of the cylindrical body 44. In this state, the retainer section 97 fits into the groove 54 formed on the base end surface of the flanged portion 41.

The work of raising the retainer section 97 of the spring 95 onto the base end surface of the flanged portion 41, as described above, is performed by pressing the bent grip section 100 by finger. As the bent grip section 100 is pressed in the direction of the flanged portion 41, the straight sections 98 on both ends of the retainer section 97 move over the inclined surface 57 formed on the flanged portion 41. If the bent grip section 100 is continued to be pressed further from is position, the retainer section 97 is engaged with the groove 54 formed on the base end surface of the flanged portion 41. With the retainer section 97 in the groove 54, the pair of elastically deformable sections 101 are stretched elastically along their entire length. Accordingly, the retainer section 97 elastically presses the flanged portion 41 against the tip end surface of the cylindrical body 44 by the elastic restoration force of the pair of elastically deformable sections 101. In order that his work can be performed easily, the dimensions of spring 95 are controlled such that if the spring 95, in the free state, is tilted around the pivot supports 96, the straight sections 98 come in contact with the inclined surface 57. Moreover, when the spring 95 is rocked with reference to the cylindrical body 44, the distance between these elastically deformable sections 101 is a little greater than the outer diameter of the cylindrical body 44 and the flanged portion 41 in order that there is no interference between the elastically deformable section 101 and the outer peripheral surface of the cylindrical body 44 and outer peripheral edge of the flanged portion 41.

With the retainer section 97 engaged with the groove 54, as described above, the spring 95 presses the flanged portion 41 against the tip end surface of the cylindrical body 44 with a sufficiently large force, and connects the sensor unit 39 to the cover 18. Also, in thus state, the part of the elastically deformable section 101 that are close to the pivot supports 96 come in contact with or very close to the end edge of the pair of stopper plates 94. Accordingly, there is very little elastic deformation in the elastically deformable sections 101 to expand the space between the base ends of the elastically deformable sections 101, so that the pivot supports 96 do not come out of the support holes 93. As a result, the pivot supports 96 will not come out of the support hole 93 even if an external force is applied to the elastically deformable sections 101, e.g if the spring 95 is hit forcefully with a flying rock or the like while the vehicle is moving, and the sensor unit 39 will not accidentally come apart from the cover 18.

The sensor unit 39 is removed from the cover 18 by following the installation procedure above in the reverse order. First, the bent grip section 100 is grasped and pulled to move the retainer section 97 of the spring 95 away from the base end surface of the flanged portion 41. After the retainer section 97 has been moved away from the flanged portion 41, the insert section 40 of the sensor unit 39 is pull out from the insert hole 38 in tie bottom plate 37 and cylindrical body 44.

Figure 40:
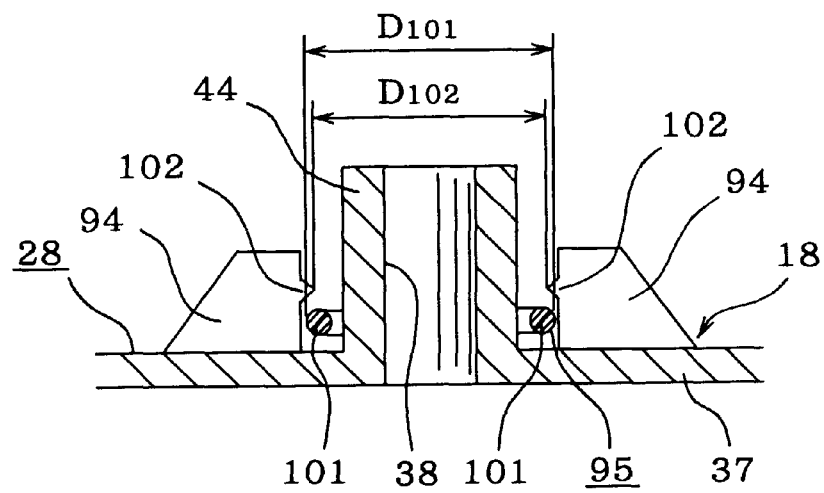
FIG. 40 is a cross sectional view taken along the line XXXXI—XXXXI of FIG. 38.
Figure 41:
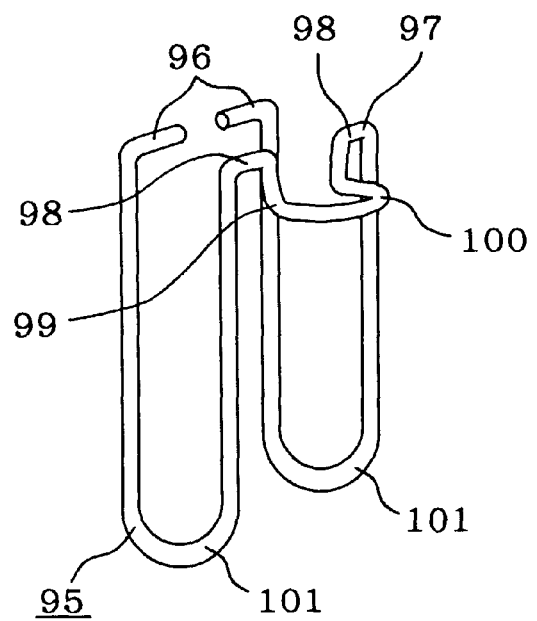
FIG. 41 is a perspective view of the coupling spring in another example of the present invention.
Figure 42:
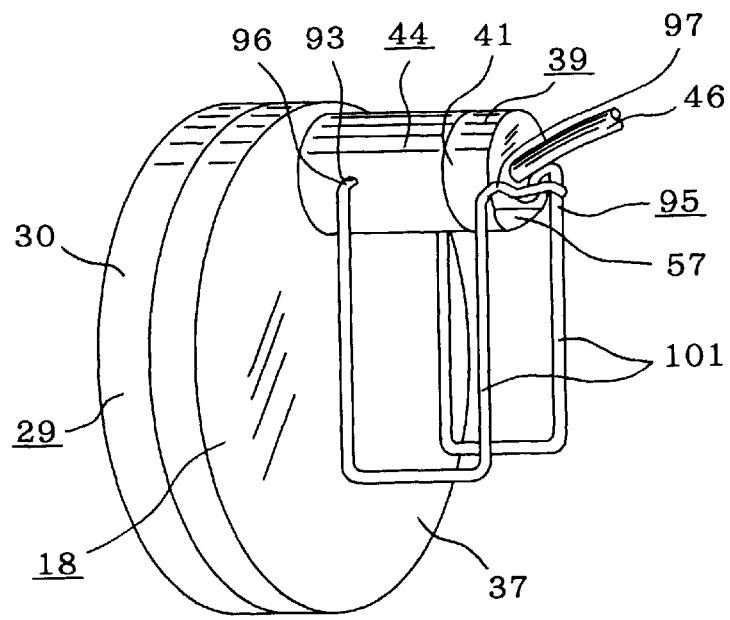
FIG. 42 is a perspective view of the cover with the sensor unit mounted hereto.
Figure 43:
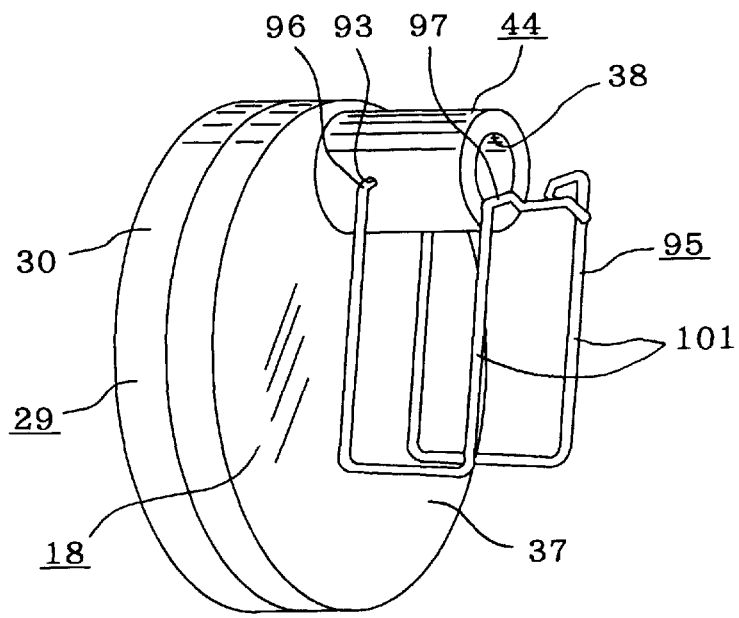
FIG. 43 is a perspective view of the cover of FIG. 42 with the tip portion of the coupling spring disengaged.

Next, FIG. 40 shows a tenth embodiment of the invention. In this embodiment, on the opposed end edges of the stopper plates 94, protrusions 102 are formed at a location separated a little from the outside surface (top surface in FIG. 40) of the bottom plate 37 of the main body 28 of the cover 18. The distance $D_{102}$ between the tips of these protrusions 102 is a little less than the distance $D_{101}$ between the outer edges of the elastically deformable sections 101 of the spring 95 in a free state. That is $D_{102} < D_{101}$. Also, in this embodiment, when the retainer section 97 is moved in the direction away from the opening on the tip end of the cylindrical body 44, as shown in FIG. 38, the relative position between the spring 95 and the cover 18 can be made constant regardless of the attitude of the cover 18. Therefore, when the rolling-bearing unit with the cover 18 mounted, is delivered from the manufacturer to the automobile manufacturer, that will install the sensor unit, the relative position of the spring 95 will not shift, making assembly more efficient for the automobile manufacturer.

Figure 35:
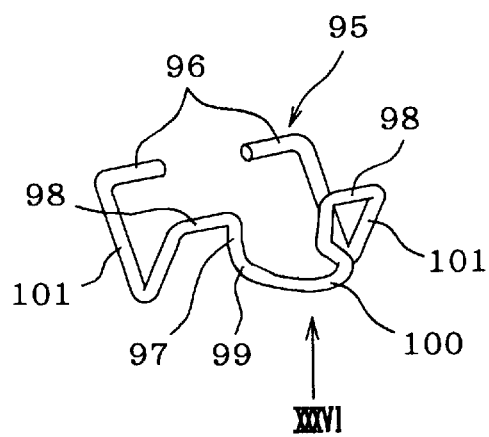
FIG. 35 is a perspective view of the coupling spring used for the cover of FIG. 18.
Figure 36:
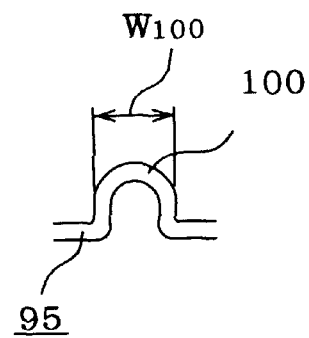
FIG. 36 is a view taken in the direction of arrow XXXVI in FIG. 35.

Next, FIGS. 41 to 45 show an eleventh embodiment of the invention. In this embodiment, in order to obtain the required elasticity even though the thickness of the wire material of the spring 95 is increased, the length of the pair of elastically deformable sections 101 is increased, and the amount that the elastically deformable section 101 are bent is also increased. In other words, there is a large possibility that muddy water or snow-melting agent or the like will adhere to the spring 95 installed in the rolling-bearing unit of this invention, creating favorable conditions for rust. If the spring is made of stainless steel spring wire, it is easy to maintain the durability of spring without having to increase the diameter of the wire material, however, if relatively inexpensive, non-stainless, normal spring wire is used, even if the surface is treated with zinc or chrome plating, it is necessary to increase the diameter of the wire material in order to maintain the required durability. However, if the diameter is increased, the stiffness of the rigidity of the spring 95 becomes too high (the spring constant becomes large), and it becomes difficult for the retainer section 97 to move over the flanged portion 41. Taking this into consideration, a suitable diameter for the wire material of the sprig 95 is about 1 to 2 mm. However, if the diameter is about 2 mm, the rigidity of the spring 95 having the shape shown in FIG. 35 is too high. Therefore, when tile diameter is increased, as in this embodiment, the total length and the amount of bend of the pair of elastically deformable sections 101 are increased, in order to main the required elasticity.

In regards to the construction of the rpm detector unit itself for embodiments 9 thru 11 above, the sensor used is not limited to a passive-type magnetic sensor as shown in the figures, but it is also possible to use an active-type magnetic sensor, eddy-current-type sensor or photoelectric-type sensor. If an active-type magnetic sensor is used, it is possible to make the entire sensor unit more compact and light weight. Also the inertial mass is small, and the kinetic energy due to vibration when the vehicle is moving is small. As a result, it is possible to reduce the load required to support the spring 95, and thus it is possible to use a spring 95 with thinner wire material (about 1 to 2 mm).

Next FIGS. 46 thru 50 show a twelfth embodiment of the invention. This embodiment takes into consideration removing new problems that occur in the construction of embodiment 11, described above. In other words, in the eleventh embodiment, in conditions favorable for rust, the diameter of the wire material is increased in order to maintain the durability of the spring 95, and then the entire length and amount of bending of the pair of elastically deformable sections 101 of the spring 95 are increased.

Also, together with raising the rigidity by increasing the diameter of the wire material of the spring 95 or by changing the material used, if the total length of the pair of elastically deformable sections 101 is increased, if there are differences in dimensions in the area where the spring 95 comes together with the cover 18 or with the sensor unit 39, it is possible to effectively absorb these differences. In other words, if the spring 95 is made of highly rigid material, and if the total length of the elastically deformable sections 101 is increased, it is possible to keep the load required for supporting the sensor unit 39 within an adequate range, and to keep the stress added to the spring within acceptable range so as to absorb the differences in dimensions. On the other hand, while the total length of the elastically deformable sections 101 is left short, it is possible to absorb the dimension errors by lowering the rigidity of the wire material and keeping the amount of elastic deformation within a prescribed amount. However, it becomes difficult to keep au adequate force for supporting the sensor unit 39 by the spring 95, and to keep the stresses applied to the spring 95 within allowable levels regardless of the dimension error in the areas where parts fit together. Therefore, for this reason, it is more desirable to increase the total length of the pair of elastically deformable sections 101.

However, if the length of the elastically deformable sections 101 are just simply increased, even if the spring 95 is rocked around the pair of pivot supports 96 that are pivotably supported by the pair of support holes 93 when removing or installing the sensor unit 39, part of the pair of elastically deformable sections 101 comes in contact with the side of bottom plate 37 of the cover 18, and restricts the rocking movement of the spring 95, so that it is not possible to completely move the retainer section 97 of the spring 95 away from the opening portion of the cylindrical body 44. If the retainer section 97 is not completely moved away from the opening portion of the cylindrical body 44, the retainer section 97 will interfere with installation or removal of the sensor unit 39 in the cover 18.

Figure 44:
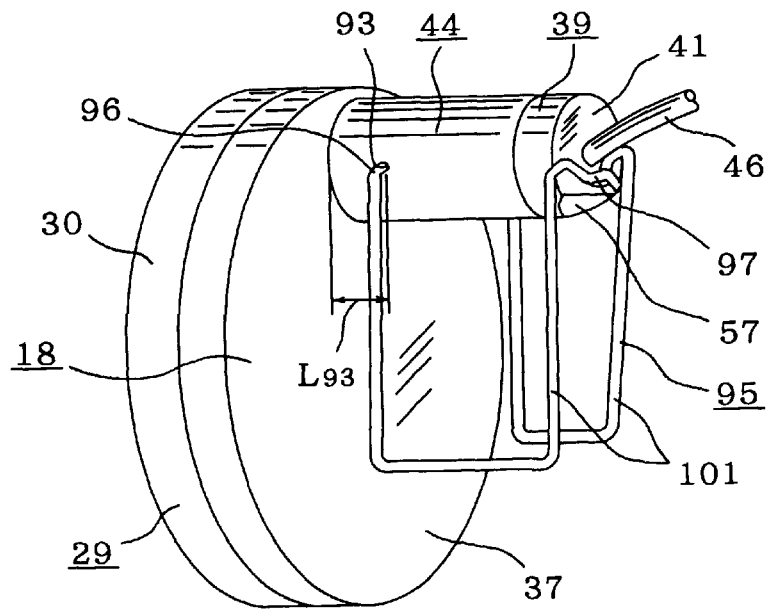
FIG. 44 is a perspective view of the cover with the sensor unit mounted thereto.
Figure 45:
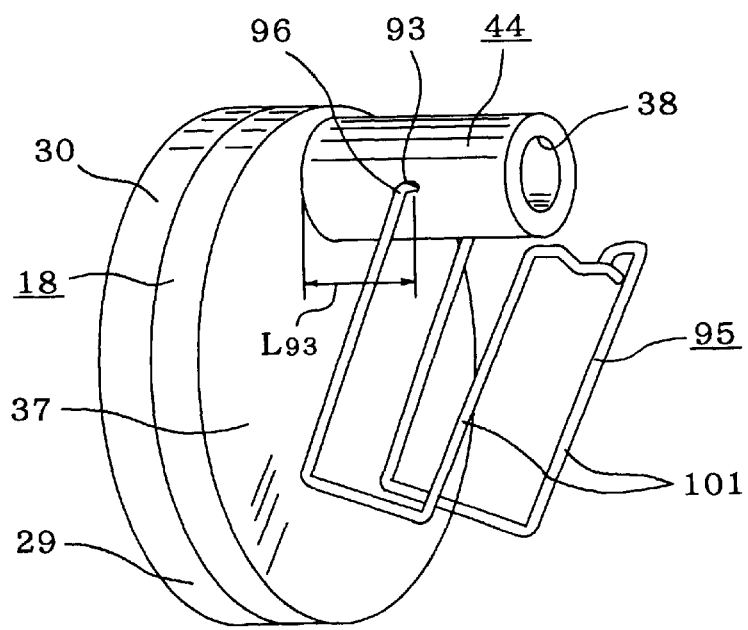
FIG. 45 is a perspective view of the cover of FIG. 42 with the tip portion of the coupling spring disengaged.

On the other hand, to remove this kind of problem, it is possible to provide a construction as shown in FIGS. 44 and 45, such that the distance $L_{93}$ in the axial direction between the support holes 93 and the out side surface of the bottom plate 37 of the cover 18 is sufficiently maintained, and that spring 95 can freely rock until the retainer section 97 is completely moved away from the opening portion of is the cylindrical body 44. However, in this kind of construction, the length in the axial direction of the cylindrical body 44 with support holes 93 becomes longer, and thus it becomes difficult to make the rolling-bearing unit with rpm detector more compact.

The rolling-bearing unit with rpm detector of embodiment 12, as shown in FIGS. 46 thru 50, will make it possible to remove these problems, and even if the total length of the spring is made sufficiently long, the install ability and removability of the sensor unit in the cover remains good.

The rolling-bearing unit with rpm detector of this embodiment is characterized by construction that makes it possible to have good install ability and removability of the sensor unit 39 in the cover 18, even if the total length of the spring 95 is made sufficiently long. The other construction and functions are substantially the same as those of embodiment 9 and 11, as shown in FIG. 33 thru 39 and 41. In this embodiment, there are no stopper plates 94 for preventing the pivot supports 96 of the spring 95 from coming out of support holes 93 in the cover 18, as was done in the case of embodiments 9 and 11 (see FIGS. 34, 37, 38, and 39), however, if necessary, they can be formed.

Figure 46:
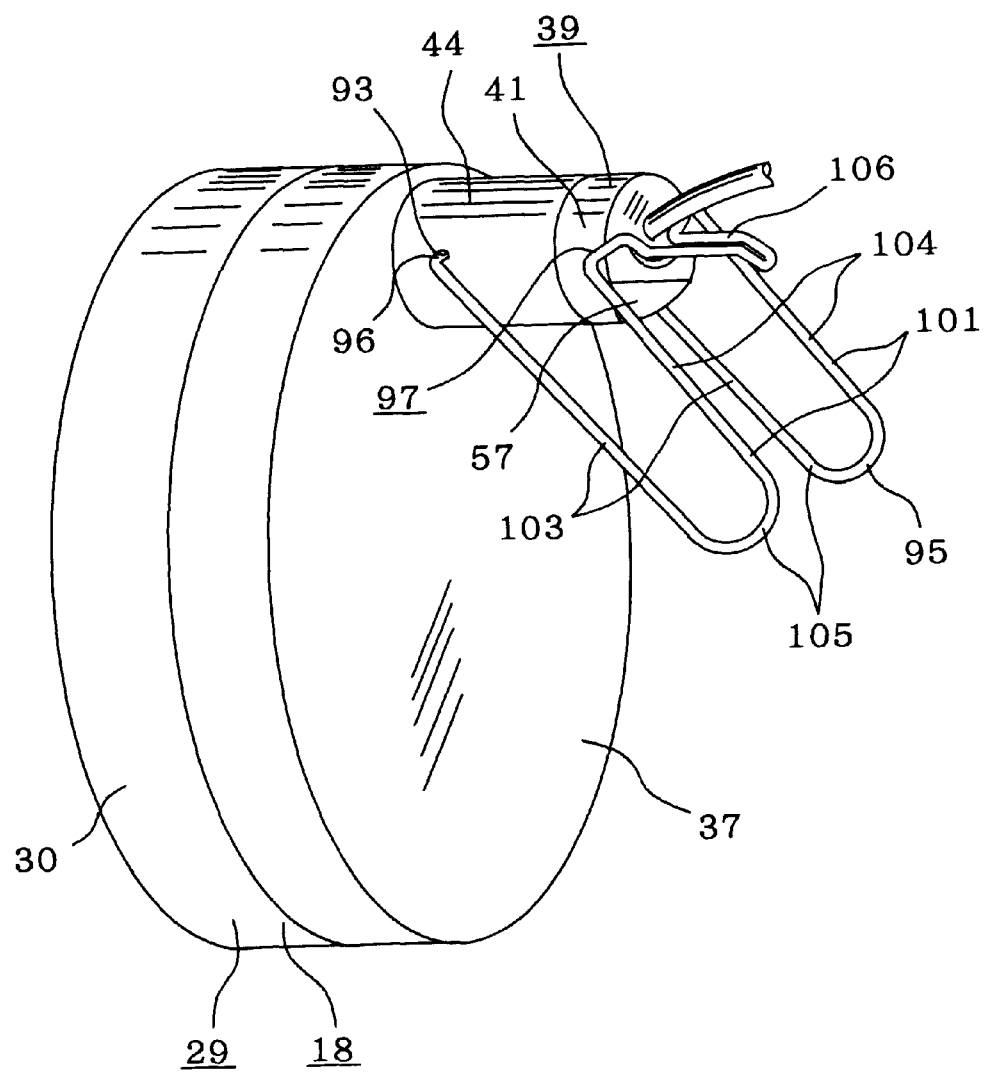
FIG. 46 is a perspective view of the cover with the sensor unit mounted thereto.
Figure 47:
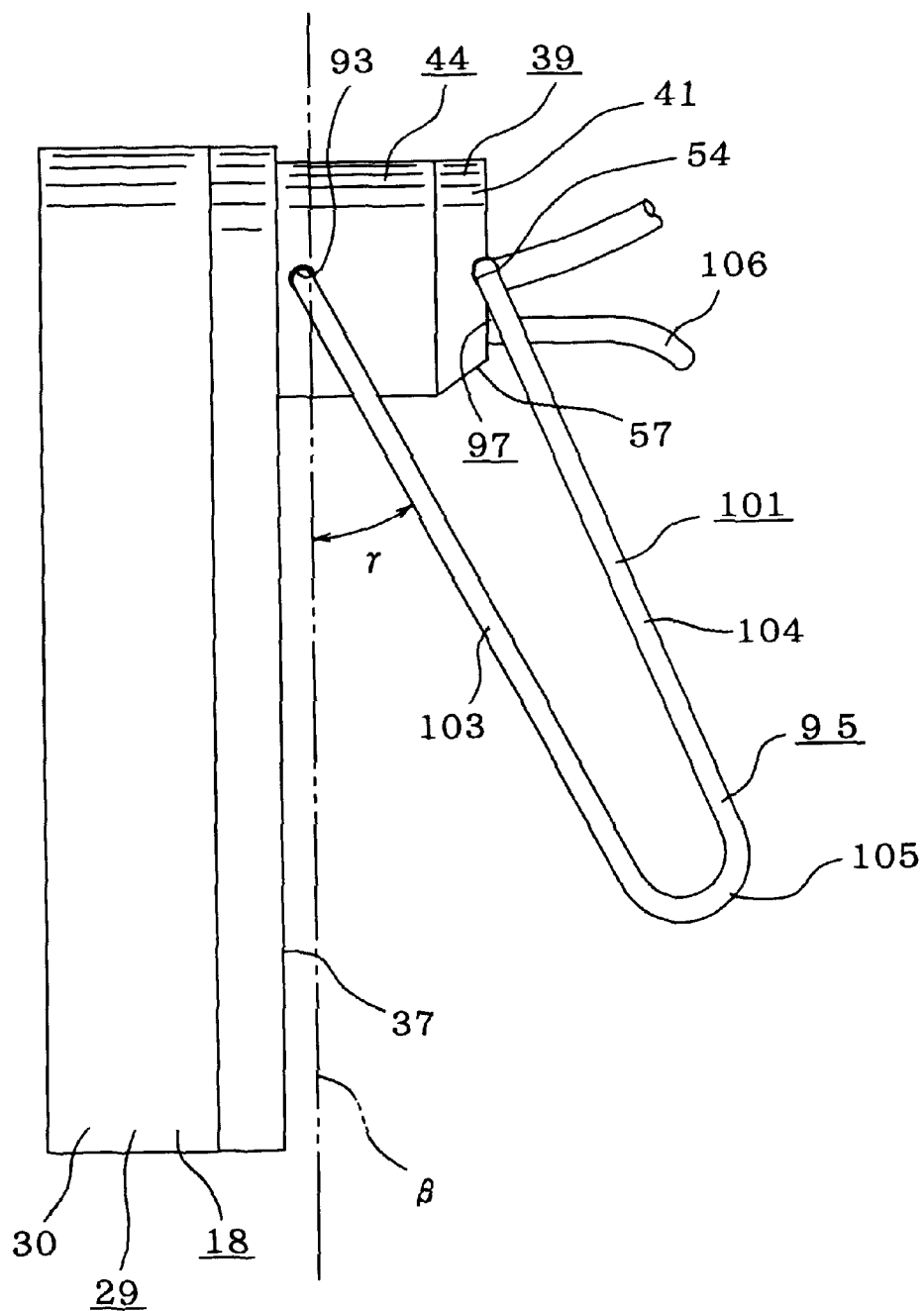
FIG. 47 is a side elevational view of the cover of FIG. 46.
Figure 48:
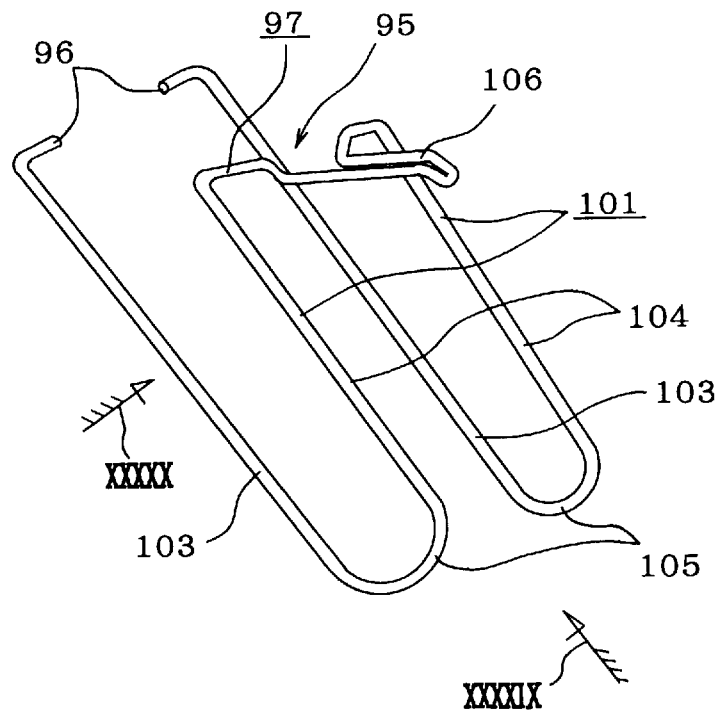
FIG. 48 is a perspective view of the coupling spring of the cover of FIG. 46.
Figure 49:
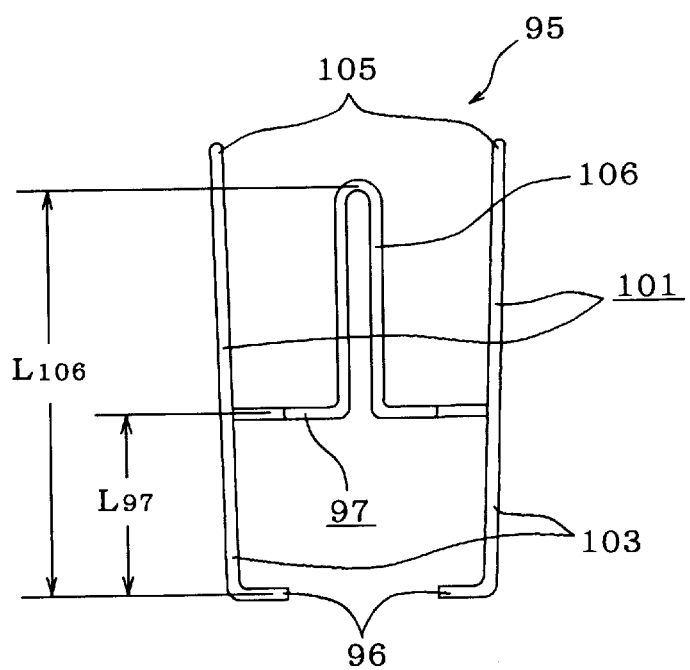
FIG. 49 is a view in the direction of arrow XXXXIX in FIG. 48.
Figure 50:
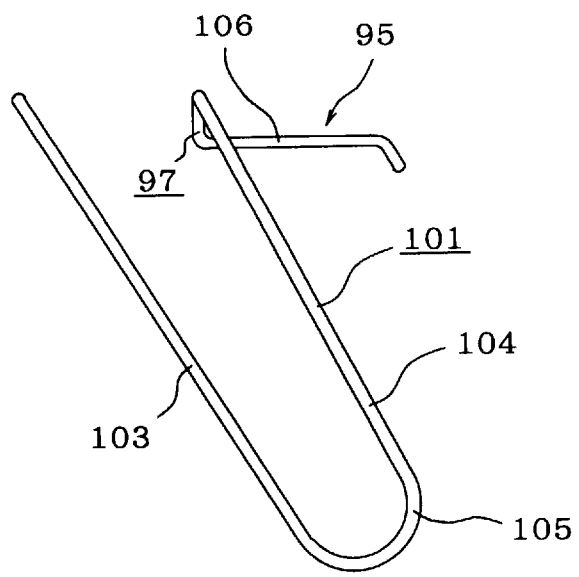
FIG. 50 is a view in the direction of arrow XXXXIX in FIG. 48.

Provided on part of the outside surface of the bottom plate 37 of the cover 18, which covers the opening on the axially inner end of the outer ring 1 (see FIG. 33), is a cylindrical body 44 that protrudes out in the axial direction (left and right in FIGS. 46 and 47). Also, a pair of coaxial support holes 93, that do not go through to the inner peripheral surface of the cylindrical body 44, are formed in two locations on the outer surface of the cylindrical body 44 at nearly opposite sides in the diametrical direction, and a pair of tip ends or pivot supports 96 of the elastic member or spring 95 are freely supported in these holes 93. The spring 95, as shown in FIGS. 48 thru 50, has a pair of coaxial pivot supports 96 at the both ends thereof, a retainer section 97 at the center portion thereof to press the flanged portion 41 formed on the base end of the sensor unit 39 against the peripheral edge of the opening of the cylindrical body 44, and a pair of elastically deformable sections 101 that is a connection between one end of the pair of pivot supports 96 and the both ends of the retainer section 97. These elastically deformable sections 101 comprise a first pair of straight sections 103 that is continued from the one end of the pivot supports 96, and a second pair of straight sections 104 that are continued from both ends of the retainer section 97, and a pair of curved sections 105 which connect the first and second straight sections 104. The total length of the pair of elastically deformable sections 101, for the reasons described above, is made long enough to maintain the durability of the spring 95, and to absorb dimension error in the members in engagement with the spring 95.

In this embodiment, the pair of elastically deformable sections 101 are arranged such that, when the retainer section 97 presses the sensor unit 39 against the peripheral edge of the opening of the insert hole 38, the sections 101 are inclined with reference to the bottom plate 37 of the cover in a direction where the elastically deformable sections 101 are more separated from the bottom plate 37 as it is closer to the curved sections 105. In other words, the whole of the elastically transformable sections 101 is positioned on the opening side (right side in FIGS. 46 and 47) of the insert hole 38 than the virtual plane β (see FIG. 47) that is parallel with the bottom plate 37 of the cover 18, including the pair of pivot holes 93, and inclined in the direction where they are away from the virtual plane β as they are away from the holes 93. With this kind of construction, when removing or inserting the sensor unit 39 into the cylindrical body 44, the spring 95 can be rocking until the retainer section 97 does not interfere. Therefore, when the retainer section 97 of the spring 95 is engaged with the flanged portion 41 of the sensor unit 39, the angle γ between the first straight sections 103 of the elastically deformable sections 101 nearest to the bottom plate 37 and the virtual plane β is larger than a specified design value. In other words, this angle γ must be large enough such that when the spring 95 is rocked in the clockwise direction around the pivot supports 96, such that when part of the elastically deformable sections 101 come in contact with part of the bottom plate 37, the retainer section 97 is completely moved away from the opening of the cylindrical body 44 (moved away from the virtual space obtained by extending the outer peripheral surface of the cylindrical body 44), and the retainer section 97 does not interfere with the operation of removing or inserting the sensor unit 39 into the cylindrical body 44. For the rolling-bearing unit with rpm detector of the embodiment described above, as in the case of the other embodiments, it is possible to reduce the amount of work required for installation of the sensor unit 39 in the cover 18, and it is possible to reduce the cost of the rolling-bearing unit itself and cost of repairs. Especially, in tie case of this embodiment, the pair of elastically deformable sections 101 of the spring 95 are inclined. Therefore, even if the support holes 93 are formed close to the bottom plate 37, it is possible to maintain an angle that allows the spring 95 to rock when rocking it in the direction such that the elastically deformable sections 101 are rocked away from the opening of insert hole 38 to engage and disengage the sensor unit 39 with the cover 18. Accordingly, the retainer section 97 of the spring 95 does not interfere with the step of installing and removing the sensor unit 39 with reference to the cover 18 As a result, even if the total length of the spring 95 is made sufficiently long to maintain the durability of the spring 95, and to absorb the dimension errors when fitting the spring 95 with other parts, it is possible to maintain favorable installation conditions for engaging and disengaging the sensor unit 39 with the cover 18, without having to redundantly increase the axial length of the cylindrical body.

In this embodiment, in the center of the retainer section 97 of the spring 95, there is a grip section 106 which sticks out nearly perpendicular with the flanged portion 41 of the sensor limit 39 when the retainer section 97 has been engaged with the flanged portion 41. When removing or installing the sensor unit 39 with reference to the cover 18, the spring 95 can easily be rocked by taking hold of this grip section 106. When the retainer section 97 is fitted in the groove 54 on the sensor unit 39, the retainer section 97 of the spring 95 presses the flanged portion 41 toward the end surface of the cylindrical body 44 with sufficiently large force. Therefore, in order that the spring 95 can rock easily, it is desirable that the ratio (lever ratio) of the distance $L_{106}$ between the pivot supports 96 and the tip end of the grip section 106 to the distance $L_{97}$ between the pivot supports 96 and the base end of the retainer section 97 be somewhat greater. For example, a lever ratio of 2 or more is desirable. That is desirably $L_{106}/L_{97} \geq 2$.

Figure 51:
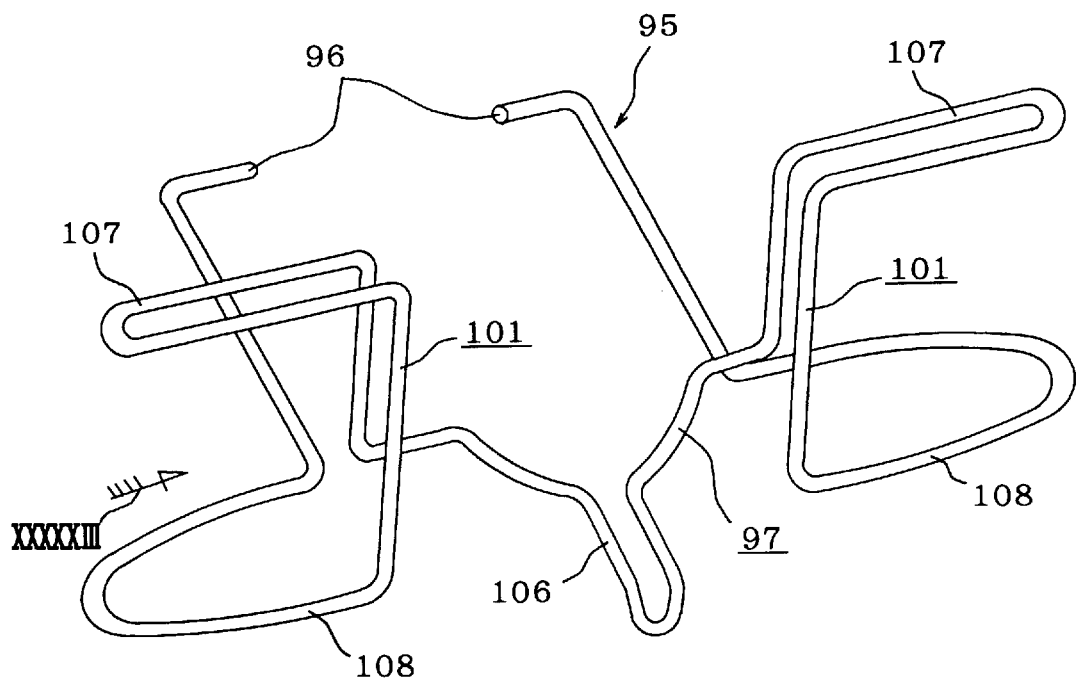
FIG. 51 is a perspective view of the coupling spring in another example of the present invention.
Figure 52:
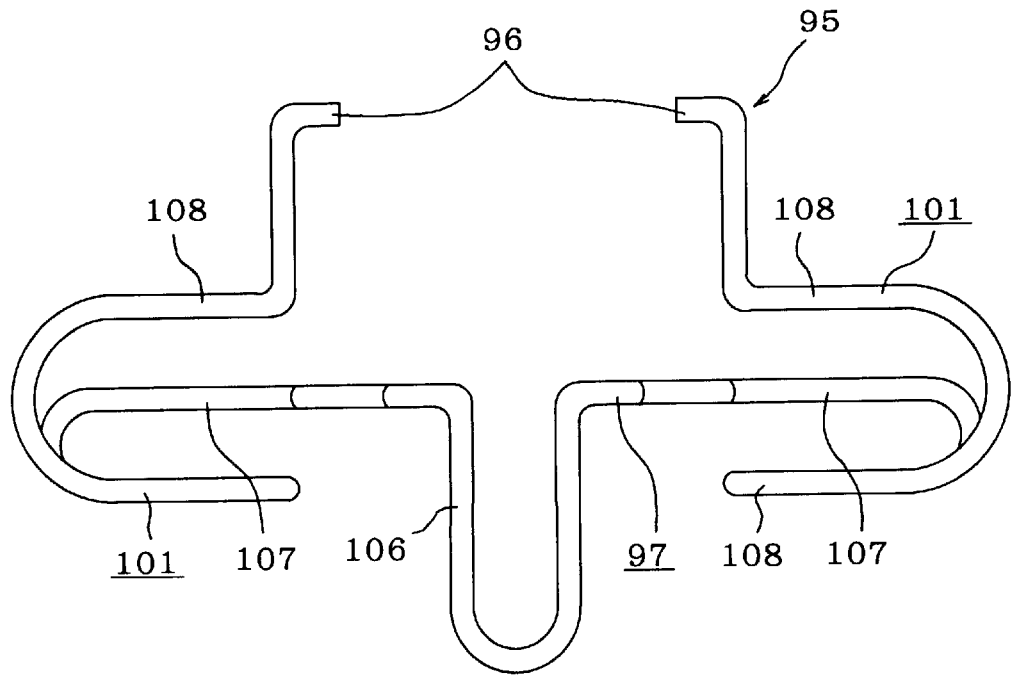
FIG. 52 is a view taken from the lower side in FIG. 51.
Figure 53:
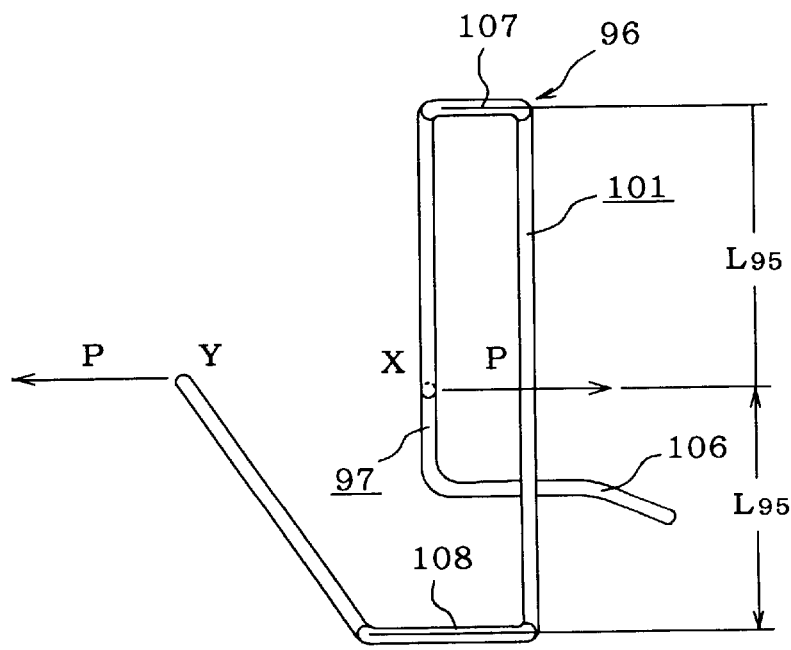
FIG. 53 is a view taken in the direction of arrow XXXXXIII in FIG. 51

Next, FIGS. 51 thru 53 show a thirteenth embodiment of the invention. In this embodiment, the pair of elastically deformable sections 101 for connecting the pair of pivot supports 96 on both-ends of the spring 95 to the retainer section 97 in the center, are curved in the part where the bending moment acting on the spring 95 is tie largest, and the total length of these elastically deformable sections 101 is increased The reason for lengthening these elastically deformable sections 101 in a prescribe location is described below.

According to Castigliano's Theorem, by increasing the length of the area whose cross section has a large bending moment acting on the elastic body, the deflection of the elastic body becomes large. Moreover, if the bending moment acting on the elastic body is too large, the stresses in that cross section will exceed the allowable stress, and the elastic body could break. In the case of the spring 95, which is an elastic body, by increasing the length of tie part where the bending moment acting on it is the greatest, it is possible to create a spring 95 that deforms easier and is more difficult to break. In this embodiment, in the points where a pulling load P is applied in order to rock the spring 95, the spring 95 is attached to the cover 18 and sensor unit 39. These points are shown by points X and Y in FIG. 53. Also, the place where the bending moment acting on the spring 95 is the greatest is at a place furthest separated J from point X at a distance $L_{95}$, in other words, at the first curved sections 107 and second curved sections 108 of the elastically deformable sections 101. Accordingly, by increasing the length of these curved sections 107, 108, it is possible to obtain a spring 95 that deforms more easily and is more difficult to break. In the embodiment shown in the figures, the first curved sections 107 and the second curved sections 108 are located on both sides of the line of action of the load P, so that it is possible to maintain the length required for the first and second curved sections 107, 108 without making the spring 95 stick out in the radial direction further than the outer peripheral edge around the cover 18. The other construction and functions are the same as in the twelfth embodiment described above.

Next, FIGS. 54 thru 58 show a fourteenth embodiment of the invention When using the rolling-bearing unit with rpm detector, as the vehicle is moving, there is a high possibility that muddy water, anti-snow agents or the like could adhere to the spring 95 which connects and supports the sensor unit 39 in the cover 18. Also, since the spring 95 is made of a metal, if muddy water or the like adheres to the spring as described above, there is a possibility of early rusting if the spring 95 is made of inexpensive, non-stainless steel. Especially in the area where the retainer section 97, located in the center of the spring 95, is engaged with the flanged portion or rim portion 41 of the sensor unit 39, it is easy for dirty water or the like to remain, and early rusting is likely to occur.

The rolling-bearing unit with rpm detector of this embodiment takes this problem into consideration, and even if the spring 95 is made of inexpensive, non-stainless steel, it prevents the spring 95 from rusting.

The rolling-bearing unit with rpm detector of this embodiment is characterized by construction such that the area where the spring 95 attaches to the sensor unit 39 is enclosed. The other construction and functions are substantially the same as in embodiment 12 shown in FIGS. 46 thru 50. In this embodiment, there are no stopper plates 94 (see FIGS. 34, 37, 38, 39, and 40) for preventing the pivot supports 96 of the spring 95 from coming out of the pivot holes 93 formed in the cover 18 as in the ninth and tenth embodiments. However, it is possible to form stopper plates 94 as long as they are prevented from interfering with the covering material 109 to be described later.

There is covering material 109 used for water resistance and supported by the outer peripheral surface in the center of the protrusion 111 in a short cylindrical shape located in the center of the base end section of the sensor unit 39. This covering material 109 is made of an elastic material such as rubber or synthetic resin such as HYTREL. Also, this covering material 109 is formed in a bag shape, so that it freely inverts in the direction to make the opening be reversal in direction. Moreover, in the center, of the bottom of this covering material 109, there is a through hole 110 in the axial direction. Also, there is a groove 112 all the way around the outer peripheral surface in the center of the protrusion 111, to which the inner peripheral edge of the through hole 110 is fastened. The harness 46 which connects to the sensor (not shown in the drawings) that is embedded in the sensor unit 39 run from the tip end surface of the protrusion 111.

Figure 58:
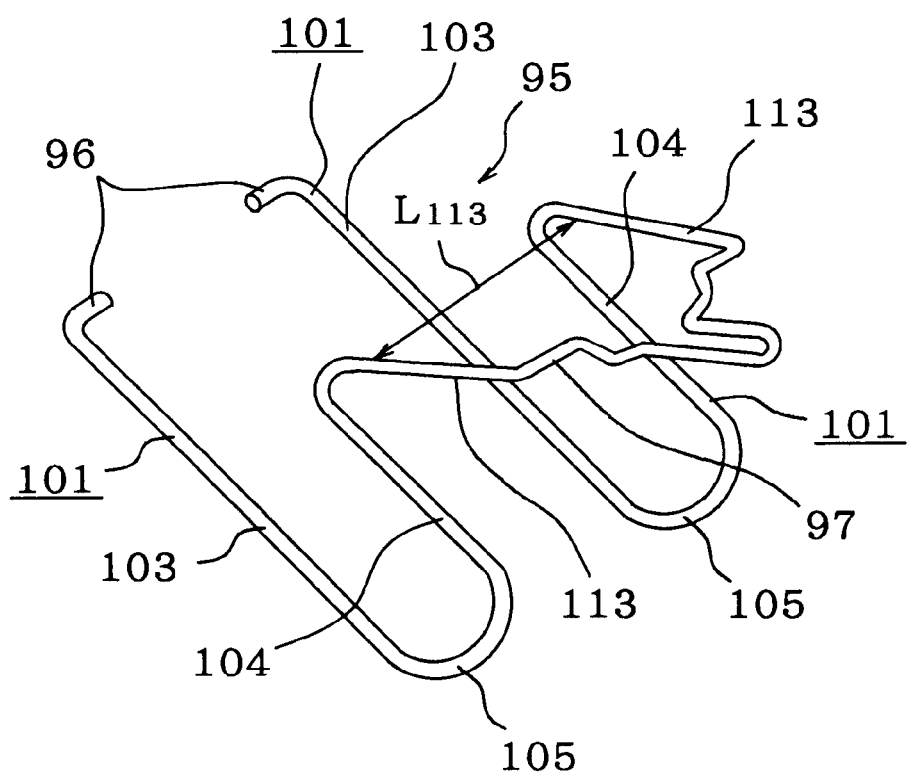
FIG. 58 is a perspective view of the coupling spring in another example of the present invention.
Figure 59:
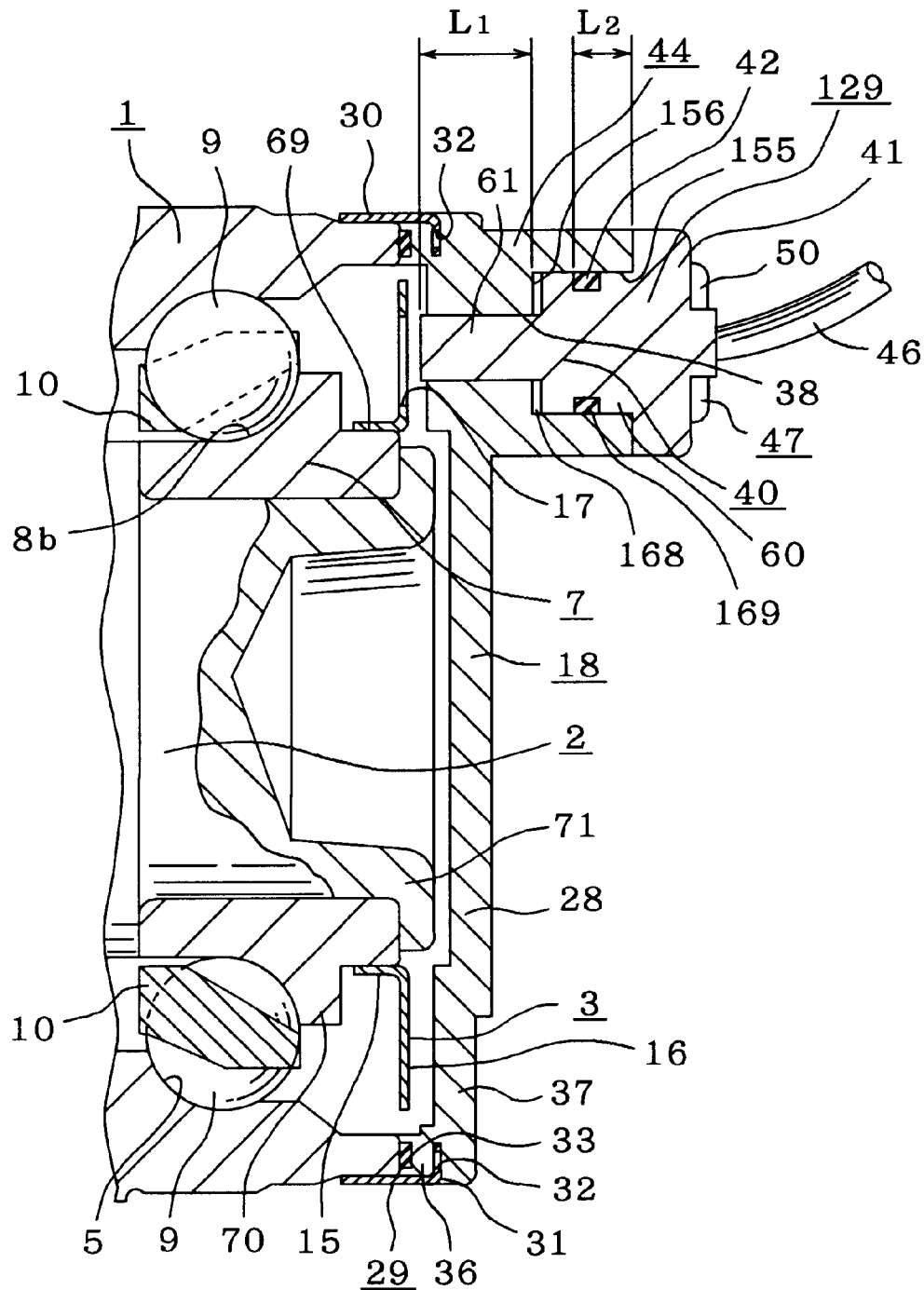
FIG. 59 is a cross sectional view of another embodiment corresponding to the right portion of FIG. 1.

In order that the sensor unit 39 can be freely installed in and removed from the cover 18, the spring 95 which presses the flanged-portion or brim portion 41 of the sensor unit 39 against the outer peripheral edge of opening of the insert hole 38, as shown in FIG. 58, has a pair of pivot supports 96 located on both ends, a retainer section 97 located in the center, and a pair of elastically deformable sections 101 that connect the pivot supports 96 and the retainer section 97. This pair of elastically deformable sections 101 has a first pair of straight sections 103 which connect to one end of tip ends or pivot supports 96, a third pair of straight sections 113 which connect to both ends of the retainer section 97, and a second pair of straight sections 104 which connect to one end of the third pair of straight sections 113 and extend to nearly parallel to the first pair of straight sections 103, and a pair of curved sections 105 which connect the first and second straight sections 103 and 104.

Figure 54:
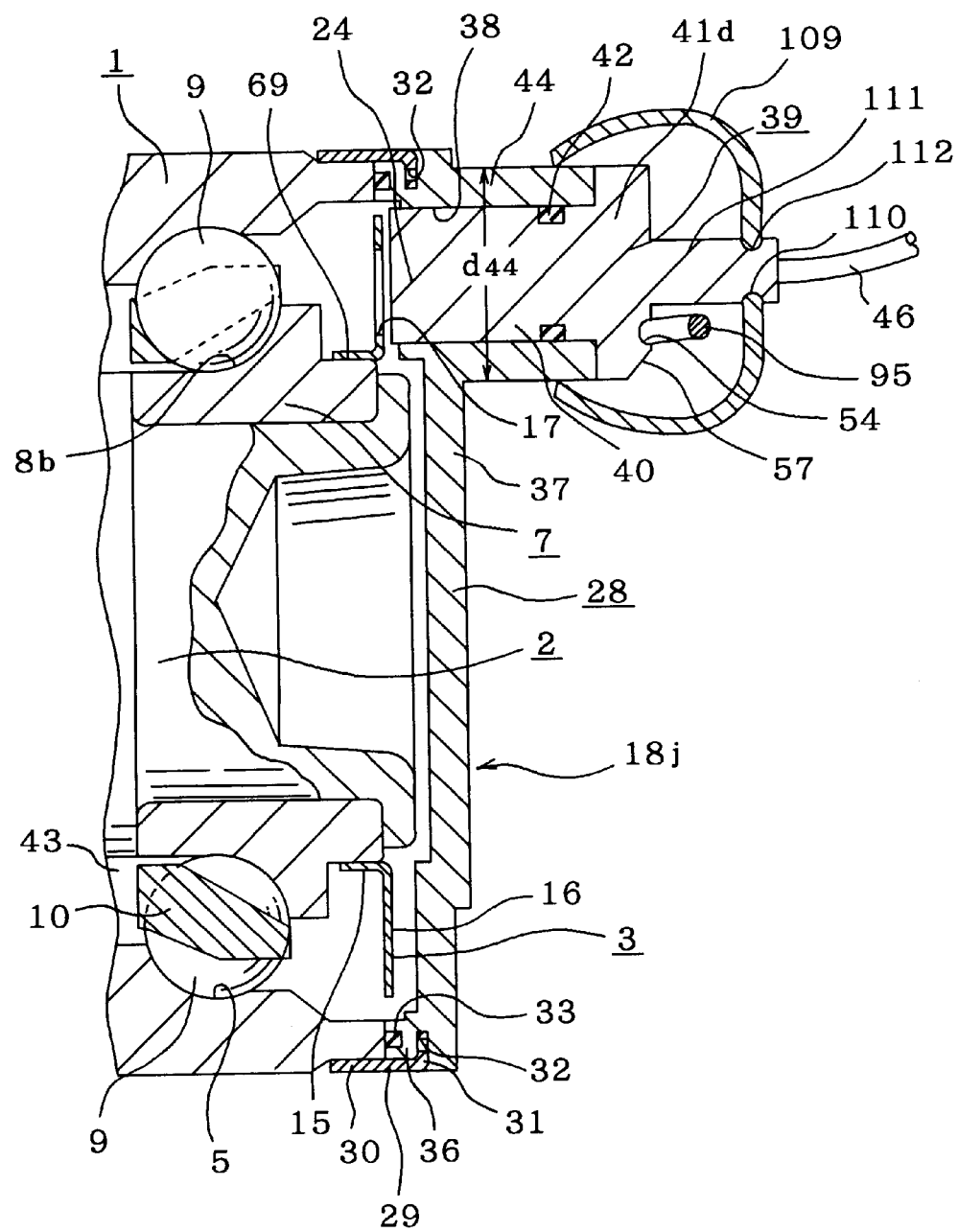
FIG. 54 is a cross sectional view of another embodiment corresponding to the right portion of FIG. 1.
Figure 55:
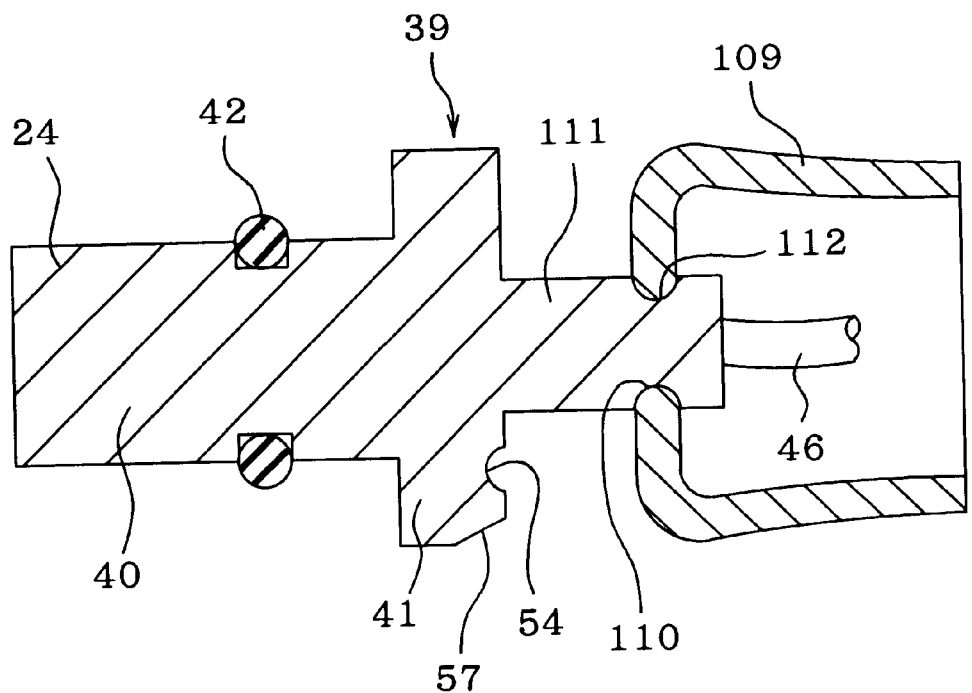
FIG. 55 is a cross sectional view of the sensor unit with the cover removed.
Figure 56:
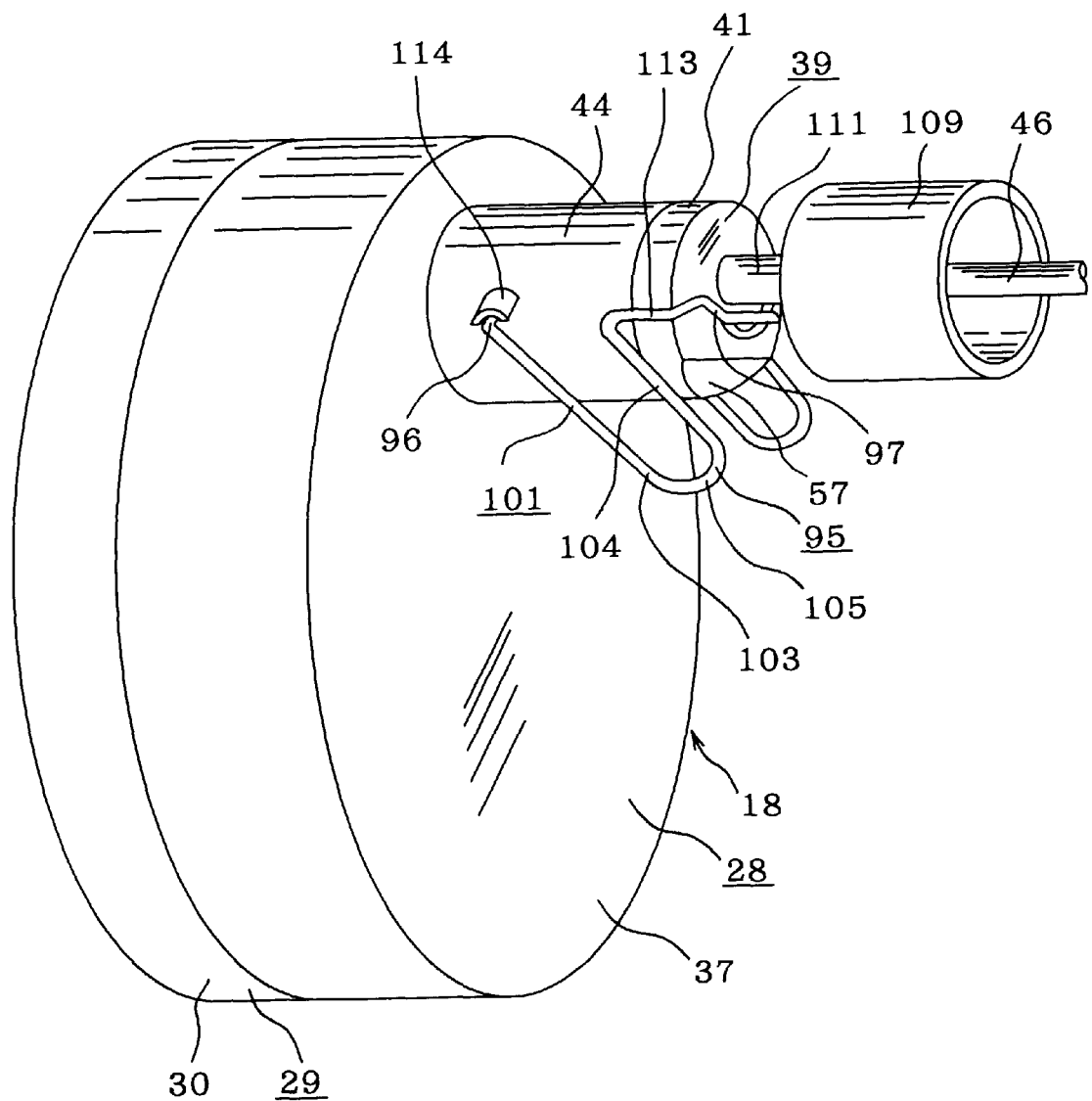
FIG. 56 is a perspective view of the cover just before the coupling portion between the coupling spring and the sensor unit is covered.
Figure 57:
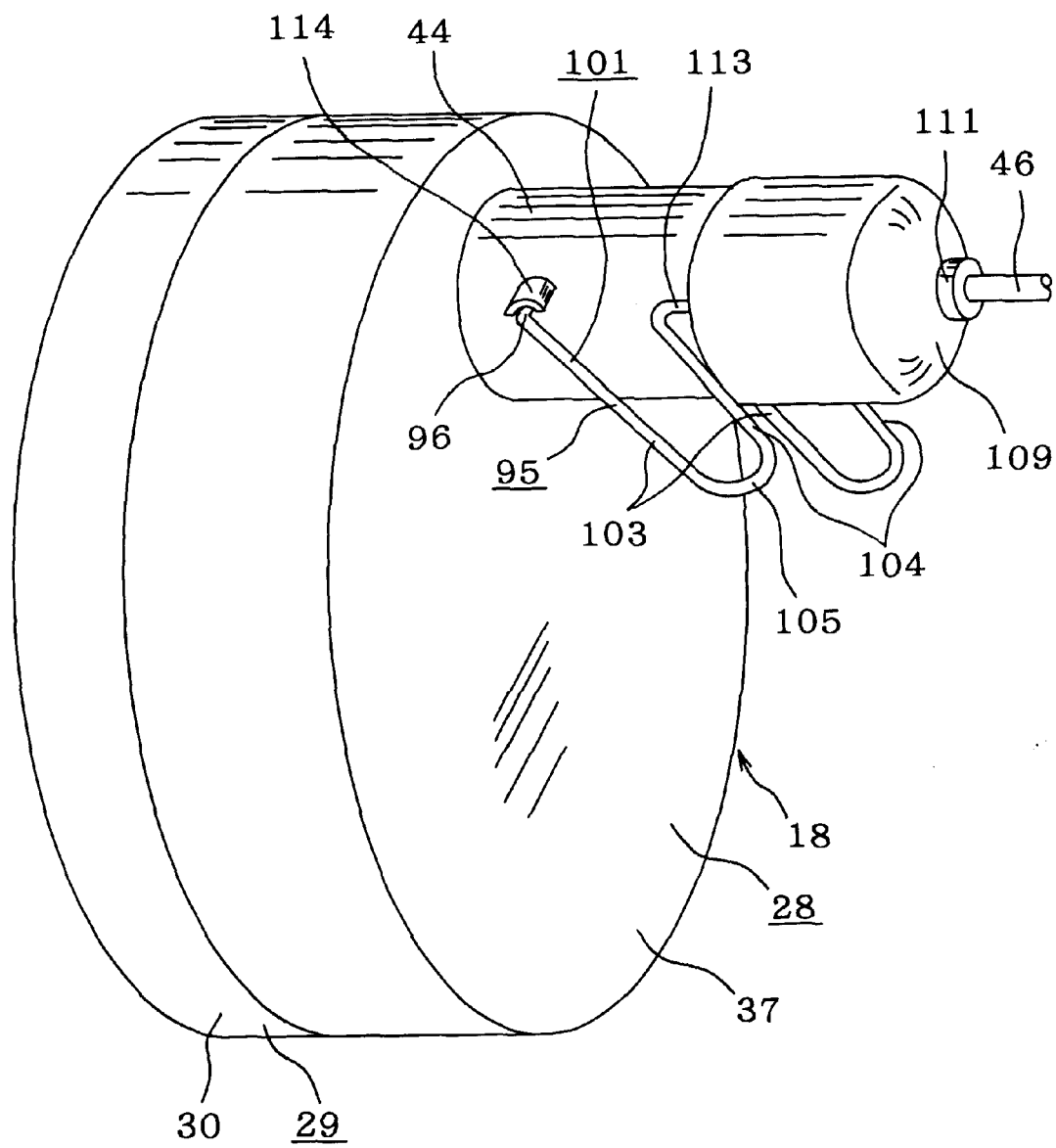
FIG. 57 is a perspective view of the cover just before the coupling portion between the coupling spring and the sensor unit is covered.

In this embodiment with a covering material 109 constructed as described above, the area where the retainer section 97 of the spring 95 attaches to the sensor unit 39 is covered by the covering material 109 As shown in FIG. 55, in order to install the sensor unit 39 to the cover 18, the covering material 109 that is previously attached to the sensor unit 39, is opened up on the opposite side of the flanged-portion 41, such that it does not interfere with the work of placing the spring 95 in the sensor unit 39. In this state, as shown in FIG. 56, the insert section 40 of the sensor unit 39 is inserted inside the cylindrical body 44 of the cover 18. The spring 95, is then rocked around its pivot supports 96, that are pivotally supported by support holes 93 located in the cylindrical body 44, and the retainer section 97 of the spring 95 is fitted into the groove 54 formed in the flanged portion 41 of the sensor unit 39. The construction and function of this part is mostly the same as that of the twelfth embodiment shown in FIGS. 46 thru 50. After the retainer section 97 has been fitted into the groove 54, the covering material 109 is inverted, as shown in FIG. 54 and 57, and the opening of the covering material 109 is faced in the opposite direction, and the peripheral edge portion of the opening of the covering material 109 elastically comes in contact with the outer peripheral surface of the cylindrical body 44. In this state, the covering material 109 covers the area where the retainer section 97 of the spring 95 is engaged with the sensor unit 39. If the covering material 109 is formed in a sufficiently long cylindrical structure, it is possible to cover the whole spring 95 to secure the anti-corrosion of the spring 95.

When using the rolling-bearing unit with rpm detector of this embodiment, constructed as described above, dirty water or the like is prevented from being splashed directly onto the area where the spring 95 and sensor unit 39 are engaged with each other, and thus it is possible to prevent the spring 95 from rusting. Moreover, with part of the spring 95 covered by the covering material 109, it is not possible for the spring 95 to come apart from the sensor unit 39 as long as the covering material 109 is not inverted. Accordingly, even if there are no stop plates 94 as described above (see FIGS. 37 to 40), it is possible to prevent the sensor unit 39 from accidentally coming apart from the cover 18.

The space $L_{113}$ (see FIG. 58) between the third pair of straight sections 113 of the spring 95 is nearly equal to or a little less than the outer diameter $D_{44}$ (see FIG. 54) of the cylindrical body 44 when the third pair of straight sections 113 are free. The reason for this is that when the area where the spring 95 is engaged with the sensor unit 39 is covered by the covering material 109, and the third pair of straight sections 113 push open from the inside the opening portion of the covering material 109, and prevent dirty water or the like from entering the connection.

Also, the outer peripheral edge of the opening of the covering material 109 elastically comes into contact with the outer peripheral surface of the cylindrical body 94, however, due to the existence of the third pair of straight sections 113 of the spring 95, there is a gap between the outer peripheral surface of the cylindrical body 44 and the covering material 109 that make them impossible to come in close contact with each other, so that a perfect seal could not be provided. However, in the location where they are installed in the vehicle, the spring 95 presses the sensor unit 39 against the peripheral edge portion of the opening of the insert hole 38, and in this state, the first and second pair of straight sections 103, 104 and the curved sections 105 are located below the retainer section 97. In other words, the third pair of straight sections 113 are not located above the retainer section 97. By doing so, the opening of the gap faces downward, and dirty water or the like passes through this gap making it possible to prevent dirt water from collecting in the space between the covering material 109 and the cylindrical body 44.

Furthermore, in this embodiment, in the area around the opening of the support holes 93 located in the cylindrical body 44, there is a pair of eaves 114 formed on the top when the rolling-bearing unit is in use, and this pair of eaves 114 prevent dirty water or the like from getting into the space between the pivot supports 96 and support holes 93. These eaves 114 are formed only in the upper portion, so that they do not interfere with the rocking of the spring 95. It is possible to form these eaves 114 in one piece with the cover 18 by injection moulding, thus simplifying the molding work.

In the embodiment shown in the figures, the construction of the rolling-bearing unit which supports the non-direction wheels was shown, where the inner ring 7 is attached to the hub 2 by crimping the end of the hub 2, as shown in FIG. 54, however, the rolling-bearing unit with rpm detector of this embodiment is not limited to this kind of construction, and it is possible to apply it to a rolling-bearing unit with rpm detector that supports the driven wheels or to other structures. Moreover, for the rolling-bearing unit with rpm detector of this embodiment, the sensor unit 39 is inserted in the axial direction of the hub 2, as shown in the figures, but may be inserted in the radial direction as in FIG. 25.

FIGS. 59 to 64 show another embodiment of the present invention, which is constructed with substantially the same members as in the first embodiment of FIGS. 1 to 5, e.g. as to the outer ring 1, cover 18 and hub 2 etc.

An encoder 3 fits around the axially inner end (right end in FIG. 59) of the inner ring 7, which together with the hub 2, forms the rotating ring. The inner ring 7 is fixed to the hub 2 by crimping radially outward the axially inside end of the hub 2 after the inner ring 7 is fitted onto the axially inside end of the hub 2. The encoder 3 is formed into a circular-ring shape having an L-shaped cross section by bending magnetic sheet metal such as SPCC, and comprises a cylindrical body 15 and a circular ring portion 16 extending radially outward from the axially inner end of the cylindrical body 15. This circular ring portion 16 is provided with a number of through holes 17 in slit shape in a radial direction with a uniform interval in a circumferential direction such that the polarity of the circular ring portion 16 alternates at equal intervals around in the circumferential direction.

Moreover, in part of the bottom plate 37 of the main body 28 which forms the cover 18, an insert hole 38 is formed in the section which faces the circular ring portion 16 of the encoder 3, the insert hole 38 is formed in a circular cross section and provided with a groove 172.

In part of the outside surface (right surface of FIG. 59) of the bottom plate 37, a cylindrical body 44 is formed to surround the opening of the insert hole 38. The inner peripheral surface of the base half portion (right half portion in FIG. 59) of the cylindrical body 44 and the inner peripheral surface of the insert hole 38 form a single cylindrical surface.

The inner diameter of the tip half portion or larger diameter portion (right half portion in FIG. 59) of the cylindrical body 44 is larger than the inner diameter of the insert hole 38 and tile base half portion of the cylindrical body 44. The larger diameter portion 155 thus formed is continued through a stepped portion 156 to a portion continued from the insert hole 38.

Figure 16:
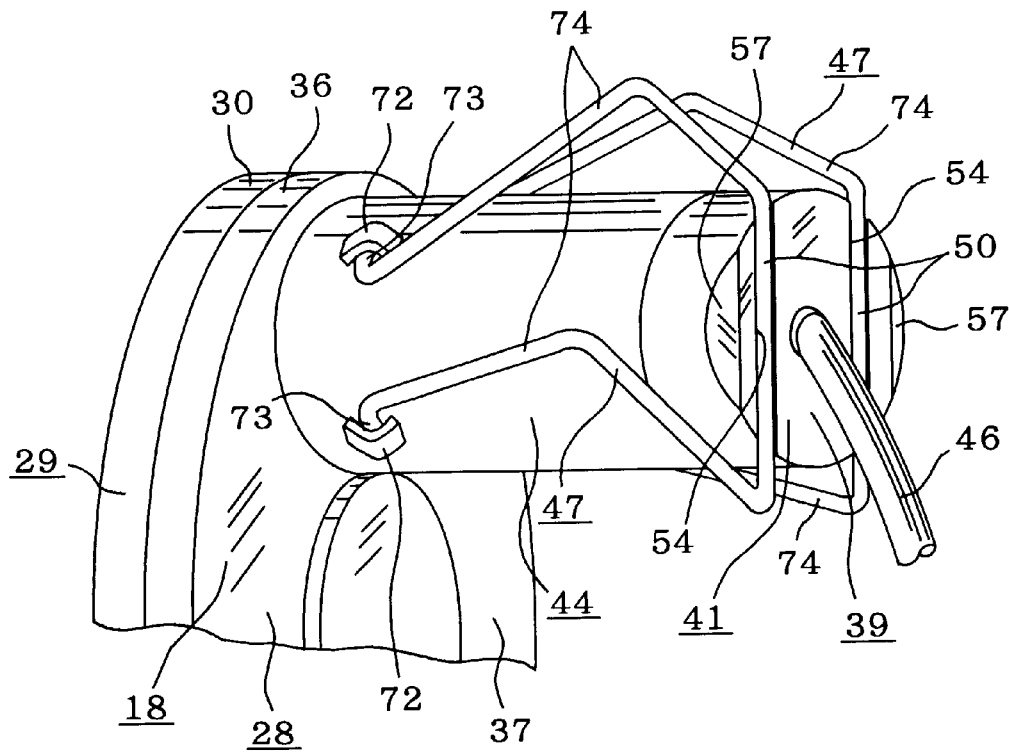
FIG. 16 is an enlarged perspective view of the coupling portion between the cover and the sensor unit of FIG. 13.
Figure 17:
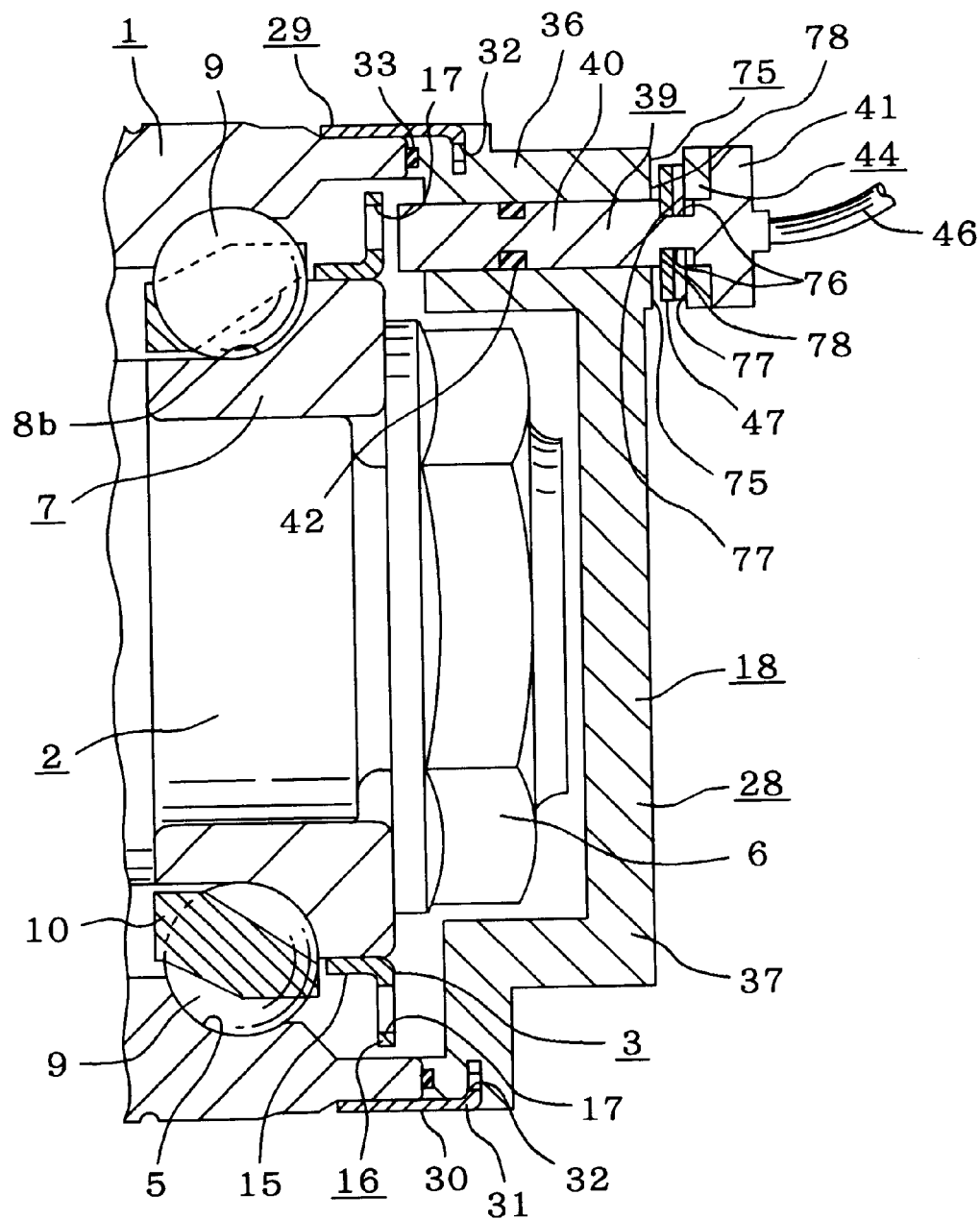
FIG. 17 is a cross sectional view of the axially inner portion of the rolling bearing to show another embodiment of the present invention.
Figure 18:
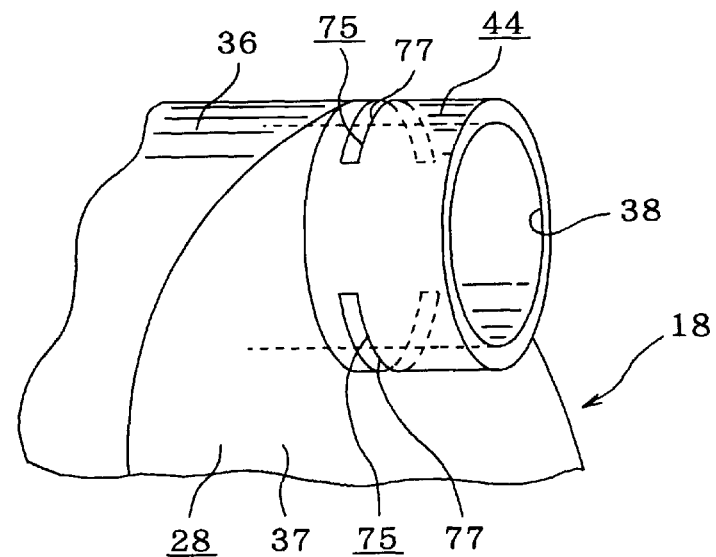
FIG. 18 is a perspective view of a portion of the cover in another example of the present invention.
Figure 19:
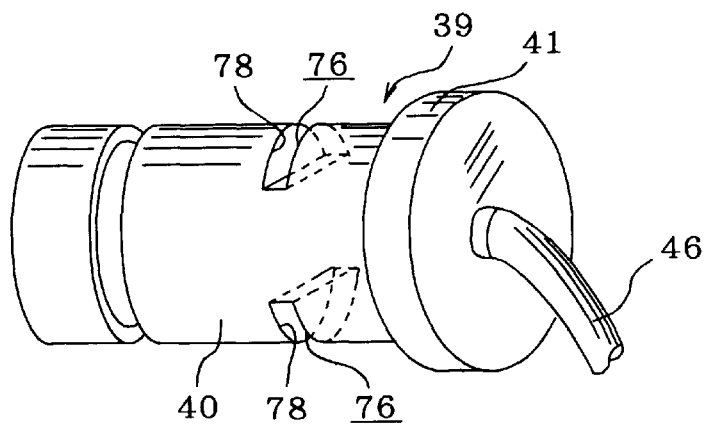
FIG. 19 is a perspective view of the end portion of the harness and the sensor unit used in the rolling bearing of FIG. 1.
Figure 63:
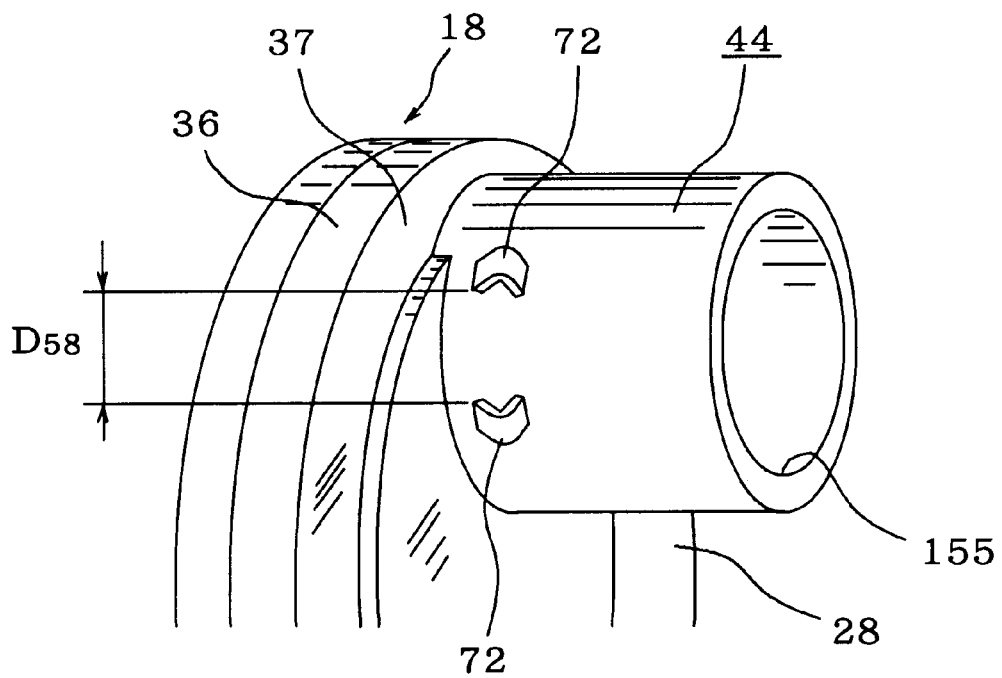
FIG. 63 is a perspective view of the cylindrical support member of FIG. 59.
Figure 64:
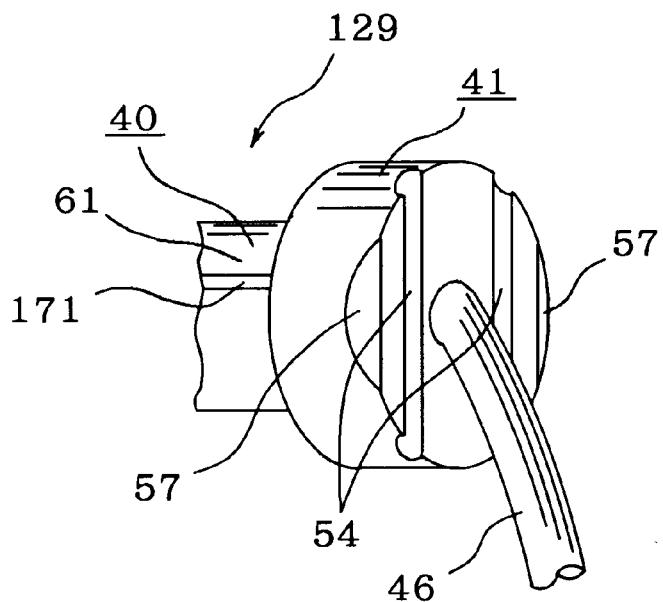
FIG. 64 is a perspective view of the holder taken on the opposite side of FIG. 60.

A holder 129 made of a synthetic resin and having a therein bedded therein is fixedly connected to the cylindrical body 44 by way of a pair of springs 47. Therefore, at two locations opposed to each other in a diametrical direction on part of the outer peripheral surface of the cylindrical body 44, a pair of support pieces 72 are provided with a space therebetween as shown in FIG. 63. The support pieces 72, four in total, are formed in an arc shape, in which pivot supports 73 formed at the both ends of the spring 47 are pivotally supported inside the support pieces 72, respectively. The description on FIGS. 12 thru 16 can be referred to for the support pieces 72, spring 47 etc. The spring 47 used in this embodiment is the same as shown in FIG. 15 and FIG. 16.

Figure 14:
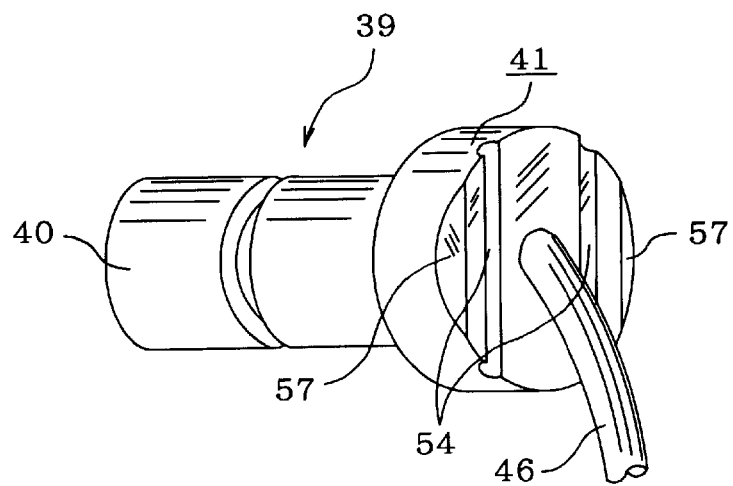
FIG. 14 is a perspective view of the end portion of the harness and the sensor unit used in the rolling bearing of FIG. 1.

The holder 129 corresponds to the sensor unit 39 in FIG. 14, and the descriptions on the sensor unit 39 in FIG. 14 are referred to for the present embodiment, specifically on the grooves 54, inclined surface 57 etc.

The holder 129 comprises a cylindrical insert section 40 continued from the flanged portion 41. The insert section 40 comprises a larger diameter portion 60 on the base side closer to the flanged portion 41, a smaller diameter portion 61 on the tip side distal from the flanged portion 41 and a stepped portion 168 to connect the larger and smaller diameter portions 60, 61 with each other.

The larger diameter portion 60 has a diameter so as to be inserted into the larger diameter portion 155 of the cylindrical body 44 without any play while the smaller diameter portion 61 has a diameter to be inserted into the insert hole 38 without any play groove 169 is formed around the outer peripheral surface in the middle of the larger diameter portion 60 of the holder 129, and an O-ring 42 is fastened in that groove 169. The outer diameter of the O-ring 42 is larger than the inner diameter of the larger diameter portion 155 of the cylindrical body 44 in a free state where it is fitted in the groove 169. On the other hand, when the larger diameter portion 60 is inserted into the larger diameter portion 155 of the cylindrical body 44, the O-ring 42 is elastically compressed between the inner peripheral surface of the larger diameter portion 155 and the bottom of the groove 169, forming a seal between the outer surface of the holder 129 and the cover 18.

Figure 60:
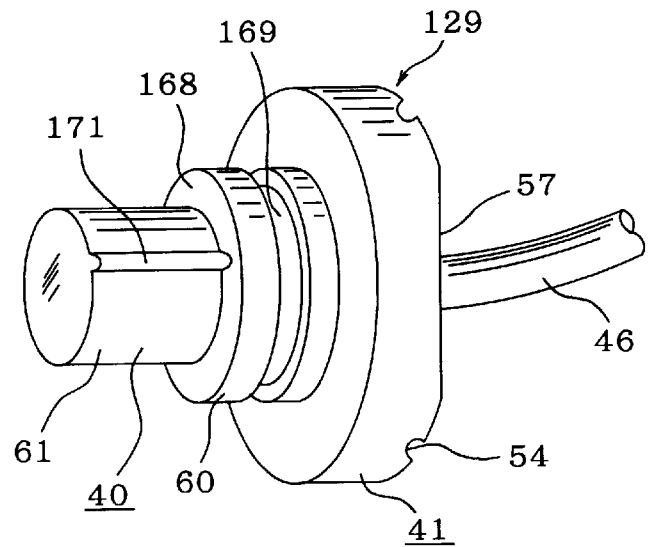
FIG. 60 is a perspective view of the holder to be installed in FIG. 59.

Disposed on part of the outer peripheral surface of the smaller diameter portion 61 displaced from the 0-ring 42 is a protrusion 171 as shown in FIG. 60 which extends in the axial direction of the small diameter portion 61. A single cylindrical surface is formed by the inner peripheral surface and the insert hole 38 and a portion of the inner peripheral surface of the cylindrical body 44.

Provided on the inner peripheral surface of the insert hole 38 and on part of the portion of the inner peripheral surface of the cylindrical body 44 is a groove 172 for engagement with the protrusion 171 without play, which is formed in the axial direction of the insert hole 38 and cylindrical body 44. With the engagement of the protrusion 171 with the groove 172, the holder 129 is positioned in a circumferential direction.

Figure 61:
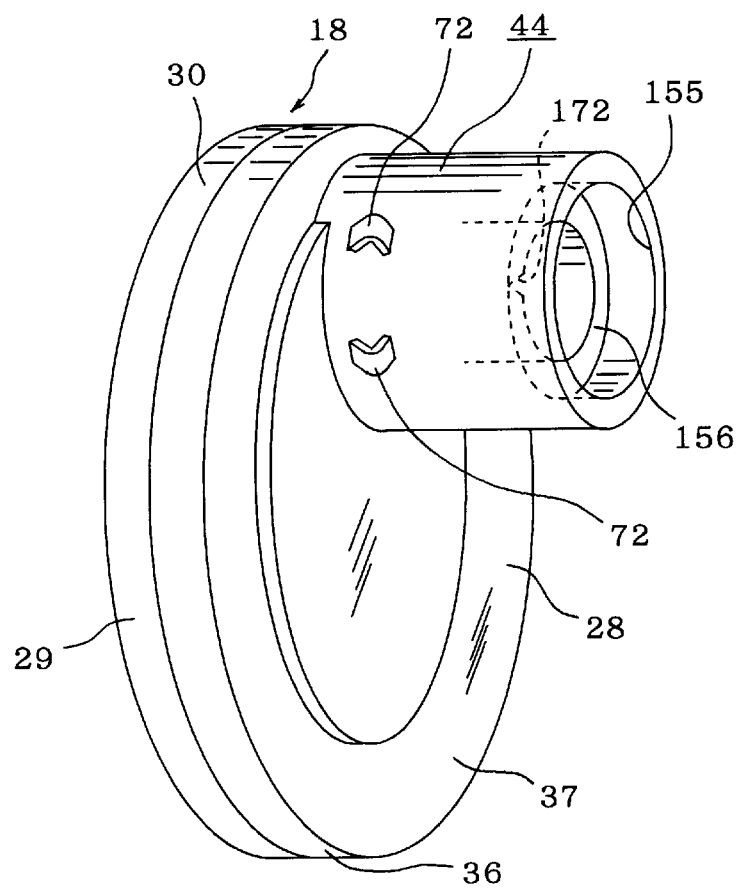
FIG. 61 is a perspective view of the cover to be used in FIG. 59.
Figure 62:
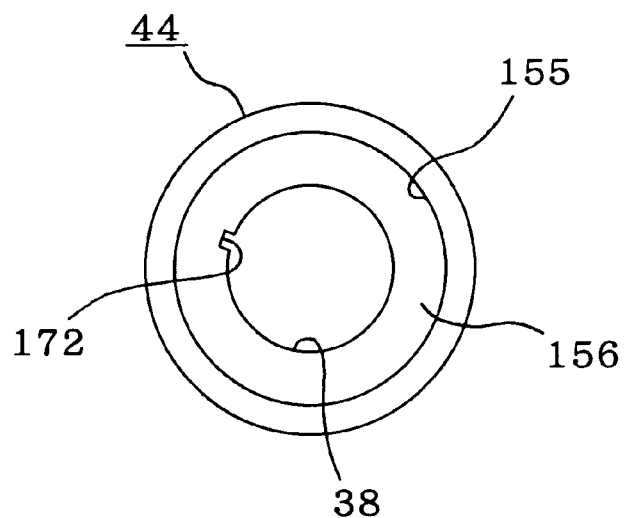
FIG. 62 is an end view of the cylindrical support member used in FIG. 59.

On the other hand, the protrusion 171 can be formed on the inner peripheral surface of the cylindrical body 44, while the groove 172 can be formed on the outer peripheral surface of the holder 129, which is inverse in arrangement to the embodiment in FIGS. 60 and 61.

Anyhow, by controlling the relation between the installation position of the protrusion 171 and groove 172 and the installation position of the O-ring 42, the protrusion 171 is engaged with the groove 172 before the O-ring 42 is supported between the bottom surface of the groove 169 and the inner peripheral surface of the larger diameter portion 155 of the cylindrical body 44. Accordingly, in the embodiment illustrated, with the holder 129 mounted to the cover 18, the distance $L_1$ from the step portion 156 on the inner peripheral surface of the cylindrical body 44 to the tip end surface of the holder 129 is larger than the distance $L_2$ from the side edge of the groove 169 with the O-ring 42 installed therein, closer to the tip end (left side edge in FIG. 59) to the axially inner surface of the flanged portion 41 of the holder 129. That is $L_1 > L_2$. Accordingly, in this embodiment, the holder 129 could not be inserted into the cylindrical body 44 and the insert hole 38 unless the protrusion 171 is engaged with the groove 72 before the O-ring 42 is forced into the inside of the larger diameter portion 155. Consequently, the holder 129 can positively circumferentially positioned within the insert hole 38 and the cylindrical body 44 before the O-ring 42 is held between the bottom surface of the groove 169 and the inner peripheral surface of the larger diameter portion 155. Accordingly, after O-ring 42 is held between the bottom surface of the groove 169 and the inner peripheral surface of the larger diameter portion 155 of the cylindrical body 44 and then elastically compressed, what must be done is that the holder 129 is urged to be fitted into the insert hole 38 and the cylindrical body 44. Therefore, the work to install the holder 129 in the cover 18 is efficiently carried out.

In order to support and fix the holder 129 within the cylindrical body 44, the pivot supports 73 of the springs 47 are engaged with the support pieces 72, respectively. This engagement work can be carried out at a wide space site. Then, the pair of springs 47 are rocked and displaced to a side of the cylindrical body 44, so that the retainer sections 50 of the springs 47 are retracted from the opening portion of the cylindrical body 44, and in this state, the cylindrical insert portion 40 of the holder 129 is inserted into the cylindrical body 44 and then into the insert hole 38 so as to make the flanged portion 41 come into contact with the tip end surface of the cylindrical body 44. During this process, the protrusion 171 is engaged with the groove 172 to position the holder 129 in the circumferential direction.

The dimensions of respective components are controlled such that when the flanged portion 41 is abutted to the tip end surface of the cylindrical body 44 during positioning the holder 129 in the circumferential direction, there is a small clearance with a desired size between the detecting portion on the tip end surface of the insert portion 40 and the axially inner surface of the circular ring portion 16 of the encoder 3.

There is a clearance between the step portion 168 formed in the intermediate portion of the cylindrical insert portion 40 of the holder 129, and the step portion 156 formed on the inner peripheral space at the intermediate portion of the cylindrical body 44. Then, the pair of springs 47 are rocked for displacement so that the retainer sections 50 are moved closer to the flanged portion 41, which makes the retainer sections 50 engage with the grooves 54 formed on the base end surface of the flanged portion 41. During this, the legs 61 elastically stretch based on the engagement between the retainer sections 50 and the inclined surface 57. In the state where the retainer sections 50 are in alignment with the grooves 54, the whole length of the legs 61 is elastically shrinked to keep the engagement between the retainer sections 50 and the grooves 54.

Incidentally, based on the circumferential positioning of the holder 129 which is in turn based on the engagement between the protrusion 171 and the groove 172 the retainer sections 50 and grooves 54 are correctly controlled in phase.

In the embodiments illustrated, the flanged portion 41 of the holder 129 is abutted to the tip end surface of the cylindrical body 44, and the engagement position of the flanged portion 41 with the cylindrical body 44, specifically the position of one side face of the fanged portion 41 is used as a reference surface for die process to form the holder 129 through injection molding of synthetic resin. There is a clearance between the step portion 168 formed in the intermediate portion of the holder 129 and the step portion 156 formed on the inner peripheral surface of the cylindrical body 44. On the contrary, it is possible to make a structure having the step portions 168, 156 engaged with each other so as to use the flanged portion 168 as a reference surface for die process to form the holder 129 by injection molding of synthetic resin. In this case, there is a clearance formed between the flanged portion 41 and the tip end surface of the cylindrical body 44. Anyhow, a portion of the holder 129 separated from the tip end portion of the holder 129 is abutted to the cylindrical body 44 or the peripheral portion of the opening of the insert hole 38 so as to position the holder 129 in the axial direction (inserting direction).

On the process to remove the holder 129 from the cover 18, and on the members such as the step portion 69 formed on the axially inner end of the inner ring 7, and the cylindrical portion 71 formed on the axially inner end of the hub 2, the descriptions on the embodiment in FIGS. 12 to 16 are referred to.

Figure 65:
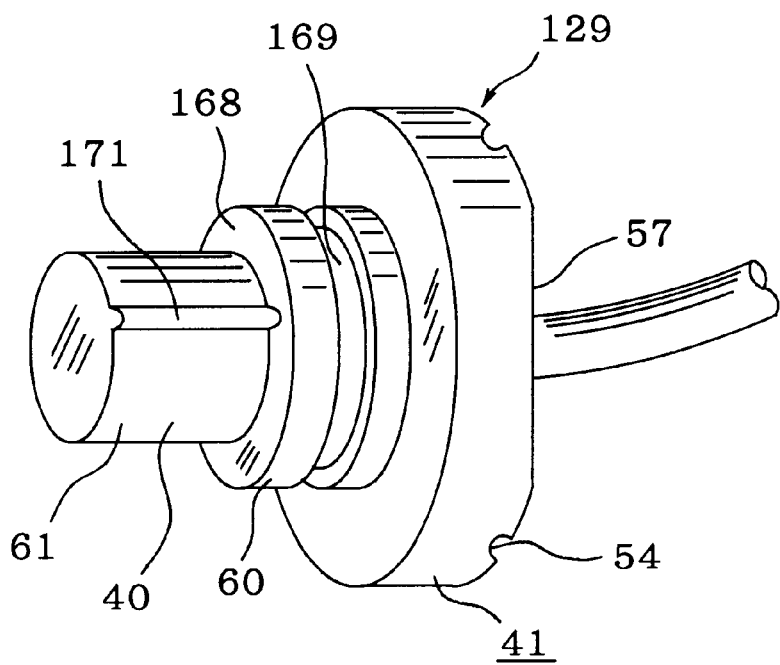
FIG. 65 is a perspective view of the holder in another example of the present invention.
Figure 66:
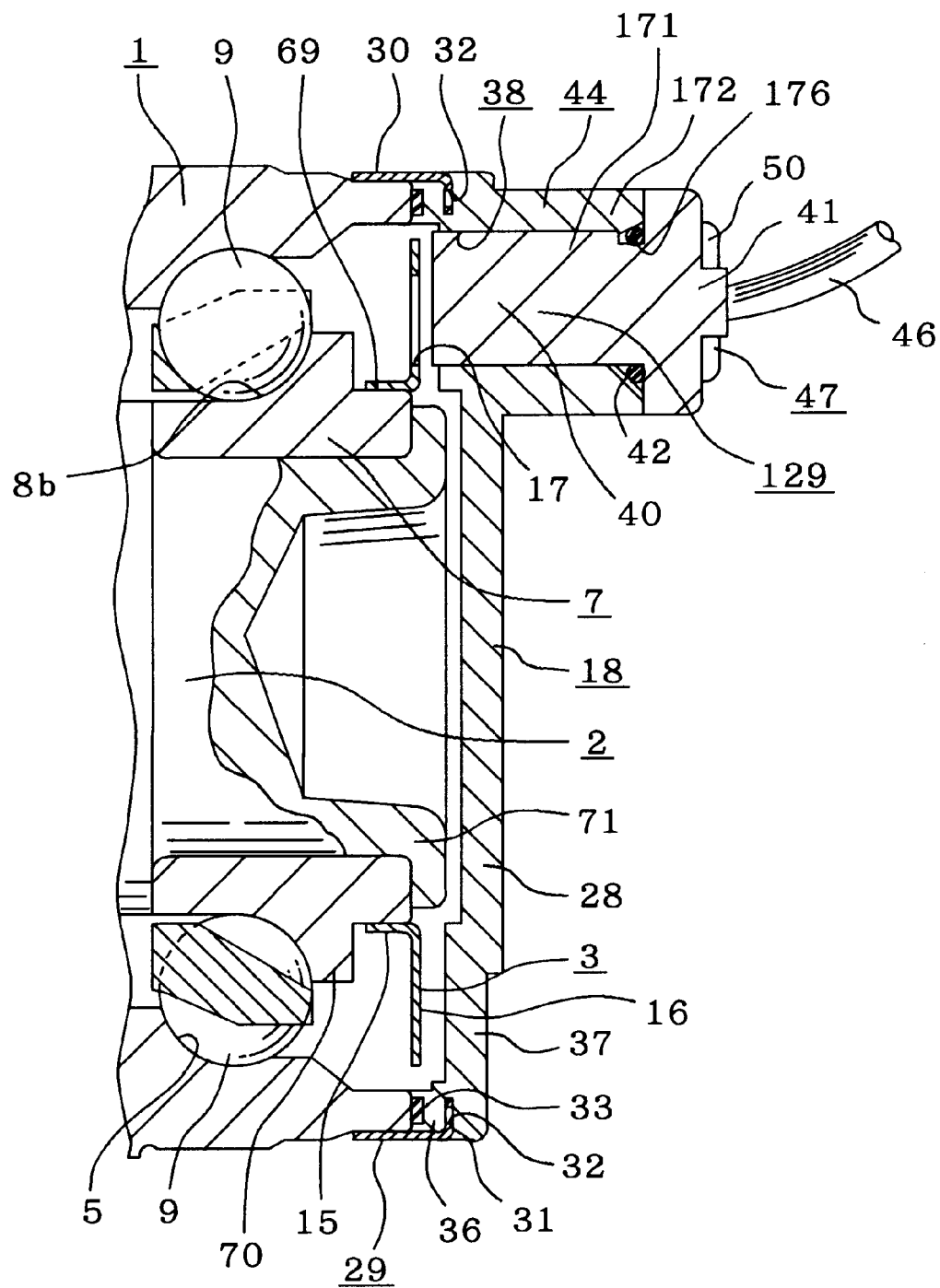
FIG. 66 is a cross sectional view of another embodiment corresponding to the right portion of FIG. 1

FIG. 65 shows another example of the embodiments of the present invention, where the protrusion 171 for engagement is provided in a portion of the smaller diameter portion 61 of the cylindrical insert section 40 of the holder 129, except for the tip end portion (left end portion in FIG. 65) of the smaller diameter portion 61. The position of the tip end of the protrusion 171 is controlled such that the protrusion 171 enters the groove 172 on the cover 18 (FIGS. 61 and 62) before the O-ring 42 mounted to the groove 169 enters the inside with reference to the inner peripheral surface of the cover 18. Although not illustrated, the protrusion 171 for engagement can be formed only on the tip end portion of the smaller diameter portion 61 of the cylindrical insert portion 40.

FIGS. 66 to 69 shows another example of the present invention, where the inner diameter of the cylindrical body 44 on the outer surface of the cover 18 is substantially the same to the inner diameter of the insert hole 38 along the substantially whole length. An outwardly flared portion 176 is formed on the peripheral portion of the opening of the cylindrical body 44, such that the O-ring 42 is elastically pressed between the outwardly flared portion 176, the outer peripheral surface of the base end of the cylindrical insert section 40 of the holder 129, and one side surface of the flanged portion 41. In his example, the outwardly flared portion 176 is a position of the cover 18.

The protrusion 171 is engaged with the groove 172 before the O-ring 42 is held between the outer peripheral surface of the base end of the cylindrical insert section 40 and the inclined portion 176. Accordingly, the holder 129 is positively circumferentially positioned within the insert hole 38 and cylindrical body 44, which makes the installation of the holder 129 to the cover 18 efficient.

The diameter of the O-ring 42 and the position of forming the groove 172 are controlled such that the location where the O-ring 42 comes into contact with the inclined portion 176 is located radially outside the opening at the end of the groove 172. Accordingly, the O-ring 42 is engaged with the inclined portion 176 throughout their periphery without any interruption. Therefore, the seal performance is never damaged on the portion where the O-ring 42 is installed on the basis of the groove 172.

Figure 67:
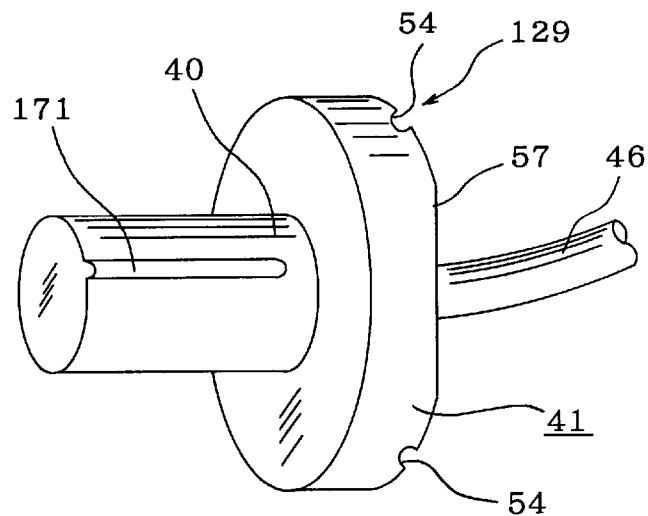
FIG. 67 is a perspective view of the holder to be installed in FIG. 59.
Figure 68:
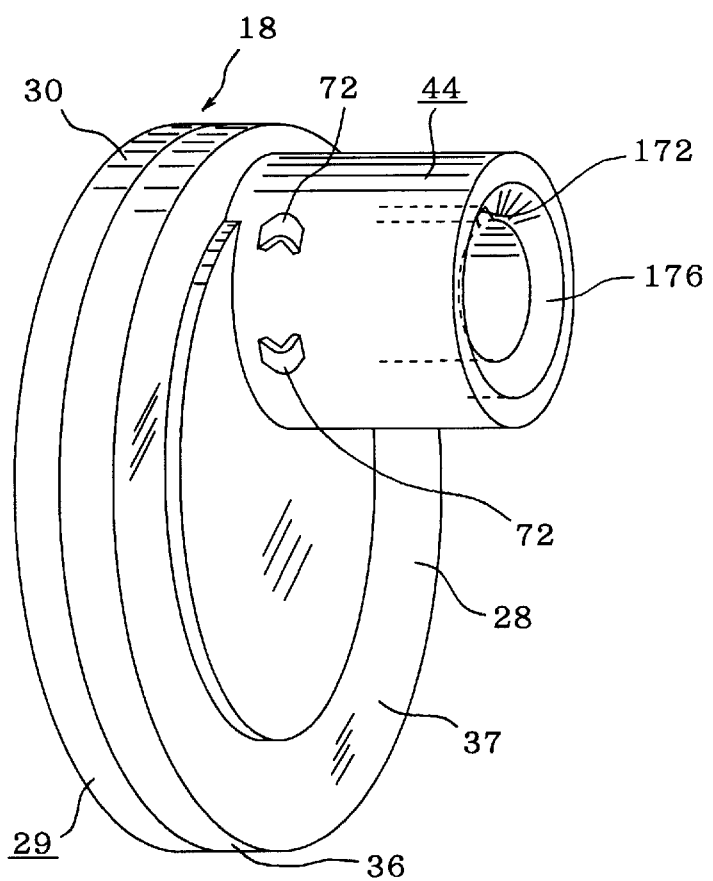
FIG. 68 is a perspective view of the cover to be used in FIG. 59.
Figure 69:
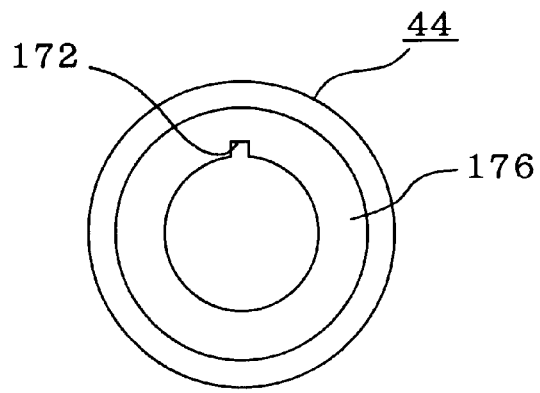
FIG. 69 is an end view of the cylindrical support member used in FIG. 59.

If the die for injection molding the holder 129 with synthetic resin is formed in a structure which is split radially in cross section, it is possible to form, only by way of injection molding of synthetic resin, that is with no following cutting process, a structure including the protrusion 171 which extends only to the intermediate portion of the cylindrical insert section 40 as shown in FIG. 67.

Figure 25:
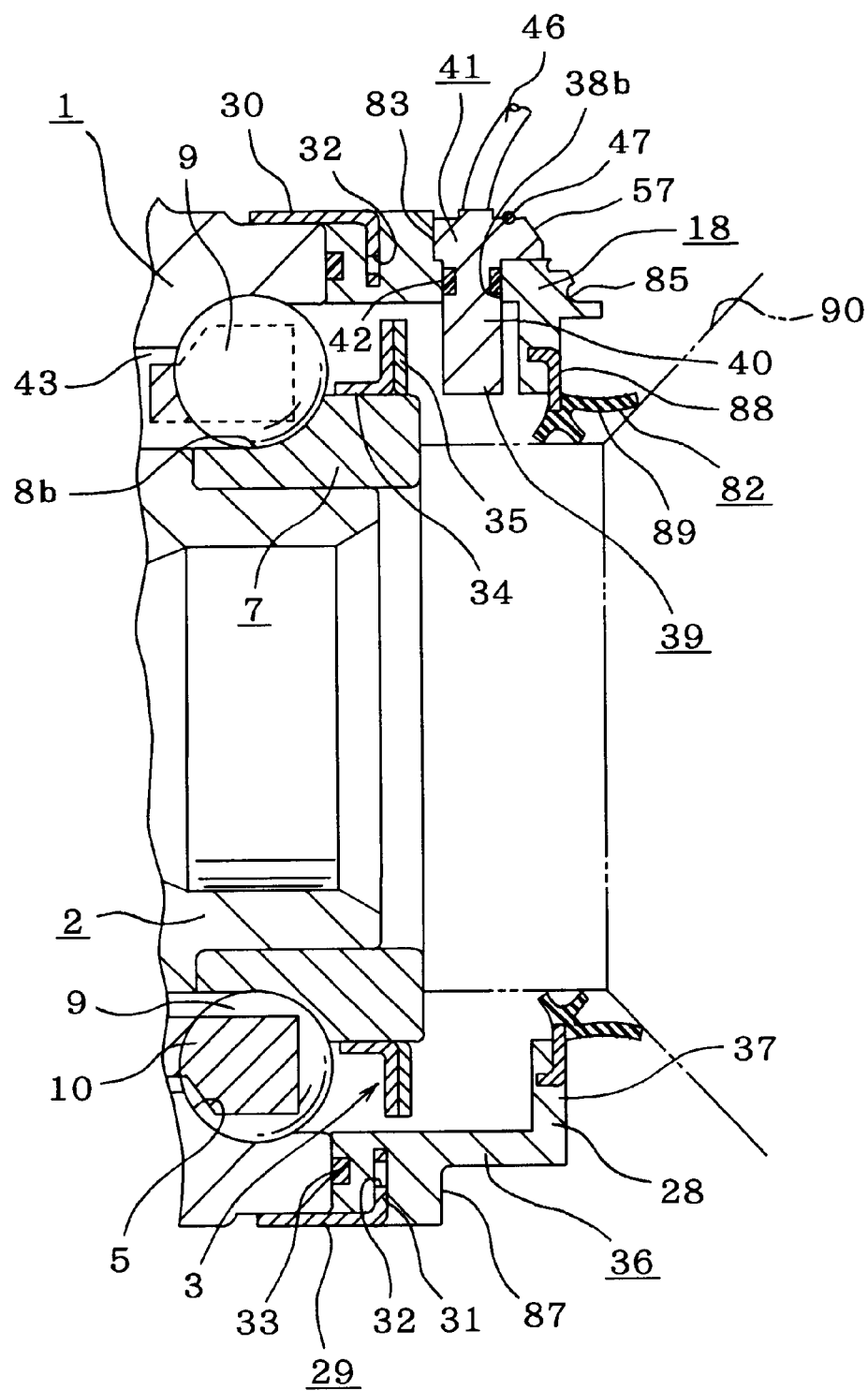
FIG. 25 is a cross sectional view of the axially inner portion of the rolling bearing to show another embodiment of the present invention.
Figure 26:
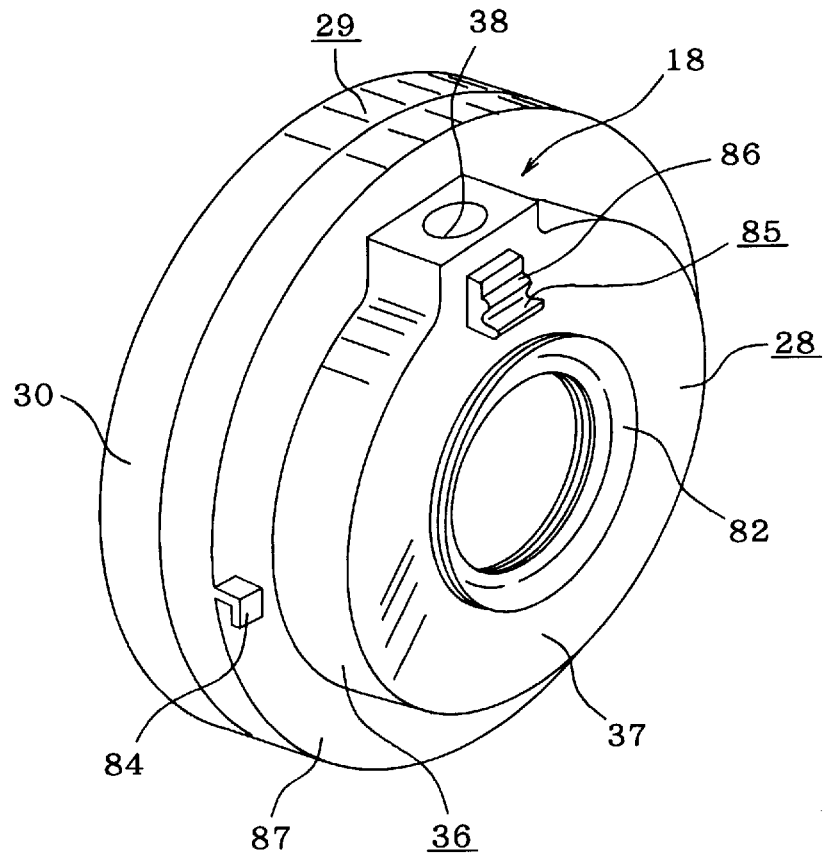
FIG. 26 is a perspective view of the cover used in the rolling bearing unit of FIG. 21.
Figure 27:
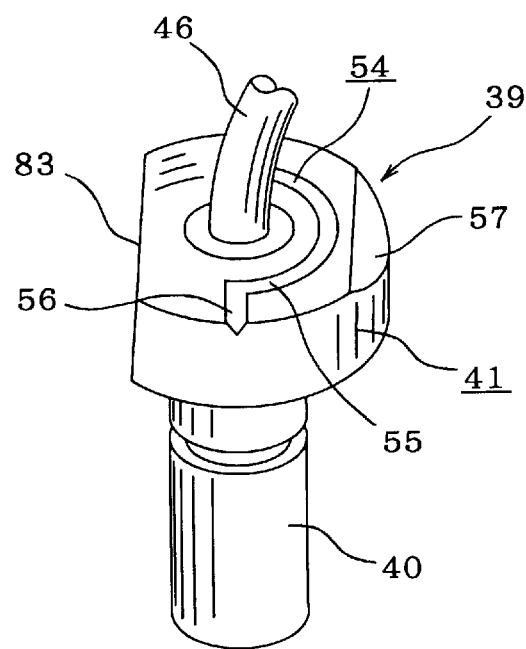
FIG. 27 is a perspective view of the end portion of the harness and the sensor unit used in the rolling bearing of FIG. 1.
Figure 70:
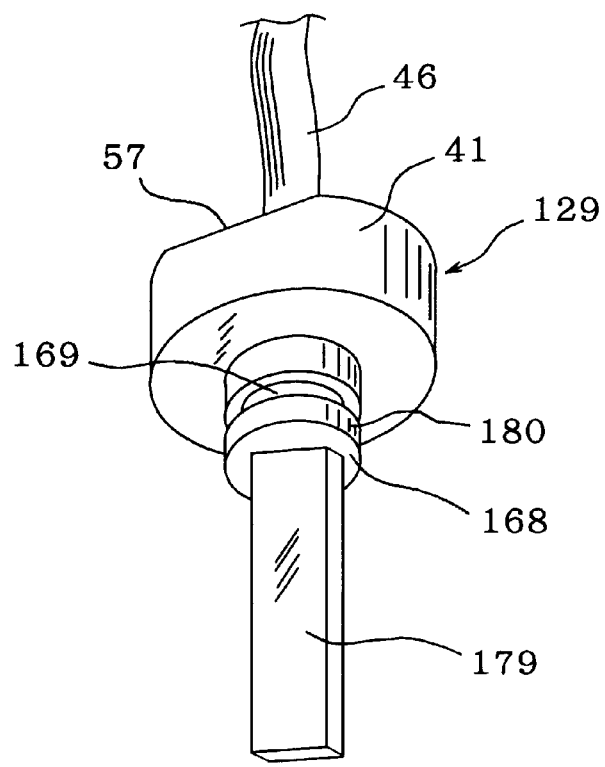
FIG. 70 is a perspective view of the holder to he installed in FIG. 59.
Figure 71:
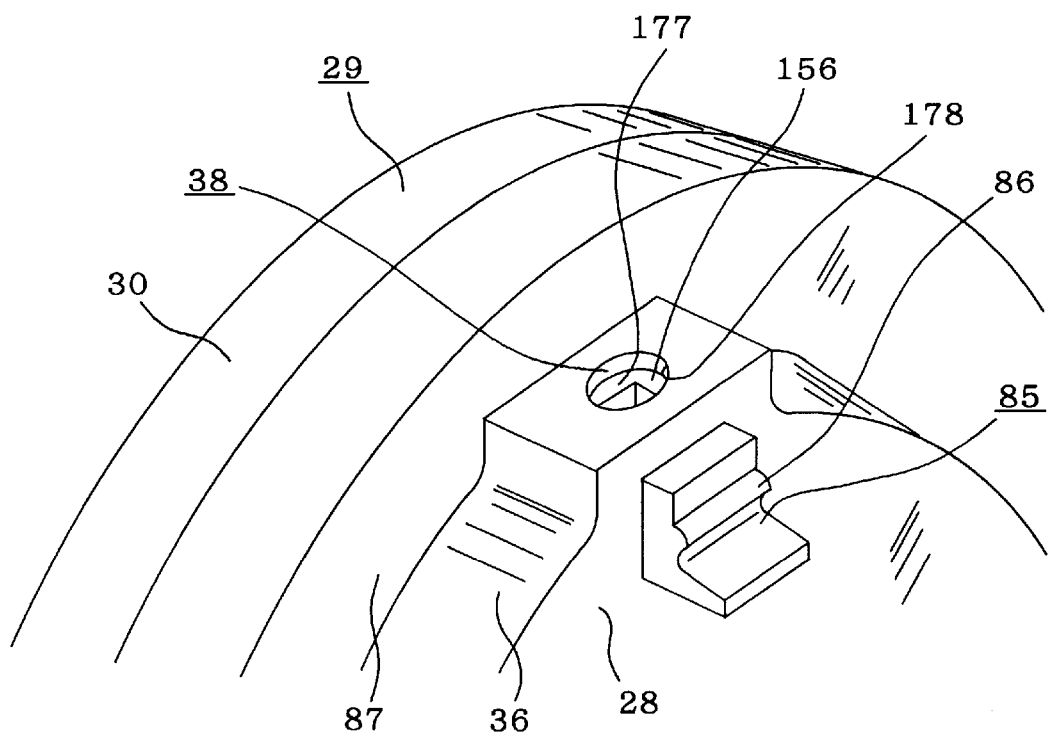
FIG. 71 is a perspective view of the cover to be used in FIG. 59.
Figure 72A:
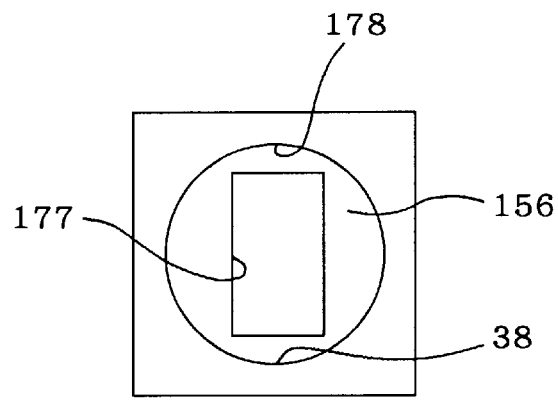
FIG. 72 (A) is a view taken on the upper side of FIG. 25 to shown the through hole.

FIGS. 70 to 72 shows another example for use in the unit as shown in FIGS. 25 to 30 where the main body 28 of the cover 18 is formed to have a L-shaped cross section throughout the circumference. The example is applied to a rolling bearing unit to support a driven wheel. In this example, the hub 2 is connected to a constant velocity joint for rotational drive as shown in FIG. 25.

The cylindrical wall portion 36 of the cover 18 has a thick portion, where the insert hole 38 is radially formed with reference to the cover 18.

Figure 76:
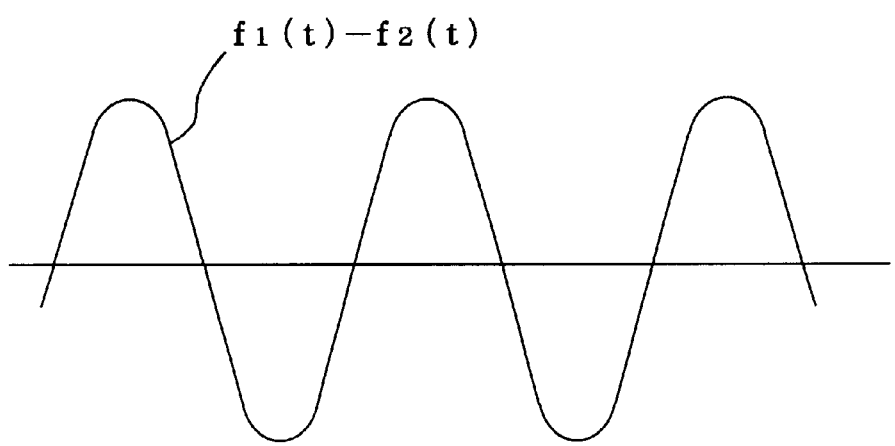
FIG. 76 is a graph showing a synthetic sensor output signal of the signals from the Hall elements.
Figure 77:
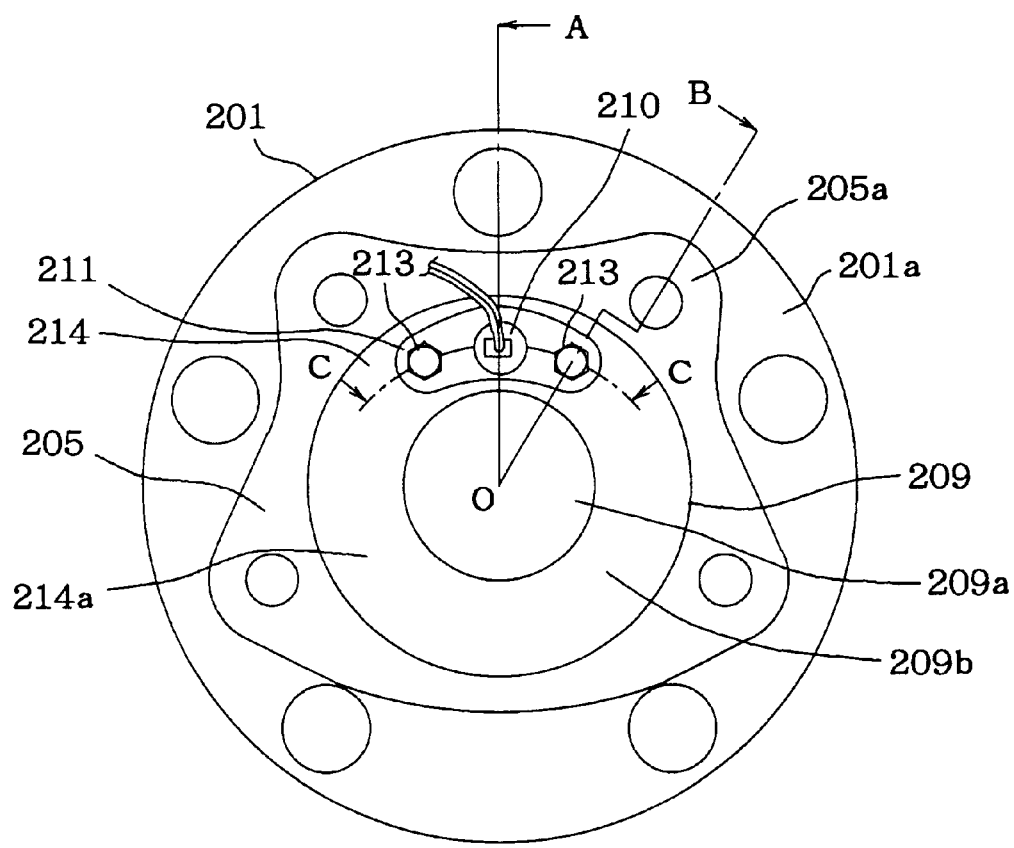
FIG. 77 is a front view of the rolling bearing unit with rotation speed detection sensor of Japanese Utility Model Publication No. Jitsukai Hei 7-31539.
Figure 78:
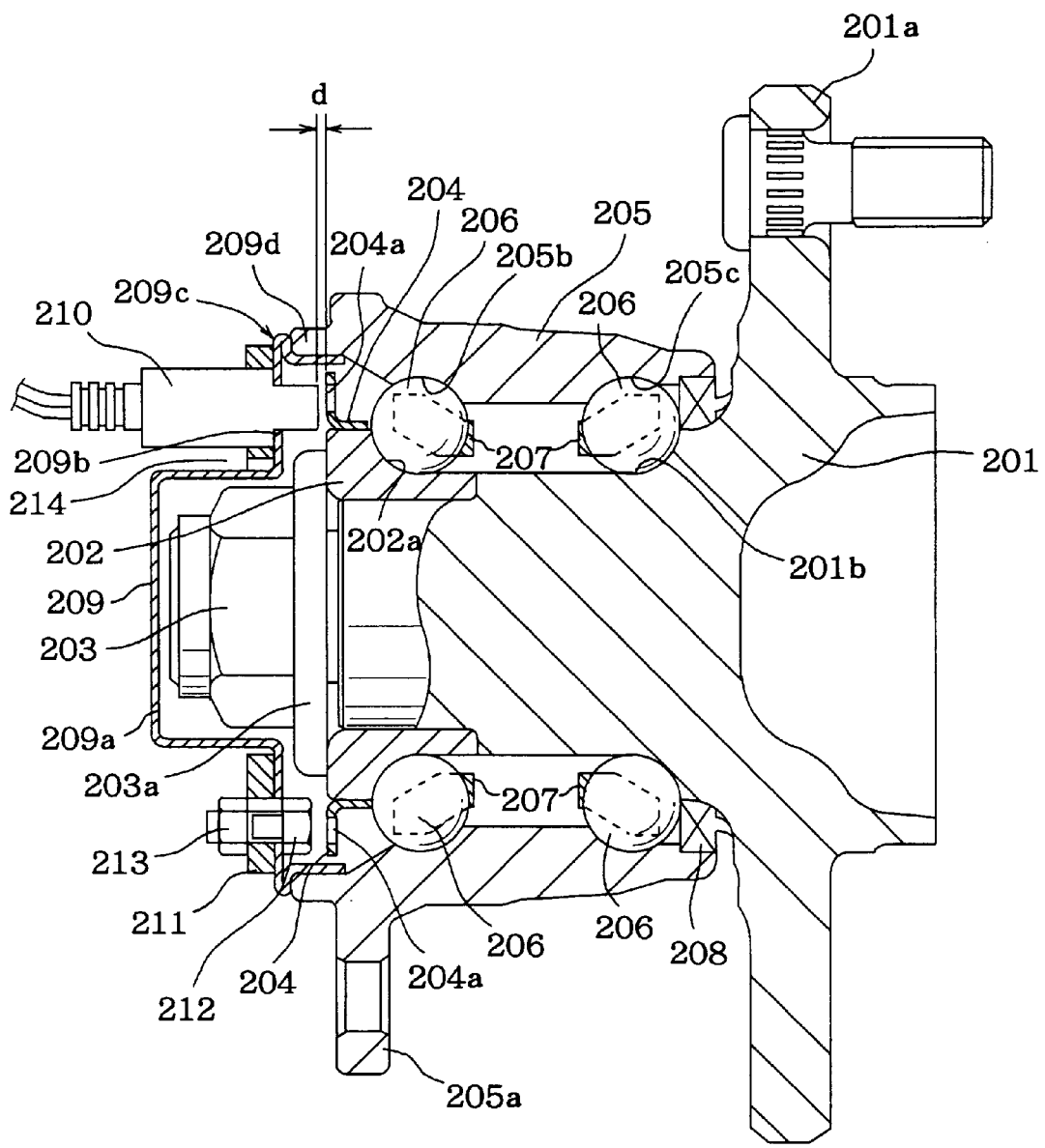
FIG. 78 is a cross-sectional view taken along the line A-O-B in FIG. 77.
Figure 79:
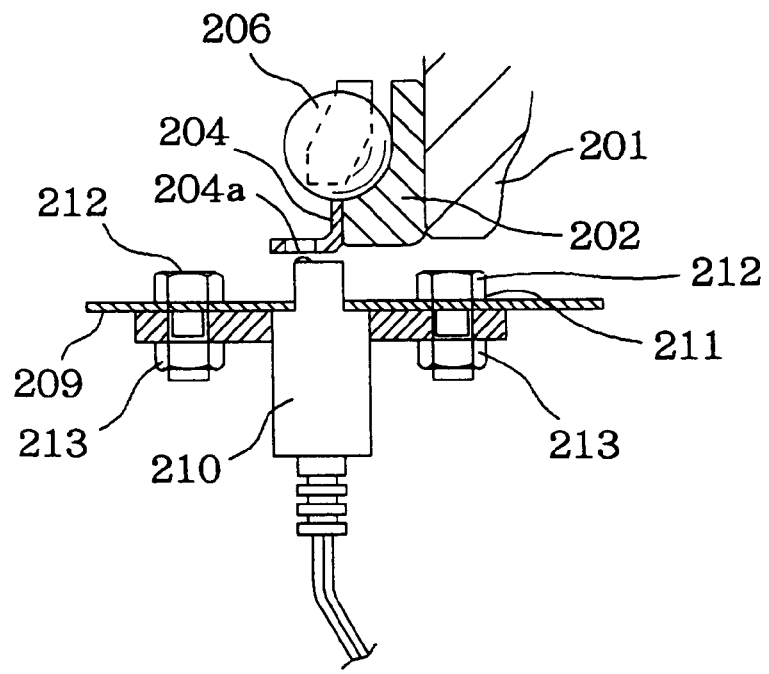
FIG. 79 is a cross-sectional view taken along the line C—C in FIG. 77.

The insert hole 38 has, as shown in FIGS. 71, 72 and 76, a radially inner half portion 177 (omitted in FIG. 26) formed in a non-circular shape such as rectangular in cross section and a radially outer half portion 178 formed in a circular shape, corresponding to which the holder 129 mounted to the cover 18 is formed in a non-circular shape in cross section, such as rectangular, at the tip half portion 179 on the radially inside, while formed in a circular shape in cross section at the base end portion 180 on the radially outside.

A groove 169 is formed on the outer peripheral surface at the intermediate portion of the base end portion 180 to receive an O-ring 42 which is elastically compressed between the bottom surface of the groove 169 and the inner peripheral surface of the radially outer half portion 178 of the insert hole 38, to provide a seal between the outer peripheral surface of the holder 129 and the inner peripheral surface of the insert hole 38.

In this example, the tip half portion 179 of the holder 129 enters the radially inner half portion 177 of the insert hole 38 before the O-ring 42 enters the insert hole 38, so as to position the holder 129 in a circumferential direction.

Figure 72B:
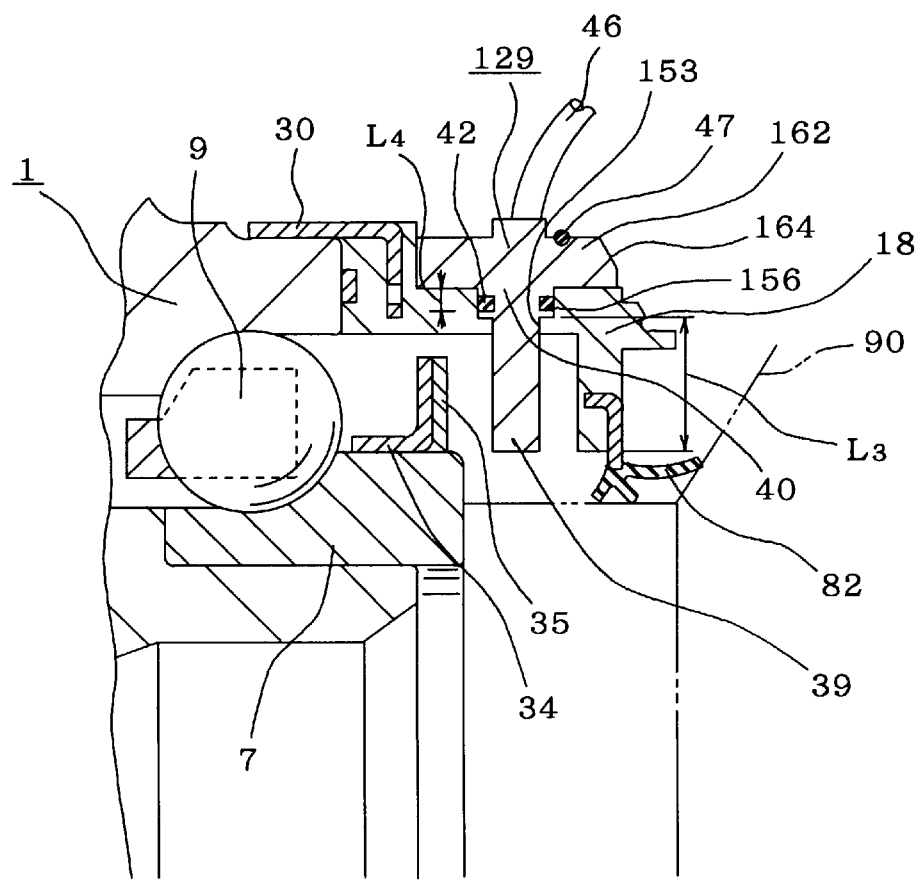

Specifically, when the holder 129 is installed in the cover 18, the distance $L_3$ between the step portion 156 on the inner peripheral surface at the intermediate portion of the insert hole 38 and the tip end face of the holder 129, is larger than the distance $L_4$ between the side edge closer to the tip end (lower side edge in FIG. 72(B)) of the groove 169 with the O-ring 42 fitted therein and the radially inside face of the flanged portion 41 of the holder 129. That is $L_3 > L_4$. Accordingly, in the present example, the holder 129 could not be inserted into the insert hole 38 unless the tip half portion 179 is engaged with the radially inner half portion 177 before the O-ring 42 is forced into the interior of the radially outer half portion 178. As a result, the circumferential positioning of the holder 129 with the insert hole 38 can be positively carried out before the O-ring 42 is pressed between the bottom surface of the groove 169 and the inner peripheral surface of the radially outer half portion 178. Therefore, after the O-ring 42 is held between the bottom surface of the groove 169 and the inner peripheral surface of the radially outer half portion 178 and elastically compressed, all what is to do is to press the holder 129 into the insert hole 38. Thus, the holder 129 can be efficiently mounted to the cover 18.

Provided on the base end surface of the flanged portion 41 formed on the base end portion of the holder 129 is a groove 54 and an inclined surface 57. In the state where the holder 129 is connected to the cover 18, the retainer section 50 of the spring 47 (FIG. 28) is engaged with the groove 54 to retain the flanged portion 41 onto the outer peripheral surface of the cylindrical wall portion 36. The spring 47 used in this embodiment has a retainer section 50 in the center, legs 49 on both ends and connection sections 51 for connecting the retainer section 50 to the legs 49 as shown in FIG. 28. The legs 49 are formed in a pivot support shape, and the connection sections 51 are formed in a substantially quarter circle shape, respectively. The legs 49 are bent in opposing directions from the ends of the connection section 51, and are coaxially aligned.

As to the pivot supports 84, coupling sprig 47, the cover 18 including the bottom plate 37, hook 85 etc., the descriptions on the embodiment in FIGS. 25 to 30 are referred to for the present embodiment.

The following are a basic description about the mechanism on the rotational speed detection.

Figure 73:
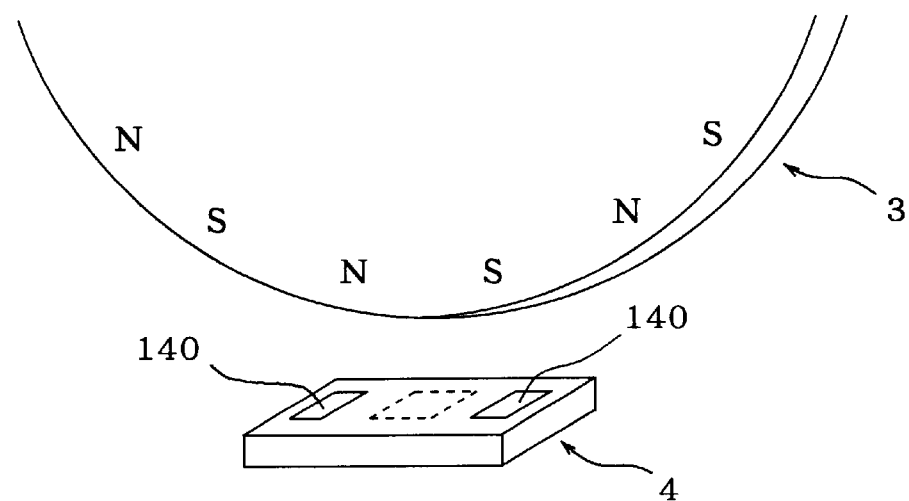
FIG. 73 is a diagrammatic view of a basic structure of the rotational speed sensor.

FIG. 73 shows an example of the rotational speed sensor device comprising an encoder 3 having S-pole and N-pole alternately arranged, and a sensor 4 having a pair of Hall elements 140 with a predetermined space therebetween.

Figure 74:
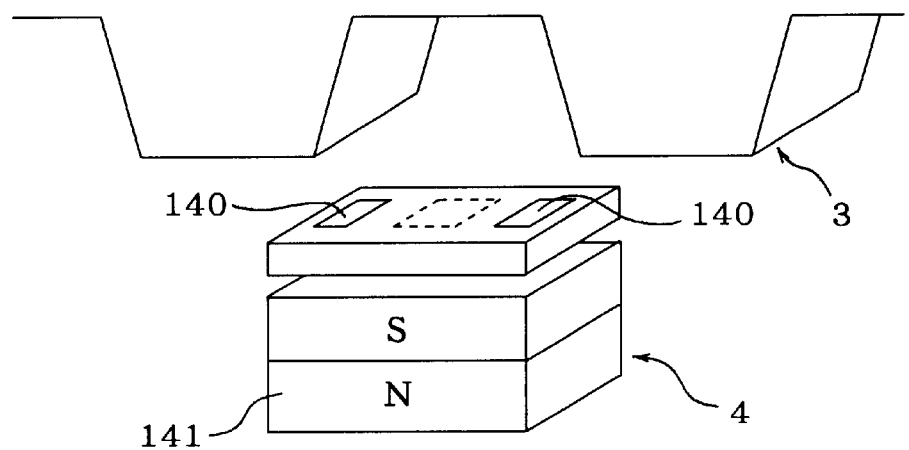
FIG. 74 is a diagrammatic view of a basic structure of the rotational speed sensor.

FIG. 74 shows another example of the rotational speed sensor device, comprising an encoder 3 made of a magnetic material and having lands and recesses circumferentially alternately arranged and a sensor 4 comprising a pair of Hall elements 140 arranged with a predetermined space therebetween and a permanent magnet 141. The Hall elements 140 are precisely positioned in a circumferential direction of the encoder 3.

Figure 75:
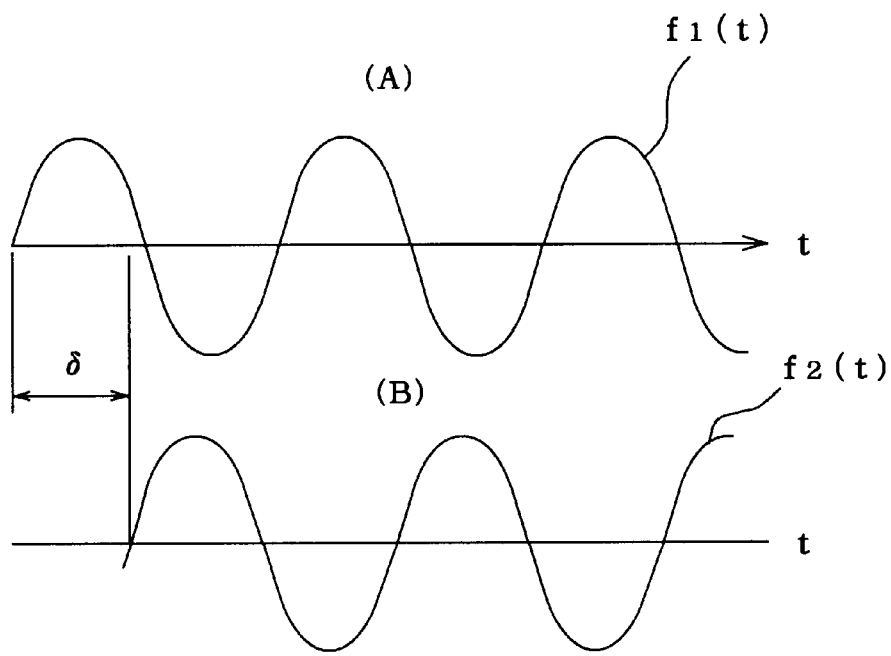
FIG. 75 is a graph showing a signal output from a pair of Hall elements of the sensor.

In FIG. 75, the outputs $f_1$ (t) and $f_2$ (t) of the pair of Hall elements of the sensor 4 as shown in FIGS. 73 and 74 change as shown by curves (A) and (B) corresponding to the rotation of the encoder 3.

FIG. 76 shows an output of the sensor 4 as shown in FIGS. 73 and 74, which is the difference in output between the HalU elements as shown Curves (A) and (B) in FIG. 75. That is $\{f_1 (t)-f_2 (t)\}$. The output of the sensor 4 changes based on the phase difference 6 (FIG. 75) of the outputs $f_1$ (t) and $f_2$ (t) of the pair of the Hall elements. When the phase difference δ is π radians (180degrees), the output of the sensor 4 is the largest. Thus, the pair of Hall elements 140 of the sensor 4 must be precisely arranged with reference to the circumferential direction of the encoder 3 to provide the space of π radians between the Hall elements to increase the output of the sensor 4. This is achieved by the present invention.

What is claimed is:

1. A rolling bearing unit with a rotational speed sensor comprising;

a stationary ring having an end and a first raceway, a rotatable ring having an end and a second raceway, one of the stationary and rotatable rings being an outer ring with the other being an inner ring, a plurality of rolling elements rotatably provided between the first and second raceways to rotatably support the stationary and rotatable rings, a sensor support case having a step portion for axial positioning, a detecting portion and a sensor mounted therein, an encoder having circumferentially changing magnetic characteristics and connected to the end of the rotatable ring, a cover made of a synthetic resin, connected to the end of the stationary ring, and having a fitting portion with respect to the outer ring, the fitting portion formed with a groove for mounting an seal-ring therein, a mount hole for inserting part of the sensor support case therein, and a portion abutted to the step portion of the sensor support case for axial positioning, an elastic member having a first portion engaged with the cover and a second portion engaged with the sensor support case to fix the sensor support case to the cover, and wherein the detecting portion of the sensor is faced to the encoder to output a frequency signal proportional to the rotational speed of the rotatable ring.

2. A rolling bearing unit with a rotational speed sensor comprising;

a stationary ring having an end and a first raceway, a rotatable ring having an end and a second raceway, one of the stationary and rotatable rings being an outer ring with the other being an inner ring, a plurality of rolling elements rotatably provided between the first and second raceways to rotatably support the stationary and rotatable rings, a sensor support case having a step portion for axial positioning, a detecting portion, a sensor mounted therein, and a flanged portion, an encoder having circumferentially changing magnetic characteristics and connected to the end of the rotatable ring, a cover connected to the end of the stationary ring, and having a mount hole for inserting part of the sensor support case therein, made of synthetic resin and a portion abutted to the step portion of the sensor support case for axial positioning, a coupling spring of steel having a first end portion engaged with the cover and a second end portion engaged with the flanged portion of the sensor support case to press the sensor support case both in a detachable manner to the insert hole in the cover, so that the sensor support case is mounted to the cover and wherein the detecting portion of the sensor is faced to the encoder to output a frequency signal proportional to the rotational speed of the rotatable ring.

* * * * *